United States Patent [19]
Pawlowski, Jr. et al.

[11] Patent Number: 5,852,459
[45] Date of Patent: *Dec. 22, 1998

[54] PRINTER USING PRINT CARTRIDGE WITH INTERNAL PRESSURE REGULATOR

[75] Inventors: Norman E. Pawlowski, Jr.; Mark Hauck; John A. Barinaga, all of Corvallis, Oreg.

[73] Assignee: Hewlett-Packard Company, Palo Alto, Calif.

[*] Notice: The term of this patent shall not extend beyond the expiration date of Pat. No. 5,583,545.

[21] Appl. No.: 706,051

[22] Filed: Aug. 30, 1996

Related U.S. Application Data

[63] Continuation-in-part of Ser. No. 550,902, Oct. 31, 1995, Ser. No. 429,915, Apr. 27, 1995, and Ser. No. 566,821, Dec. 4, 1995, said Ser. No. 550,902, is a continuation-in-part of Ser. No. 518,847, Aug. 24, 1995, Pat. No. 5,736,992, which is a continuation-in-part of Ser. No. 331,453, Oct. 31, 1994, Pat. No. 5,583,545.

[51] Int. Cl.$^6$ .................................................. B41J 2/175
[52] U.S. Cl. .................................................. 347/86; 347/6
[58] Field of Search .............................. 347/6, 7, 85–87

[56] References Cited

U.S. PATENT DOCUMENTS

| | | | |
|---|---|---|---|
| 3,169,821 | 2/1965 | Miller | 346/140.1 |
| 3,335,424 | 8/1967 | Hartai | 346/140.1 |
| 3,371,350 | 2/1968 | Sanderson et al. | 346/140.1 |
| 3,950,761 | 4/1976 | Kashio | 347/85 |
| 3,961,337 | 6/1976 | Jung et al. | 347/89 |
| 4,074,284 | 2/1978 | Dexter et al. | 347/49 |
| 4,475,116 | 10/1984 | Sicking et al. | 347/86 |
| 4,602,662 | 7/1986 | Eremity et al. | 141/198 |
| 4,677,447 | 6/1987 | Nielsen | 347/87 |
| 5,040,002 | 8/1991 | Pollacek et al. | 347/87 |
| 5,367,328 | 11/1994 | Erickson | 347/85 |
| 5,369,429 | 11/1994 | Erickson | 347/7 |
| 5,583,545 | 12/1996 | Pawlowski, Jr. et al. | 347/7 |

*Primary Examiner*—N. Le
*Assistant Examiner*—Craig A. Hallacher

[57] ABSTRACT

In the preferred embodiment, an inkjet printer includes a replaceable print cartridge which is inserted into a scanning carriage. An ink tube extends from the scanning carriage to a separate ink supply located within the printer. A fluid interconnect on the print cartridge connects to a fluid interconnect on the carriage when the print cartridge is inserted into the carriage to complete the fluid connection between the external ink supply and the print cartridge. In one embodiment, the fluid interconnection is made between the print cartridge and the ink tube simply by placing the print cartridge into a stall in the scanning carriage. A pressure regulator internal to the print cartridge regulates the flow of ink from the external ink supply to the print cartridge. The external ink supply may be pressurized or non-pressurized.

19 Claims, 48 Drawing Sheets

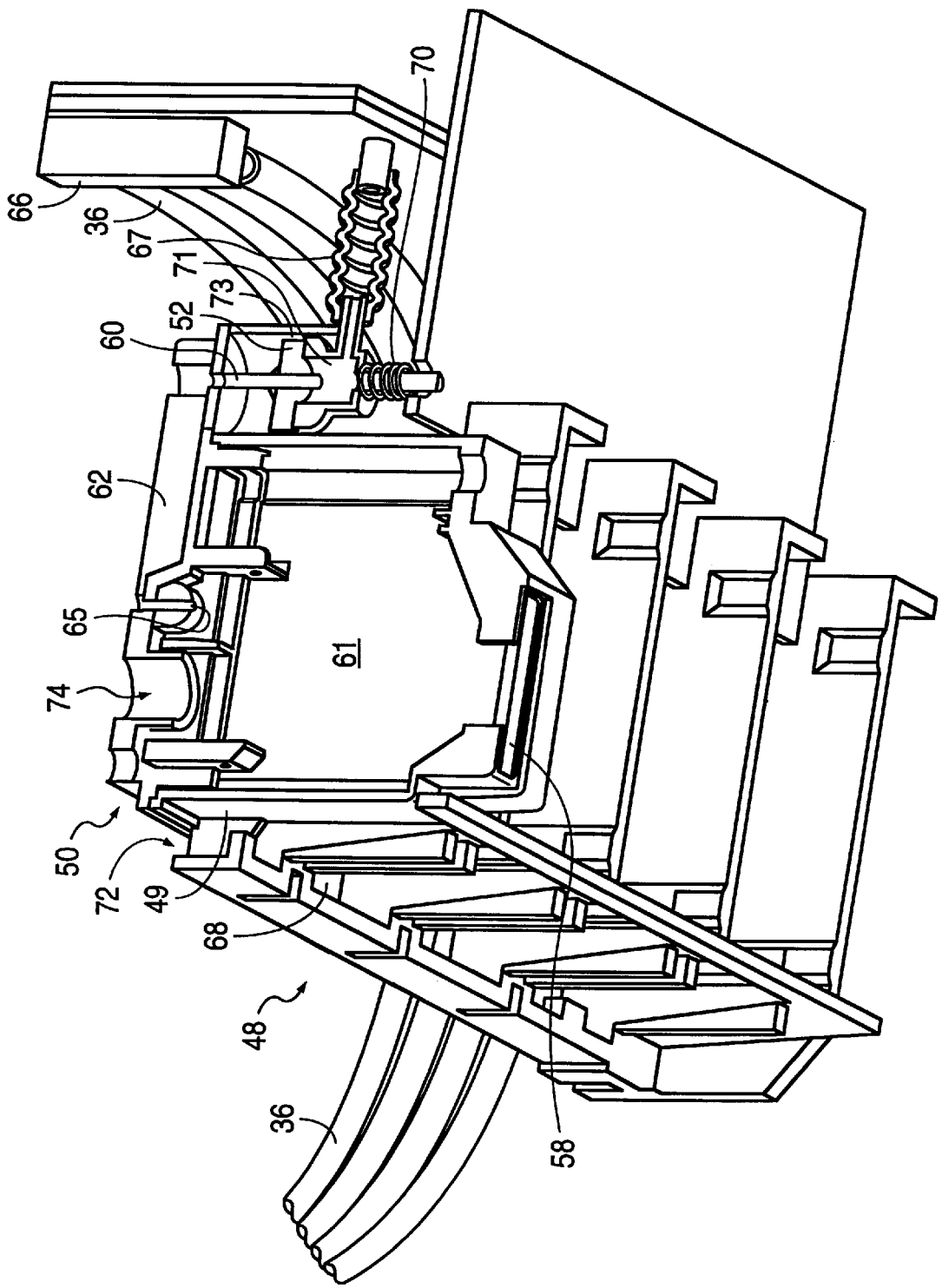

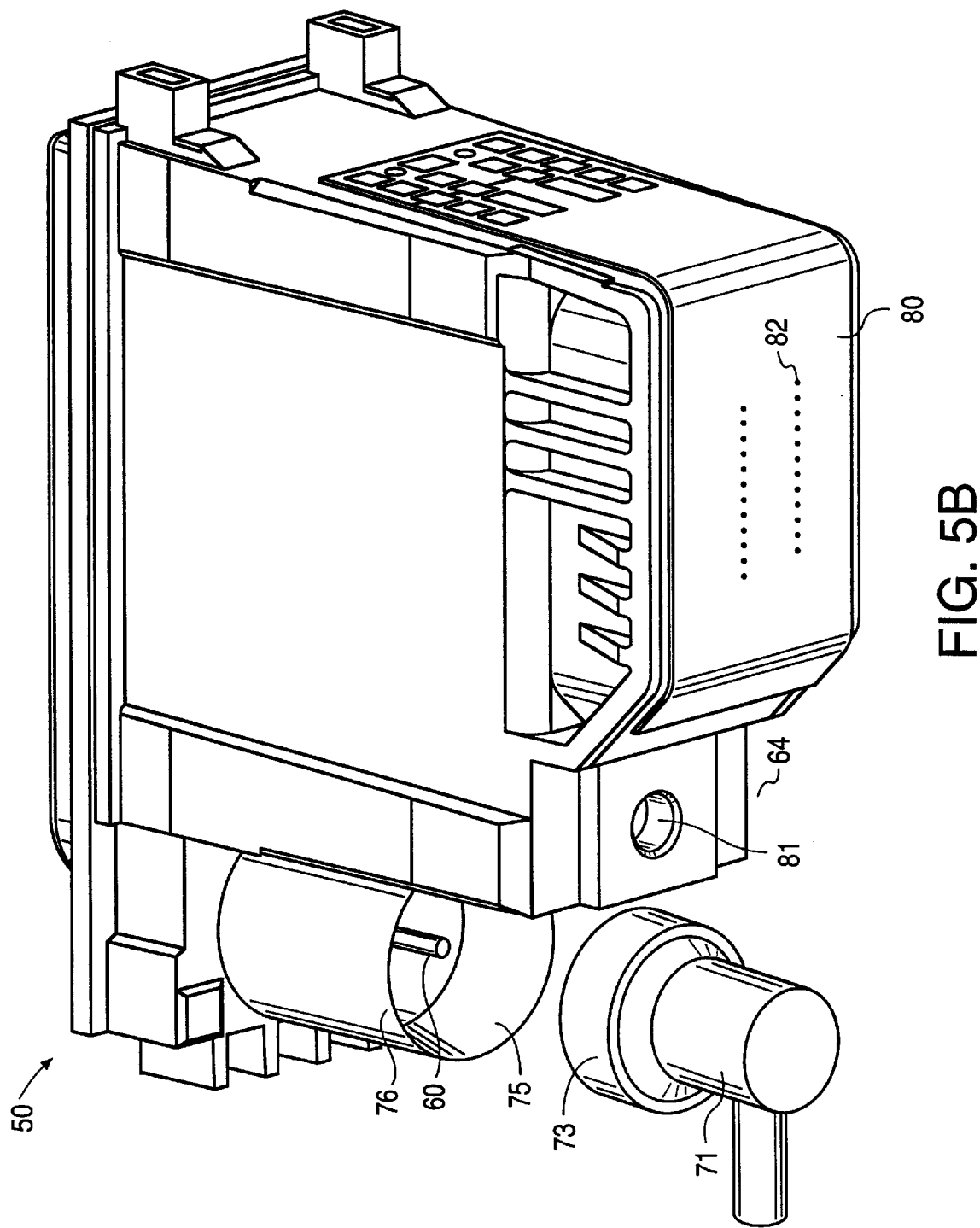

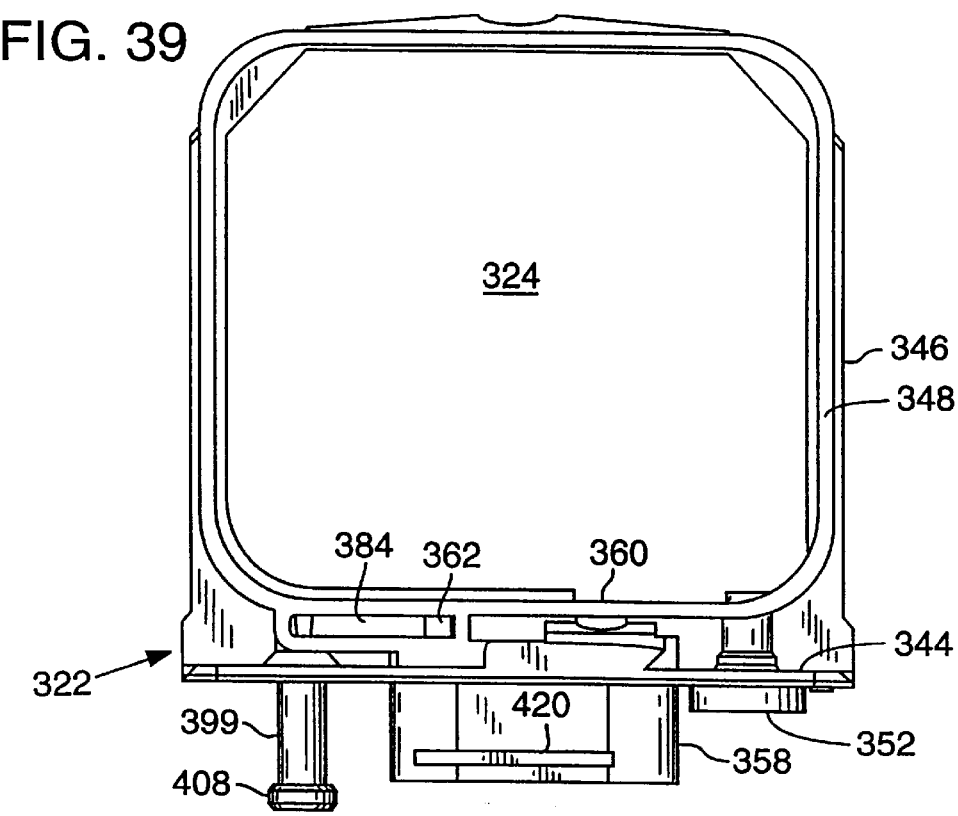
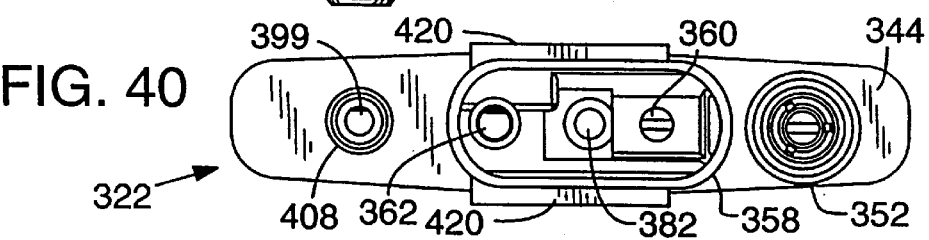
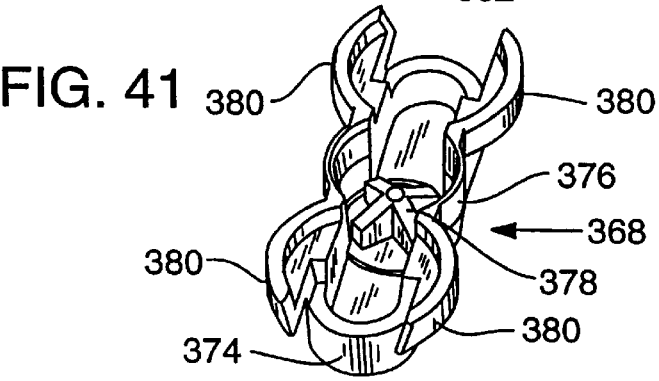
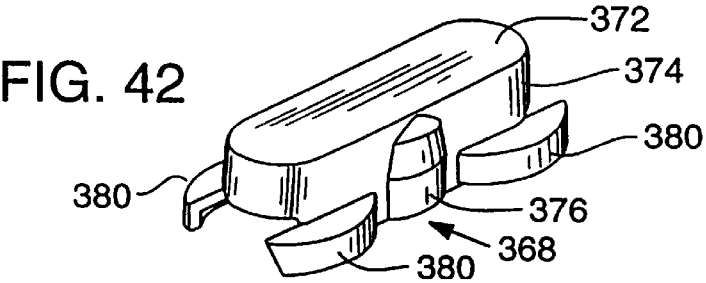

PRINTER USING PRINT CARTRIDGE WITH INTERNAL PRESSURE REGULATOR

CROSS-REFERENCE TO RELATED APPLICATIONS

This application is a continuation-in-part of U.S. patent application Ser. No. 08/550,902, filed Oct. 31, 1995, entitled "Apparatus for Providing Ink to an Ink-Jet Print Head and for Compensating for Entrapped Air" by Norman Pawlowski, Jr. et al., attorney docket No. 1094910, which is a continuation-in-part of U.S. patent application Ser. No. 08/518,847, filed Aug. 24, 1995, entitled "Pressure Regulated Free-Ink Ink-Jet Pen," by Norman Pawlowski, Jr. et al., now U.S. Pat. No. 5,736,992, which is a continuation-in-part of U.S. patent application Ser. No. 08/331,453, filed Oct. 31, 1994, by Norman Pawlowski, Jr. et al., know U.S. Pat. No. 5,583,545.

This is also a continuation-in-part of U.S. application Ser. No. 08/429,915, filed Apr. 27, 1995, entitled "Ink Supply for an Ink-Jet Printer," by James Cameron et al., attorney docket no. 1094053-2.

This application is also a continuation-in-part of U.S. patent application Ser. No. 08/566,821, filed Dec. 4, 1995, entitled "Self-Sealing Fluid Interconnect with Double Sealing Septum," by John Barinaga et al., attorney docket no. 10951195.

FIELD OF THE INVENTION

This invention relates to inkjet printers and, more particularly, to an inkjet printer having a scanning printhead with a stationary ink supply.

BACKGROUND OF THE INVENTION

Inkjet printers are well known. One common type of inkjet printer uses a replaceable print cartridge which contains a printhead and a supply of ink contained within the print cartridge. The print cartridge is not intended to be refillable and, when the initial supply of ink is depleted, the print cartridge is disposed of and a new print cartridge is installed within the scanning carriage. Frequent replacement of the print cartridge results in a relatively high operating cost.

The printhead has a useable life which is significantly longer than the time it takes to deplete the ink within the print cartridge. It is known to refill print cartridges intermittently by creating an opening through the print cartridge and manually refilling the print cartridge with ink. However, these refilling methods require manipulation by the user and are undesirable for various other reasons.

It is also known to provide an external, stationary ink reservoir connected to the scanning print cartridge via a tube; however, these types of printing systems have various drawbacks including undesirable fluctuations in ink pressure in the print cartridge, an unreliable and complex fluid seal between the print cartridge and the external ink supply, increased printer size due to the external ink supply's connection to the print cartridge, blockage in the ink delivery system, air accumulation in the tubes leading to the print cartridge, leakage of ink, high cost, and complexity.

What is needed is an improved inkjet printer with a replaceable print cartridge and a separate ink delivery system connectable to the print cartridge.

SUMMARY

In the preferred embodiment, an inkjet printer includes a replaceable print cartridge which is inserted into a scanning carriage. An ink tube extends from the scanning carriage to a separate ink supply located within the printer. A fluid interconnect on the print cartridge connects to a fluid interconnect on the carriage when the print cartridge is inserted into the carriage to complete the fluid connection between the external ink supply and the print cartridge. In one embodiment, the fluid interconnection is made between the print cartridge and the ink tube simply by placing the print cartridge into a stall in the scanning carriage. A pressure regulator, which may be internal or external to the print cartridge, regulates the flow of ink from the external ink supply to the print cartridge. The external ink supply may be pressurized or non-pressurized.

BRIEF DESCRIPTION OF THE DRAWINGS

FIG. 3A illustrates the preferred carriage with one embodiment of the print cartridge in cross-section.

FIG. 5B is another perspective view of the preferred print cartridge and fluid interconnect of the carriage.

FIG. 39 is a side view of the chassis of the ink supply of FIG. 37.

FIG. 40 is a bottom view of the chassis of FIG. 39.

FIG. 41 is a top perspective view of the pressure plate of the ink supply of FIG. 37.

FIG. 42 is a bottom perspective view of the pressure plate of FIG. 41.

DETAILED DESCRIPTION OF THE PREFERRED EMBODIMENTS

Overview of Printer Embodiments

Figure 1A:
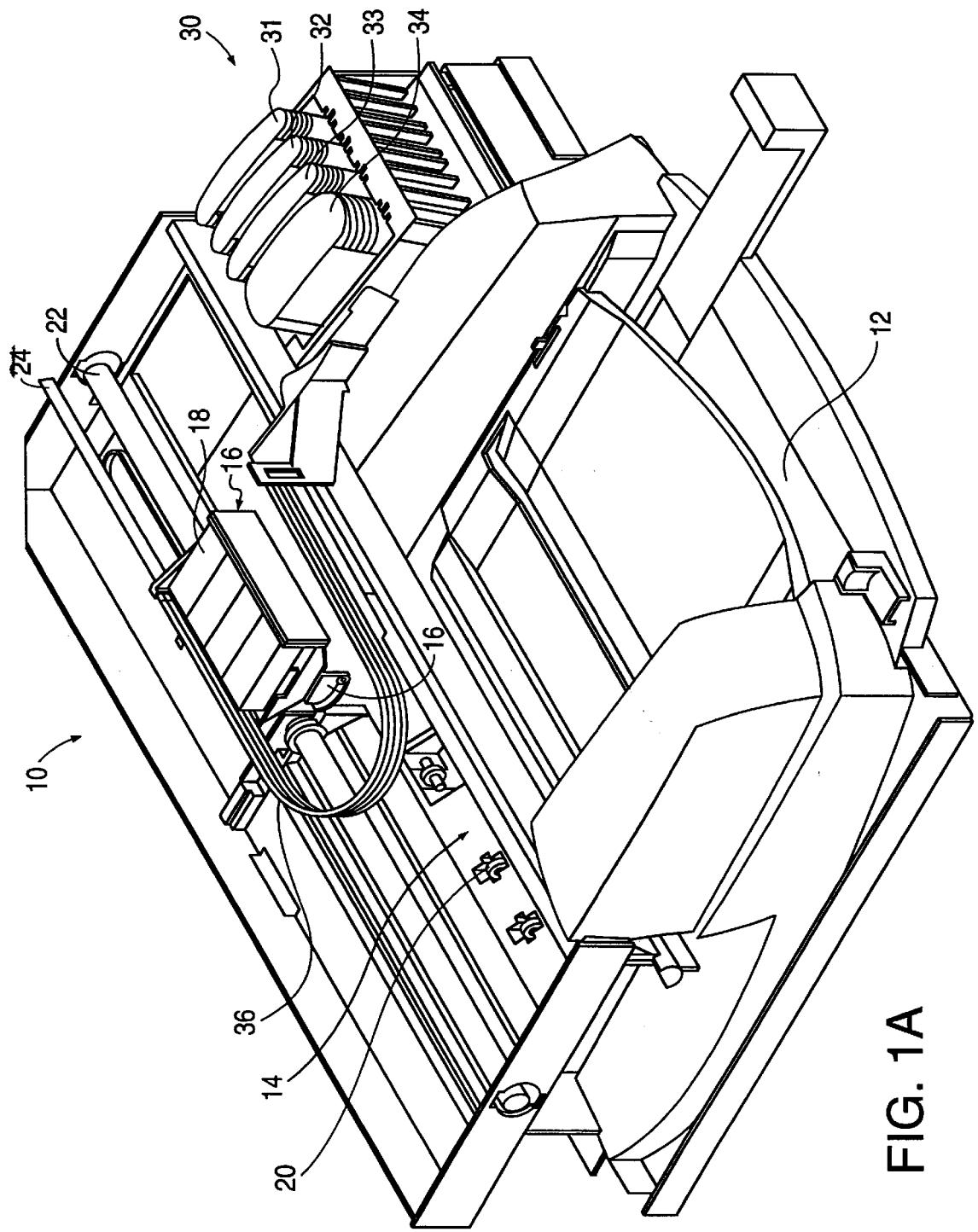
FIG. 1A is a perspective view of one embodiment of an inkjet printer incorporating the present invention.

FIG. 1A is a perspective view of one embodiment of an inkjet printer 10, with its cover removed, incorporating various inventive features. Generally, printer 10 includes a tray 12 for holding virgin paper. When a printing operation is initiated, a sheet of paper from tray 12 is fed into printer 10 using a sheet feeder, then brought around in a U direction to now travel in the opposite direction toward tray 12. The sheet is stopped in a print zone 14, and a scanning carriage 16, containing one or more print cartridges 18, is then scanned across the sheet for printing a swath of ink thereon.

After a single scan or multiple scans, the sheet is then incrementally shifted using a conventional stepper motor and feed rollers 20 to a next position within print zone 14, and carriage 16 again scans across the sheet for printing a next swath of ink. When the printing on the sheet is complete, the sheet is forwarded to a position above tray 12, held in that position to ensure the ink is dry, and then released.

Alternative embodiment printers include those with an output tray located at the back of printer 10, where the sheet of paper is fed through the print zone 14 without being fed back in a U direction.

The carriage 16 scanning mechanism may be conventional and generally includes a slide rod 22, along which carriage 16 slides, and a coded strip 24 which is optically detected by a photodetector in carriage 16 for precisely positioning carriage 16. A stepper motor (not shown), connected to carriage 16 using a conventional drive belt and pulley arrangement, is used for transporting carriage 16 across print zone 14.

The novel features of inkjet printer 10 and the other inkjet printers described in this specification relate to the ink delivery system for providing ink to the print cartridges 18 and ultimately to the ink ejection chambers in the printheads. This ink delivery system includes an off-axis ink supply station 30 containing replaceable ink supply cartridges 31, 32, 33, and 34, which may be pressurized or at atmospheric pressure. For color printers, there will typically be a separate ink supply cartridge for black ink, yellow ink, magenta ink, and cyan ink.

Four tubes 36 carry ink from the four replaceable ink supply cartridges 31–34 to the four print cartridges 18.

Various embodiments of the off-axis ink supply, scanning carriage, and print cartridges will be described herein.

Figure 1B:
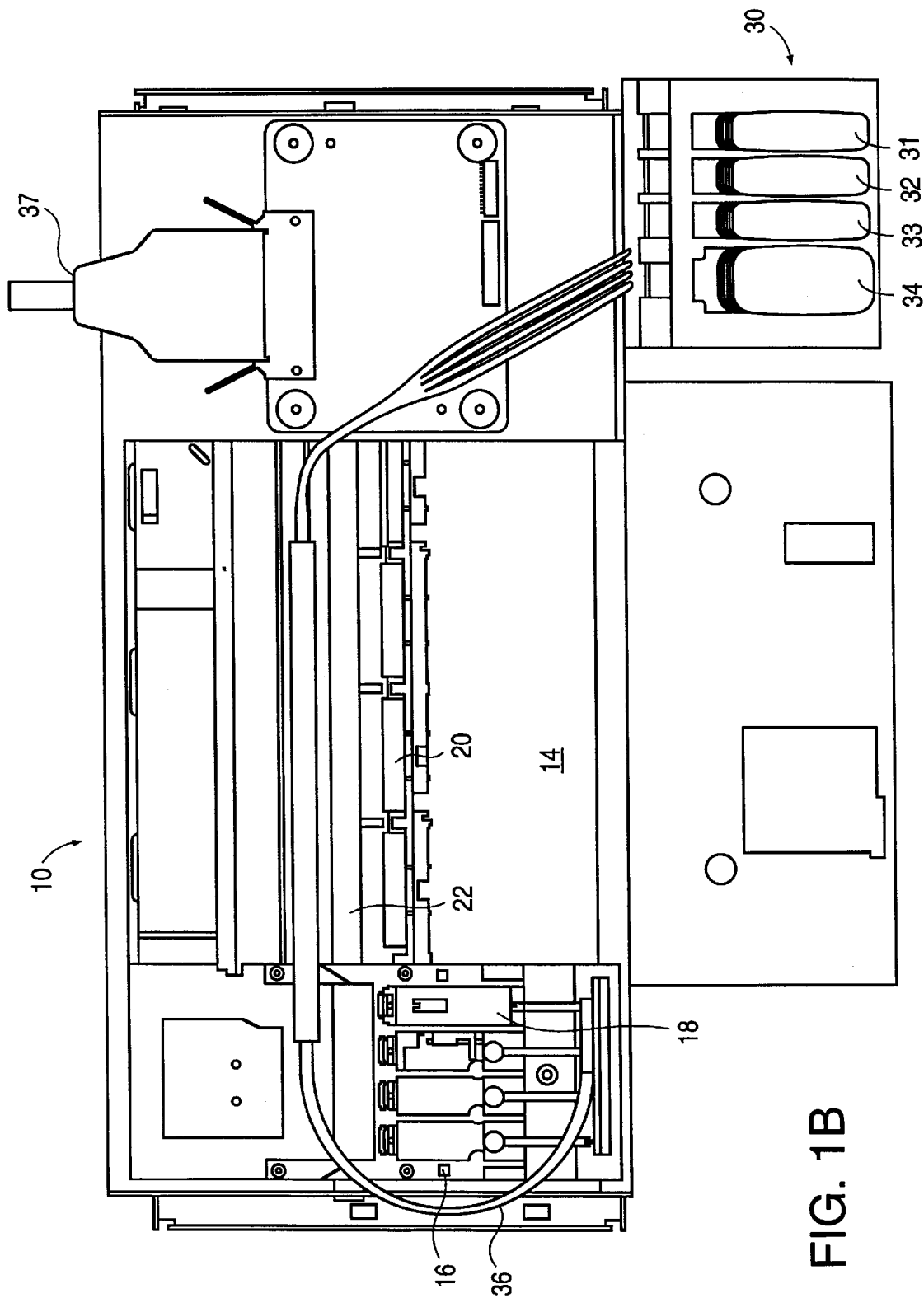
FIG. 1B is a top down view of another inkjet printer incorporating the present invention.

FIG. 1B is a top down view of another printer 10 very similar to that shown in FIG. 1A, but with the paper tray removed. An electrical connector 37 is shown connected between printer 10 and a personal computer. Elements throughout the various figures identified with the same numerals may be identical.

Figure 2:
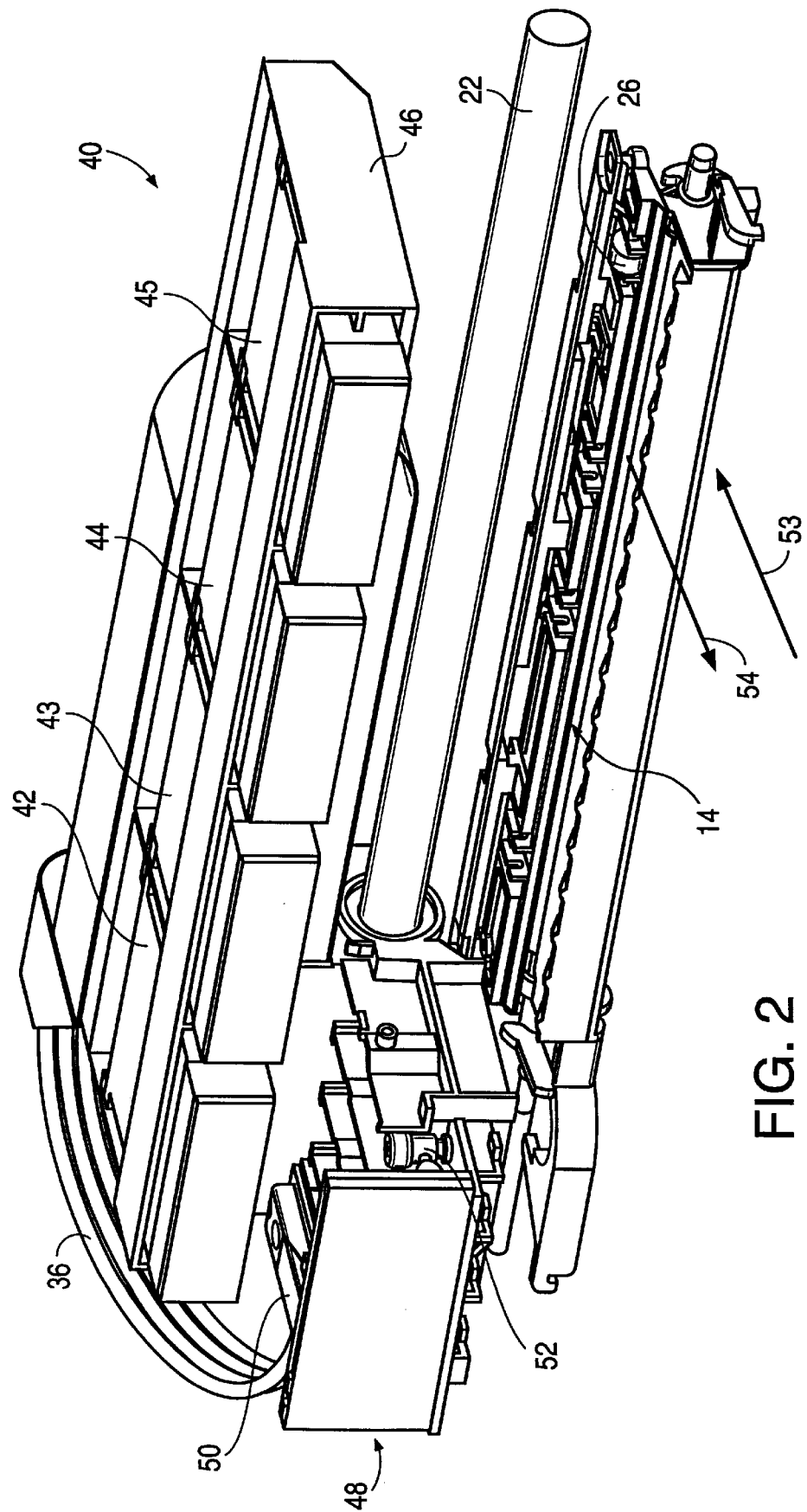
FIG. 2 is a perspective view of the ink delivery system and carriage of another embodiment inkjet printer incorporating the present invention.

FIG. 2 illustrates the ink delivery system of an alternative embodiment printer 40. In this embodiment, four replaceable ink supply cartridges 42–45 are shown installed in a fixed station 46 above a scanning carriage 48. This particular location of station 46 and the horizontal arrangement of ink supply cartridges 42–45 results in an efficient utilization of available space within printer 40. In another embodiment, station 46 may be located virtually anywhere within printer 40.

A single print cartridge 50 is shown installed in carriage 48. Four tubes 36, each connected to an ink supply cartridge 42–45, are in fluid connection with a rubber septum 52 for each of the four stalls in carriage 48. A hollow needle 60 (FIG. 3A) formed as part of each print cartridge 50 is inserted through the rubber septum 52 upon pushing the print cartridge 50 into its associated stall within carriage 48 so that a fluid communication path exists between a particular ink supply cartridge 42–45 and a particular print cartridge 50 for providing a supply of ink to the print cartridge 50.

A sheet of paper enters through the bottom portion of printer 40 in the direction of arrow 53, then guided back in a U direction, and transported through the print zone 14 in the direction of arrow 54. Carriage 48 then scans across print zone 14 for printing on the sheet. In another embodiment, a sheet of paper enters the print zone 14 in the direction of arrow 53.

Elements previously designated and described will not be redundantly described.

Description of Carriage and Print Cartridge Embodiments

FIG. 3A is a perspective view looking up at carriage 48, showing print cartridge 50 and septum 52 in cross-section. This cross-section does not show a regulator valve within print cartridge 50 that regulates pressure by opening and closing hole 65. An opening in the bottom of carriage 48 exposes the printhead location 58 of each print cartridge 50. Carriage electrodes 49 oppose contact pads located on print cartridge 50.

When the aforementioned regulator valve is opened, a hollow needle 60 is in fluid communication with an ink chamber 61 internal to print cartridge 50. The hollow needle 60 extends through a self-sealing slit formed through the center of septum 52. This self-sealing slit is automatically sealed by the resiliency of the rubber septum 52 when needle 60 is removed.

A plastic ink conduit 62 leads from needle 60 to ink chamber 61 via hole 65. Conduit 62 may also be integral to the print cartridge body. Conduit 62 may be glued, heat-staked, ultrasonically welded, or otherwise secured to the print cartridge body.

Ink is provided to carriage 48 by tubes 36 which connect to a plastic manifold 66. Tubes 36 may be formed of Polyvinylidene Chloride (PVDC), such as Saran™, or other suitable plastic. Tubes 36 may also be formed of a very flexible polymer material and dipped in PVDC for reducing air diffusion through the tubes. In the preferred embodiment, non-pressurized ink tubes 36 have an internal diameter between approximately 1.5–2.5 mm, while pressurized ink tubes 36 have an internal diameter between approximately 1–1.5 mm. Manifold 66 provides several 90° redirections of ink flow. Such a manifold 66 may not be needed if tubes 36 are sufficiently slender and can be bent without buckling. A pressurized off-axis ink supply (described later) may utilize such slender tubing. An alternative to manifold 66 is a series of elbows molded or formed out of heat formed tubing.

A septum elbow 71 routes ink from manifold 66 to septum 52 and supports septum 52. Septum 52 is affixed to elbow 71 using a crimp cap 73.

A bellows 67 (shown in cross-section) is provided for each of the individual stalls 68 for allowing a degree of x, y, and z movement of septum 52 when needle 60 is inserted into septum 52 to minimize the x, y, and z load on needle 60 and ensure a fluid-tight and air-tight seal around needle 60. Bellows 67 may be formed of butyl rubber, high acn nitrile, or other flexible material with low vapor and air transmission properties. Bellow 67 can be any length and can even be a flexible diaphragm.

A spring 70 urges septum 52 upward. This allows septum 52 to take up z tolerances, minimizes the load on needle 60, and ensures a tight seal around needle 60.

Slots 72 formed on each of the stalls 68 in carriage 48 align with tabs on each print cartridge 50 to restrict movement of the print cartridge 50 within the stall 68.

An air vent 74 formed in the top of print cartridge 50 is used by a pressure regulator in print cartridge 50, to be described later. In an alternative embodiment, a separate regulator may be connected between the off-axis ink supply and each print cartridge 50.

Figure 3B:
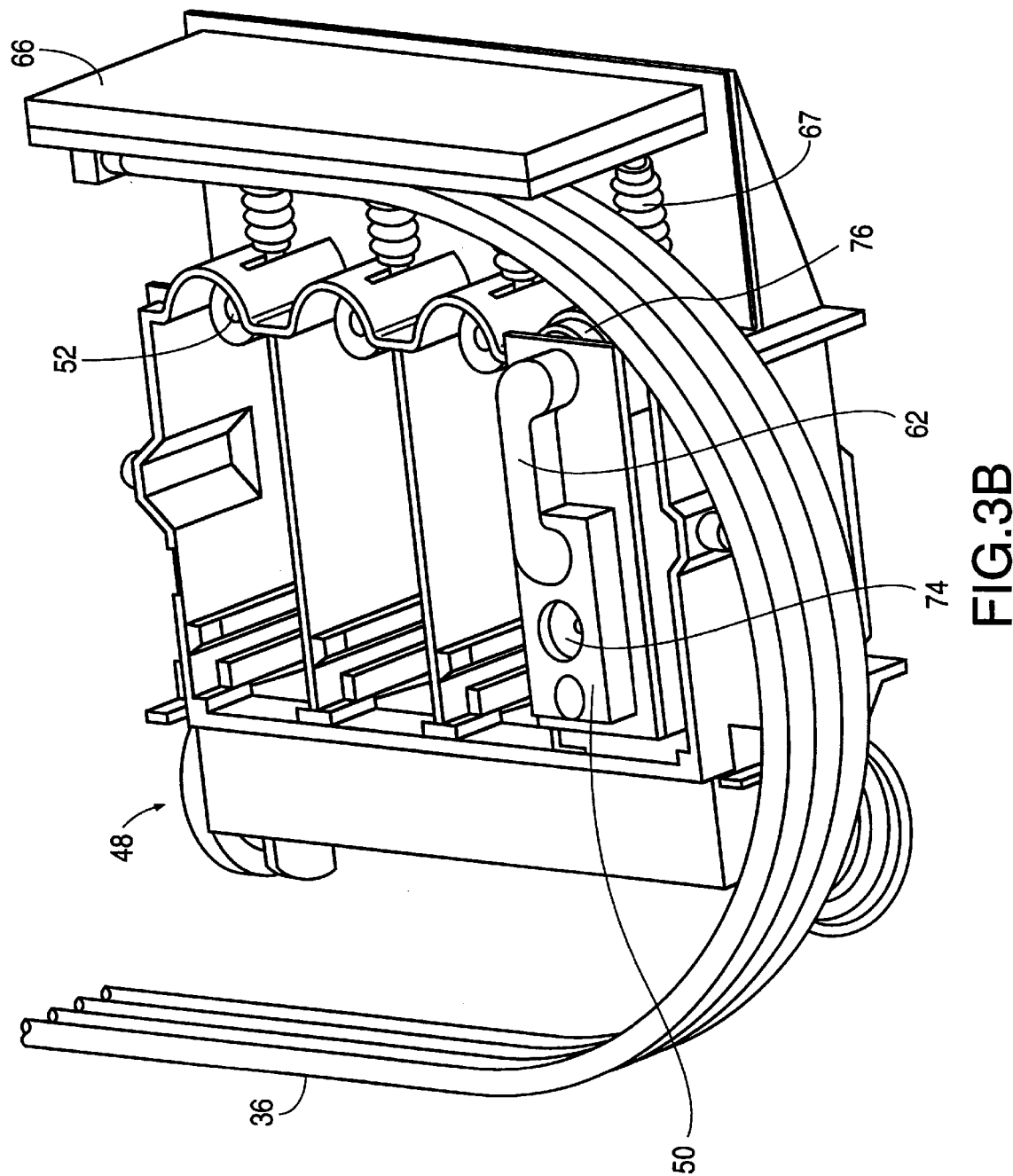
FIG. 3B is a perspective view looking down on a carriage with one print cartridge installed.

FIG. 3B is a perspective view of carriage 48 looking down on carriage 48 and showing one print cartridge 50 installed.

In other embodiments, shown in FIGS. 3C–3F, bellows 67 is replaced with a U-shaped, circular, or straight flexible tube.

Figure 3C:
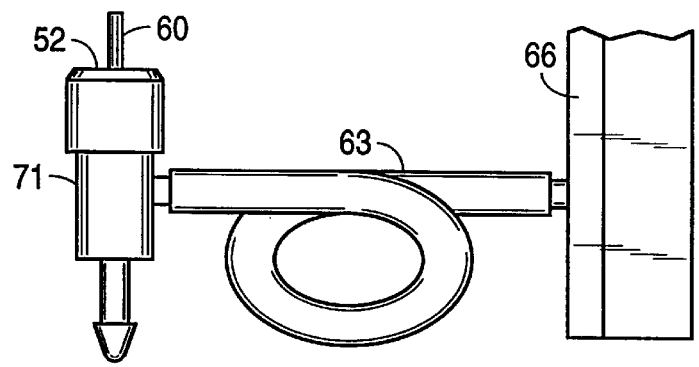
FIG. 3C illustrates the use of a flexible tube connected to a rigid elbow member and to a manifold.

FIG. 3C illustrates a circular flexible tube 63 connected between elbow 71 and manifold 66.

Figure 3D:
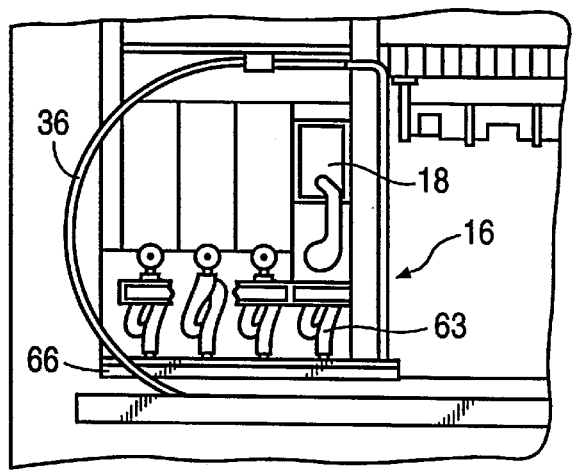
FIG. 3D is a top down view of a carriage incorporating the flexible tube of FIG. 3C.

FIG. 3D is a top down view of the carriage 16 incorporating tube 63.

Figure 3E:
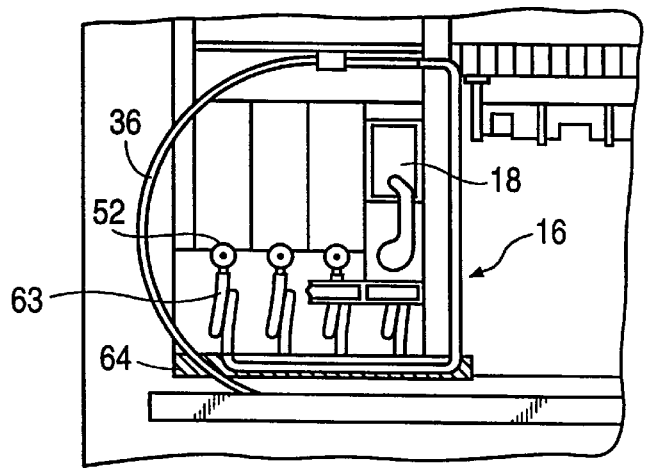
FIG. 3E is a top down view of a carriage without a manifold and incorporating a flexible tube connected to a rigid elbow member.

In another embodiment, shown in FIG. 3E, manifold 66 is deleted, and tubes 63 are connected to (or are part of) tube 36. A plastic guide 64 may be used to guide the tubes 63.

Figure 3F:
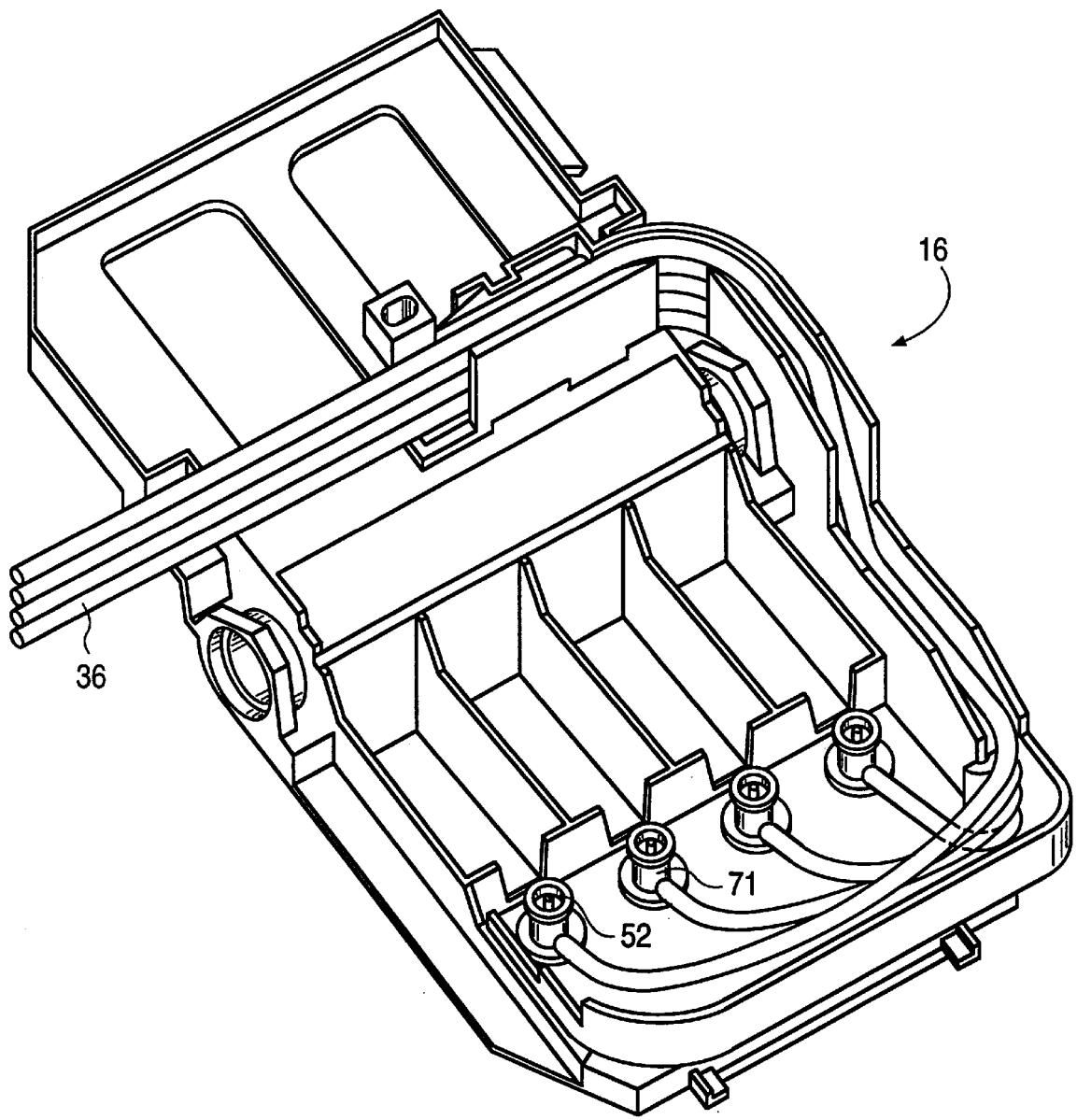
FIG. 3F is a perspective view of a carriage without a manifold and incorporating a flexible tube connected to a rigid elbow member.

In FIG. 3F, the tubes 36 are directly connected to the rigid plastic elbow 71 supporting septum 52 without being coiled.

If desired, the print cartridges can be secured within the scanning carriage by individual latches, which may be manually operated or spring loaded, where the latches press down on a tab or a corner of the print cartridge. In another embodiment, a single latch, such as a hinged bar, secures all four print cartridges in place within the carriage.

Figure 4:
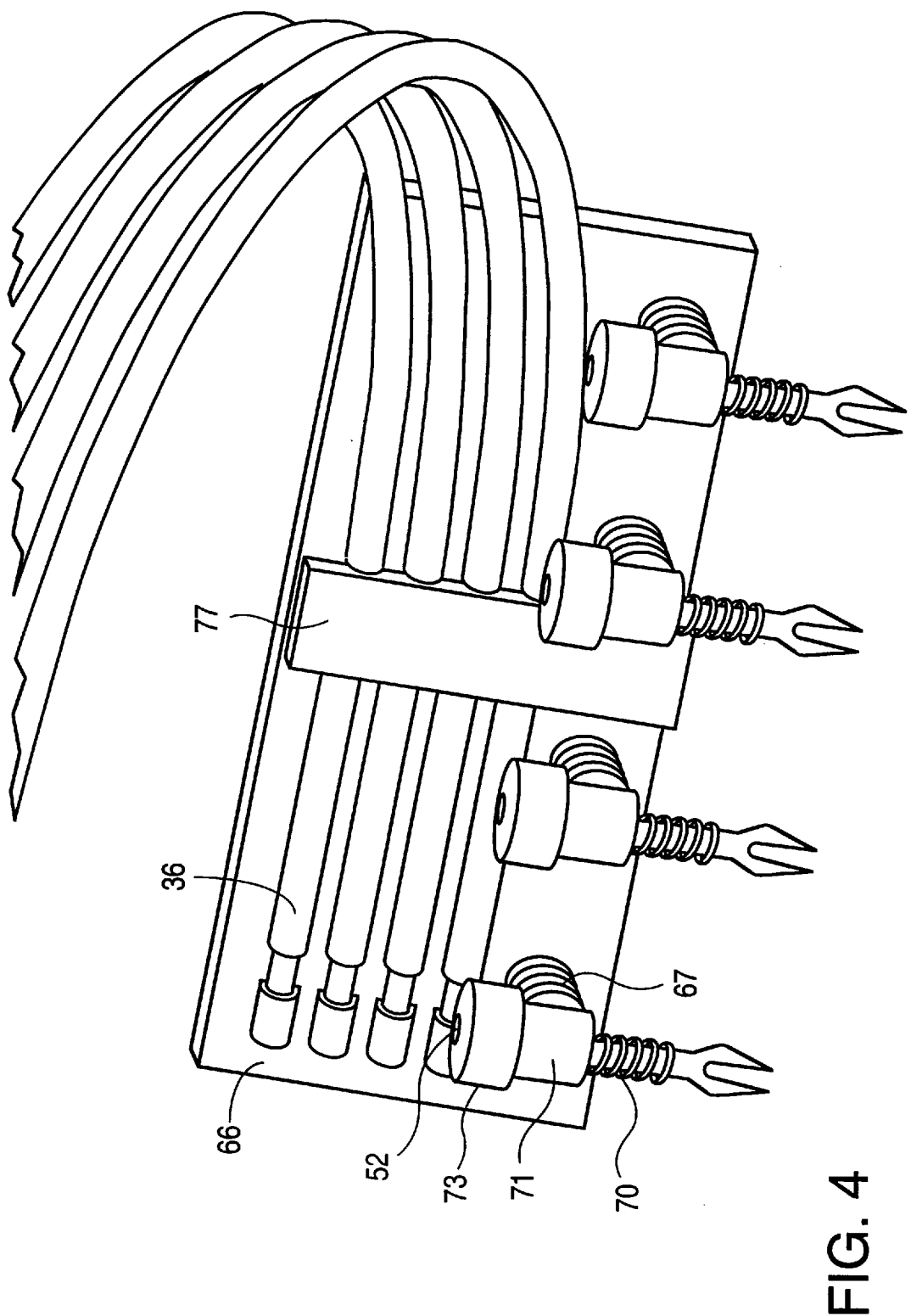
FIG. 4 is a detailed view of the interface between the flexible tubes connected to the external ink supply and the fluid interconnect located on the carriage.

FIG. 4 is a detailed view of manifold 66, tubes 36, crimp cap 73, septum 52, septum elbow 71, spring 70, and bellows 67 described with respect to FIG. 3A. A stress reliever 77 for tubes 36 is also shown.

Figure 5A:
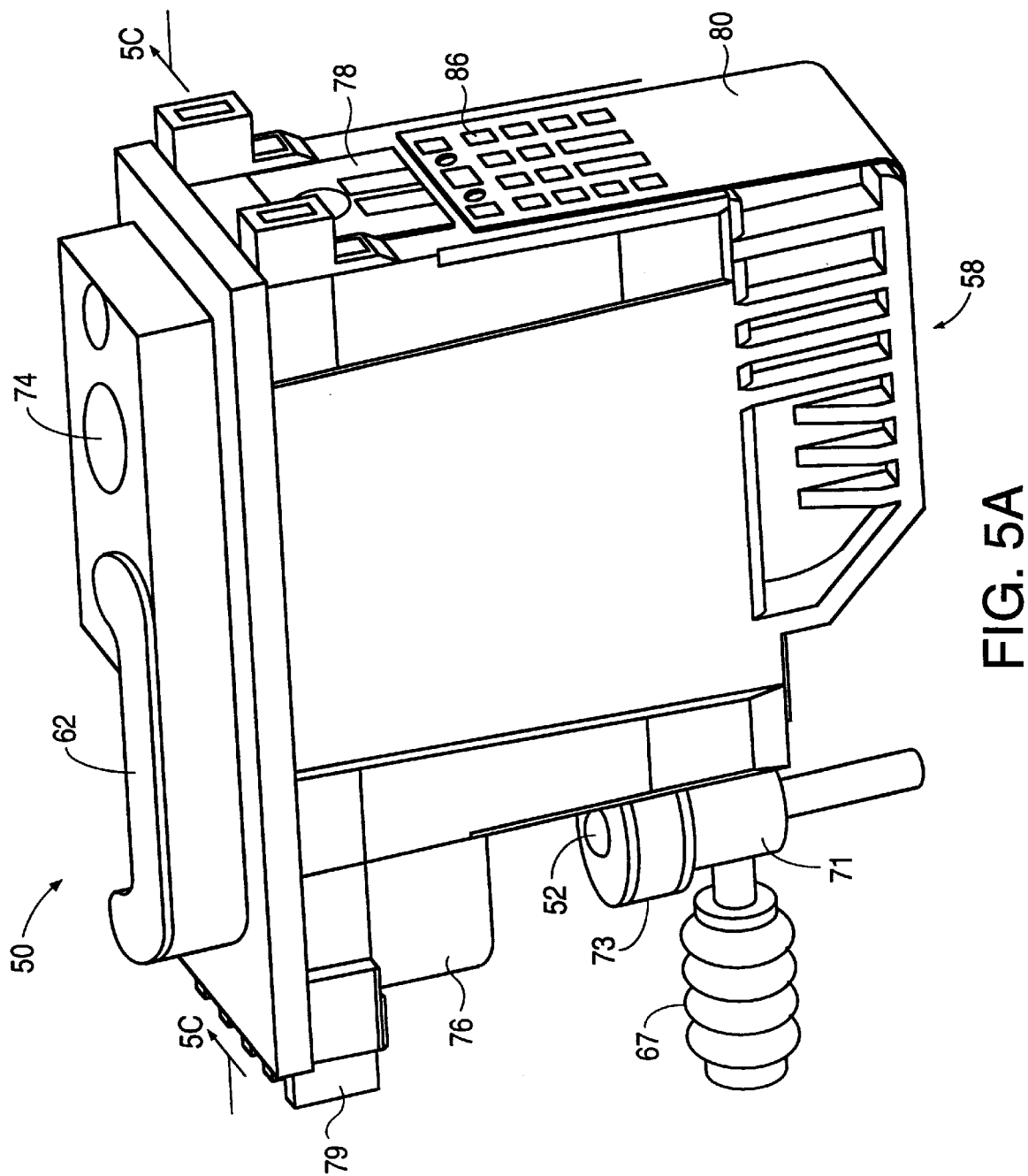
FIG. 5A is a perspective view of the preferred print cartridge and the fluid interconnect portion of the carriage.

FIG. 5A is a perspective view of one embodiment of print cartridge 50. A shroud 76 (also shown in FIG. 3B) surrounds needle 60 (obscured by shroud 76) to prevent inadvertent contact with needle 60 and also to help align septum 52 (FIG. 3A) with needle 60 when installing print cartridge 50 in carriage 48.

Coded tabs 79 align with coded slots in the carriage stalls 68 to ensure the proper color print cartridge 50 is placed in the proper stall 68. In another embodiment, coded tabs 79 are located on shroud 79.

A flexible tape 80 containing contact pads 86 leading to the printhead substrate is secured to print cartridge 50. These contact pads 86 align with and electrically contact electrodes 49 (FIG. 3A) on carriage 48. Preferably, the electrodes on carriage 48 are resiliently biased toward print cartridge 50 to ensure a reliable contact. Such carriage electrodes are found in U.S. Pat. No. 5,408,746, entitled Datum Formation for Improved Alignment of Multiple Nozzle Members in a Printer, by Jeffrey Thoman et al., assigned to the present assignee and incorporated herein by reference.

The printhead nozzle array is at location 58. An integrated circuit chip 78 provides feedback to the printer regarding certain parameters of print cartridge 50.

FIG. 5B illustrates the bottom side of print cartridge 50. Two parallel rows of offset nozzles 82 are shown laser ablated through tape 80. An ink fill hole 81 is used to initially fill print cartridge 50 with ink. A stopper (not shown) is intended to permanently seal hole 81 after the initial filling.

Figure 5C:
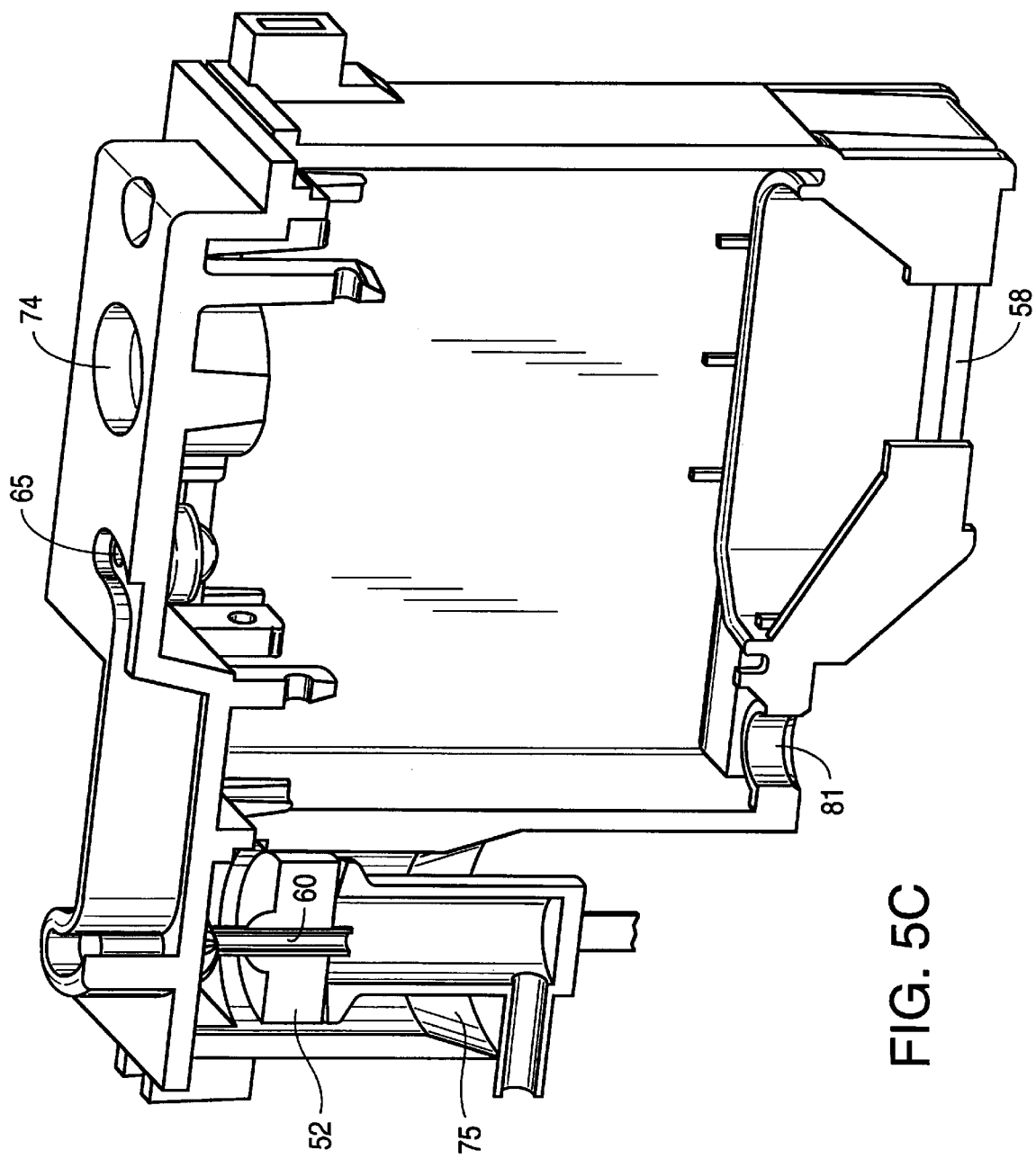
FIG. 5C is a cross-sectional view of the print cartridge of FIG. 5B now connected to the fluid interconnect on the carriage.

FIG. 5C is a cross-sectional view of print cartridge 50, without tape 80, taken along line 5C—5C in FIG. 5A. Shroud 76 is shown having an inner conical or tapered portion 75 to receive septum 52 and center septum 52 with respect to needle 60. In an alternative embodiment, needle 60 is part of a separate subassembly, and shroud 76 is a separate subassembly, for manufacturing ease and to allow color key changing by changing the shroud, assuming the color key tabs are located on the shroud.

The print cartridges and ink supply connections described thus far are down-connect types where the ink connection is made when pressing the print cartridge down into the carriage. This enables a resulting printer to have a very low profile since the ink path does not extend above the print cartridge. In various embodiments shown having the needle extending from the print cartridge, the needle may be replaced with a septum, and the septum on the scanning carriage replaced with a hollow needle.

Figure 6:
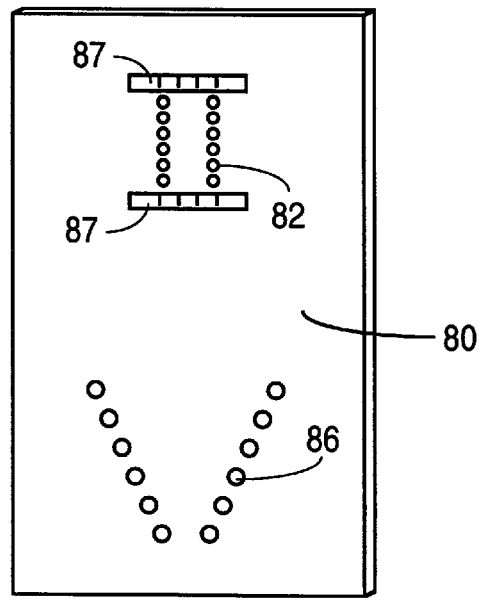
FIG. 6 is a simplified front view of the print head assembly on a preferred print cartridge.
Figure 8:
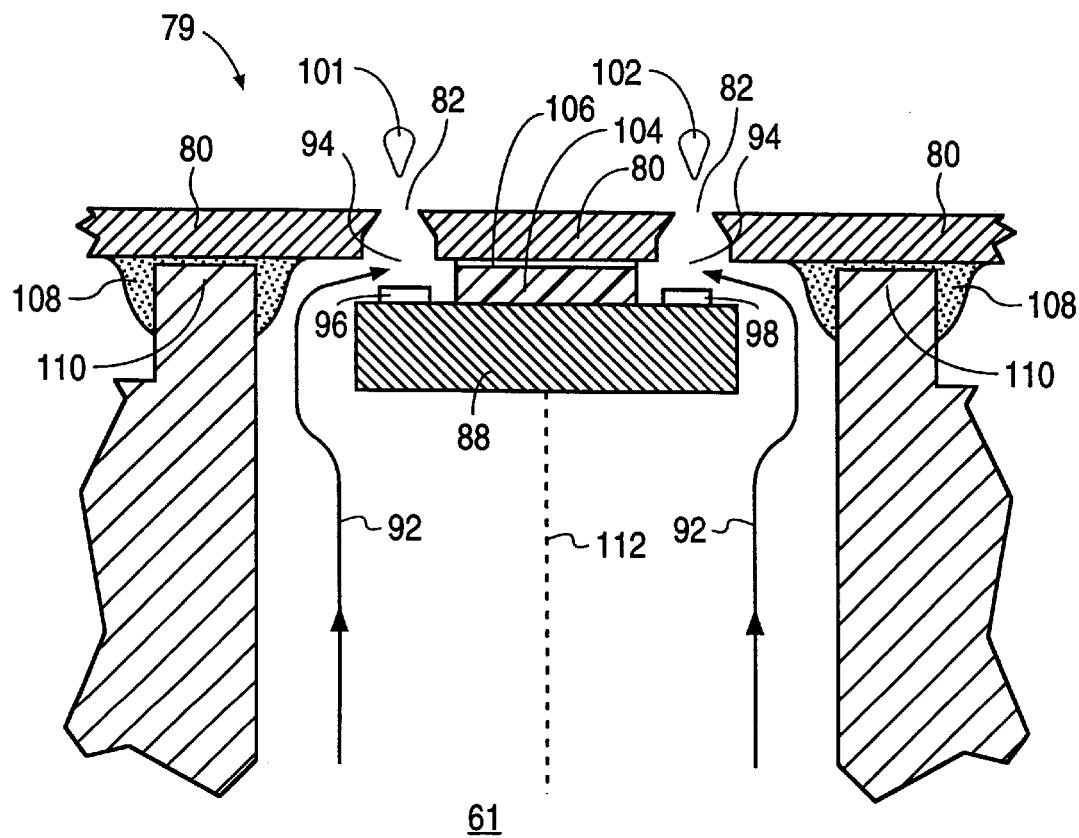
FIG. 8 is a cross-sectional view of the portion of the print cartridge containing the printhead assembly showing the flow of ink to the ink ejection chambers in the printhead.
Figure 7:
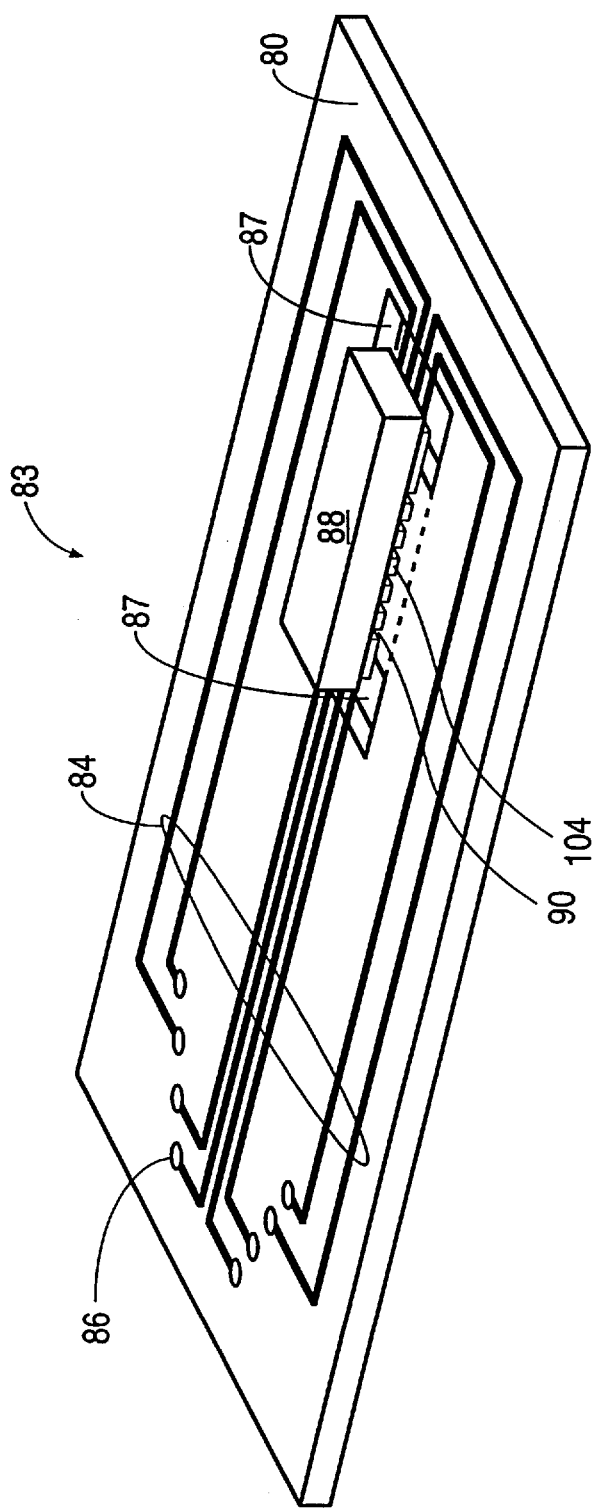
FIG. 7 is a perspective view of the back side of the printhead assembly.

FIGS. 6, 7, and 8 illustrate the basic principles of the printhead assembly 83. Printhead assembly 83 is preferably a flexible polymer tape 80 (FIG. 5B) having nozzles 82 formed therein by laser ablation. Conductors 84 (FIG. 7) are formed on the back of tape 80 and terminate in contact pads 86 for contacting electrodes on carriage 48. The other ends of conductors 84 are bonded through windows 87 to terminals of a substrate 88 (FIG. 7) on which are formed the various ink ejection chambers and ink ejection elements. The ink ejection elements may be heater resistors or piezoelectric elements. The printhead assembly may be similar to that described in U.S. Pat. No. 5,278,584, by Brian Keefe, et al., entitled "Ink Delivery System for an Inkjet Printhead," assigned to the present assignee and incorporated herein by reference. In such a printhead assembly, ink within print cartridge 50 flows around the edges of the rectangular substrate 88 and into ink channels 90 leading to each of the ink ejection chambers.

FIG. 8 illustrates the flow of ink 92 from the ink chamber 61 within print cartridge 50 to ink ejection chambers 94. Energization of the ink ejection elements 96 and 98 cause a droplet of ink 101, 102 to be ejected through the associated nozzles 82. A photoresist barrier layer 104 defines the ink channels and chambers, and an adhesive layer 106 affixes the flexible tape 80 to barrier layer 104. Another adhesive 108 provides a seal between tape 80 and the plastic print cartridge body 110. In one embodiment, a wall 112 separates the ink flow paths around the two edges of substrate 88, and a different color ink is supplied to each side of wall 112.

The conductor portion of the flexible tape 80 is glued or heat-staked to the print cartridge body 110.

A demultiplexer on substrate 88 demultiplexes the incoming electrical signals applied to contact pads 86 and selectively energizes the various ink ejection elements to eject droplets of ink from nozzles 82 as printhead 79 scans across the print zone. In one embodiment, the dots per inch (dpi) resolution is 300 dpi, and there are 300 nozzles 82. In another embodiment, at least the black ink cartridge prints at a resolution of 600 dpi.

Figure 9B:
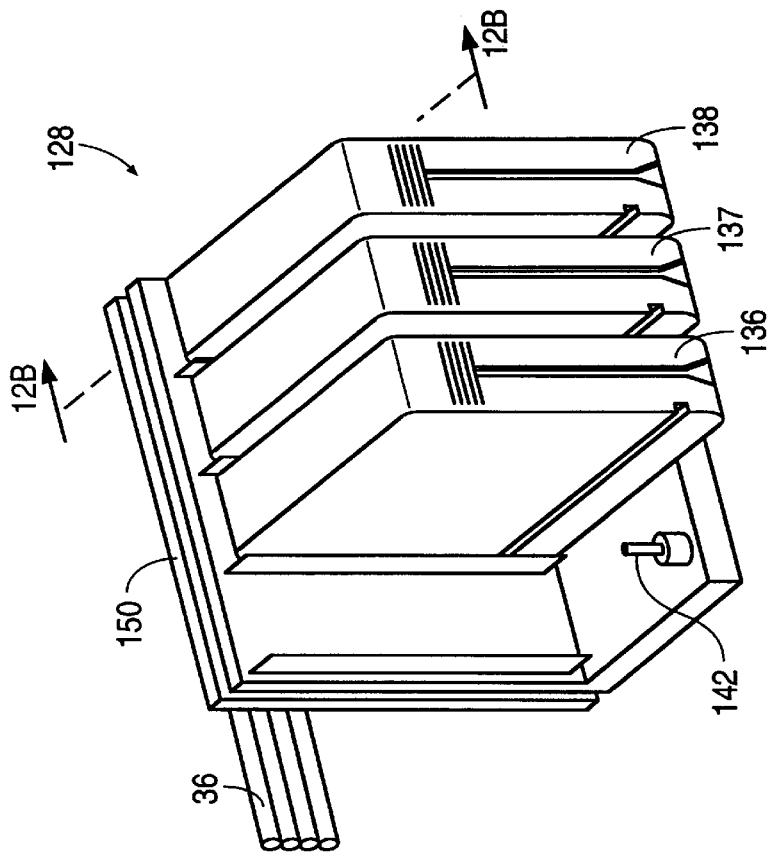
FIG. 9B is an ink supply station having ink supply cartridges installed therein in accordance with one embodiment of the invention.
Figure 9A:
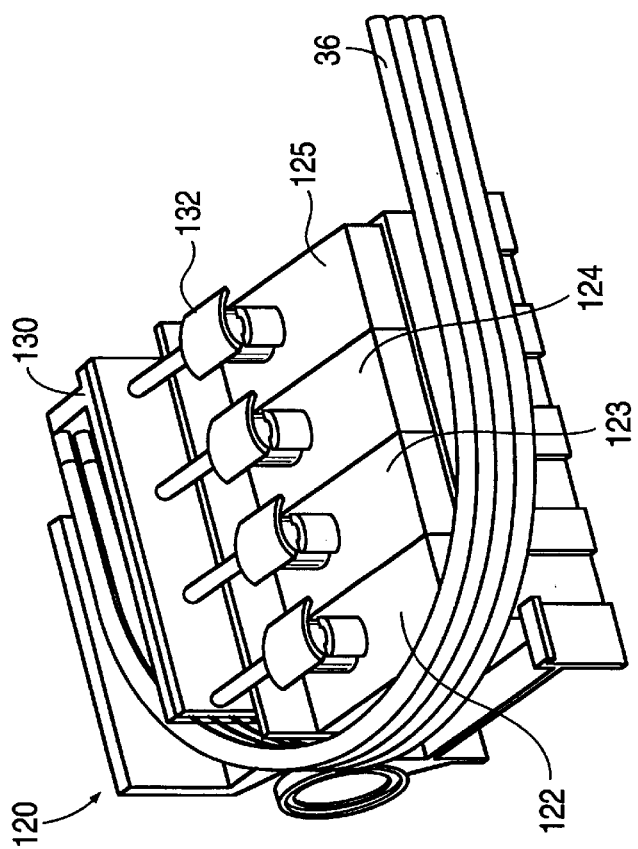
FIG. 9A is a perspective view of a scanning carriage incorporating four print cartridges in accordance with another embodiment of the invention.
Figure 10:
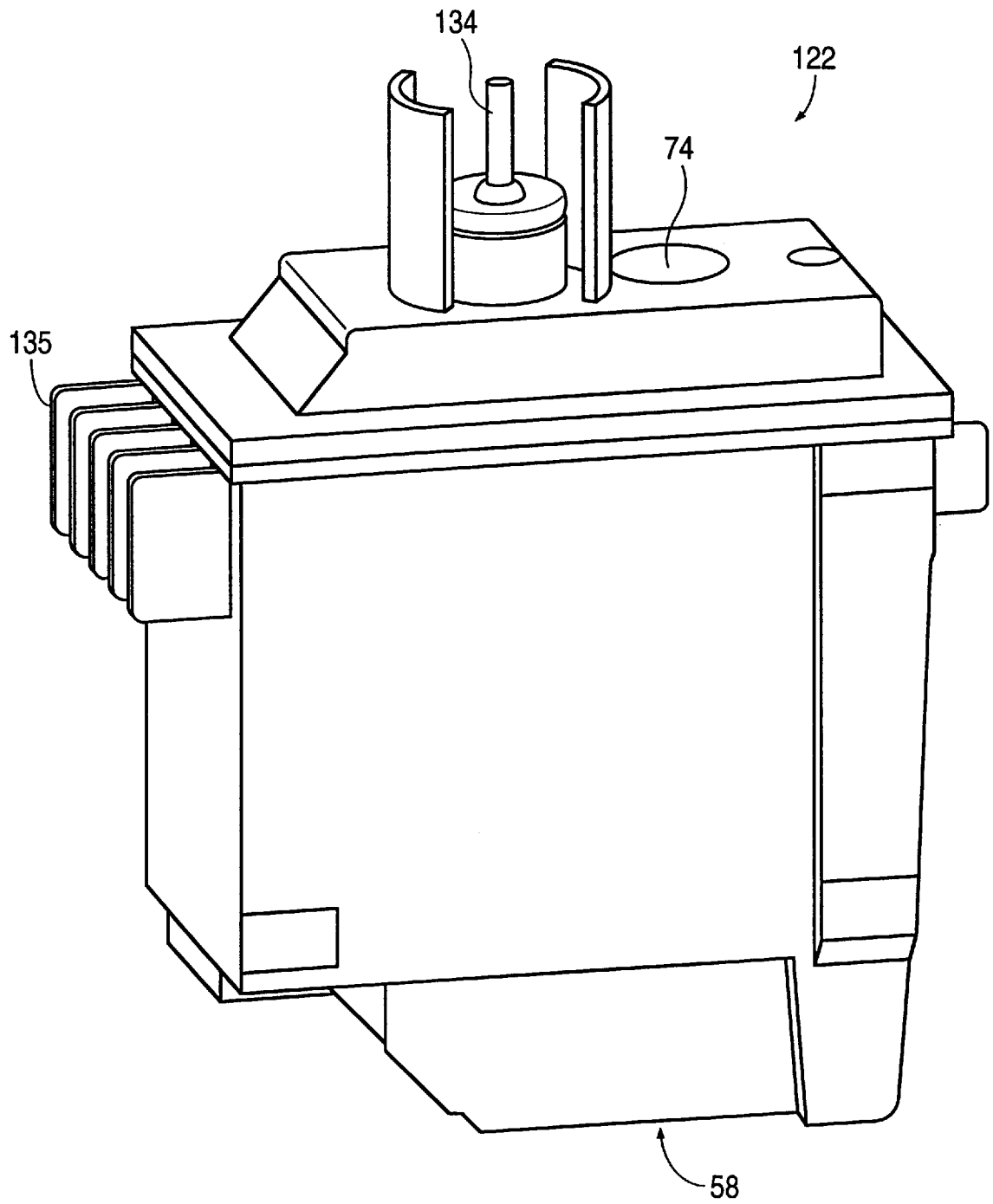
FIG. 10 is a perspective view of another embodiment print cartridge.
Figure 11A:
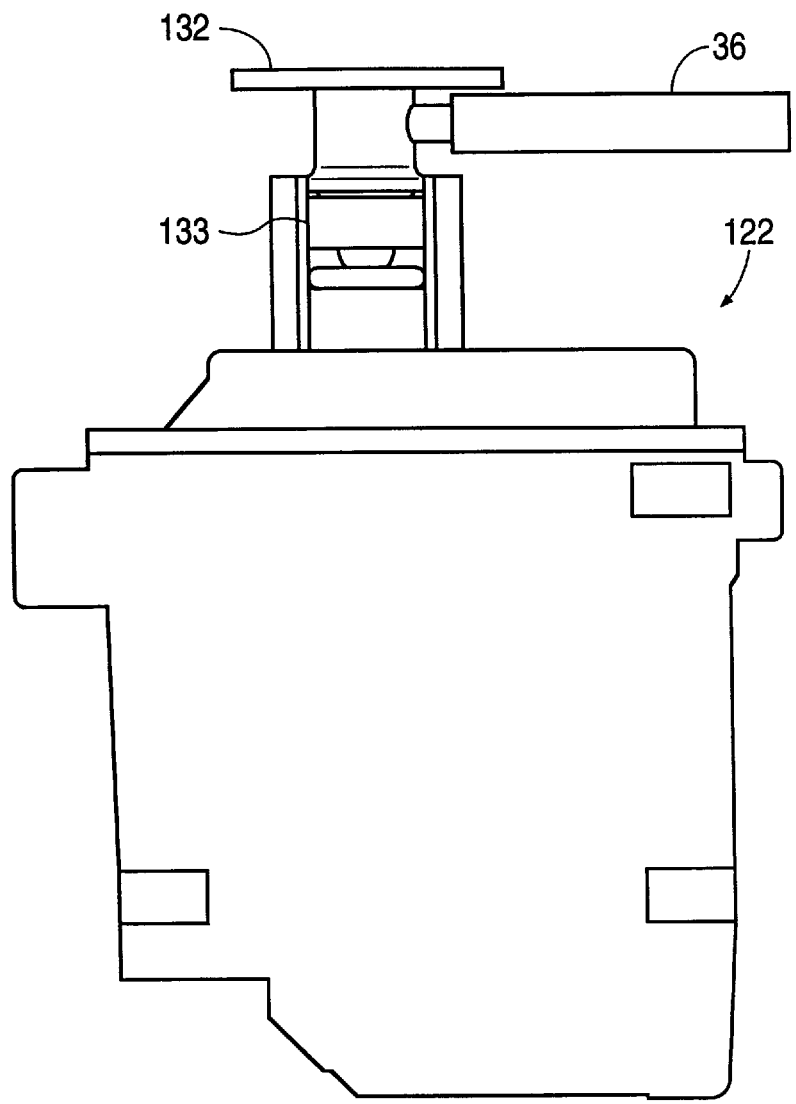
FIG. 11A is a side view of the print cartridge of FIG. 10 connected to a fluid interconnect on the scanning carriage.

FIG. 9A is a perspective view of another embodiment scanning carriage 120 having four print cartridges 122–125 installed. One of the print cartridges 122 is shown in FIG. 10. Tubes 36 from an off-axis ink supply station 128 (FIG. 9B) supply ink to a manifold 130 which redirects the ink to a 90° interface cap 132 for each of print cartridges 122–125. Preferably, each cap 132 is of a color similar to the color ink within each print cartridge 122–125. This embodiment differs from that shown in FIG. 3A in that the ink is coupled to print cartridges 122–125 by pressing a septum 133 (FIG. 11) down onto a hollow needle 134 (FIG. 10) extending from the top of the print cartridge 122, rather than pressing a needle 60 (FIG. 3A) down into the septum 52 (FIG. 3A). Also shown in FIG. 10 are air vent 74 for an internal pressure regulator, coded tabs 135 for ensuring the proper color print cartridge is installed in the proper carriage stall, and the location 58 of the printhead.

Figures 12A, 12B:
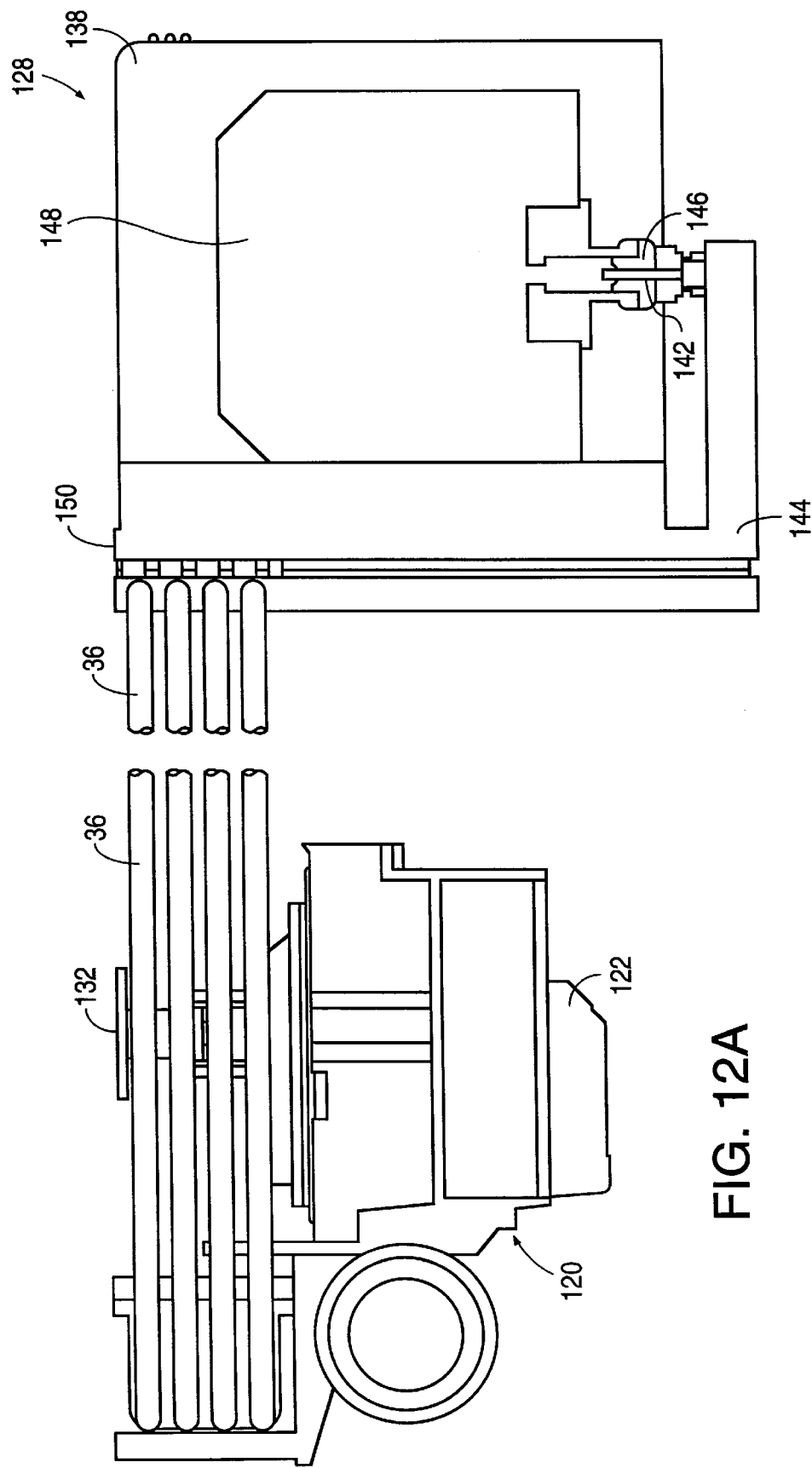
FIG. 12A is a side view of the carriage of FIG. 9A.
FIG. 12B is a side view in partial cross-section of the ink supply station in FIG. 9B.
Figure 12C:
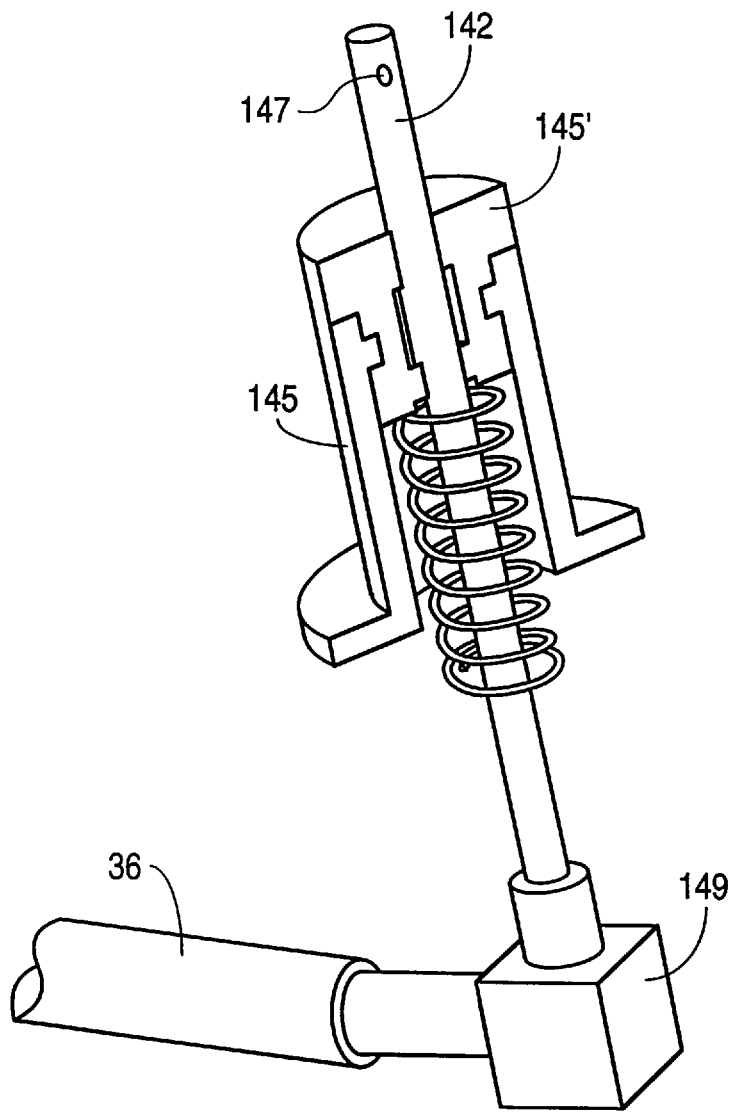
FIG. 12C is a detailed view of the fluid interconnect portion located on the ink supply station for connection to an ink supply cartridge.

In the particular embodiment shown in FIG. 9B, only three out of the four color ink supply cartridges 136–139 are installed in ink supply station 128. A hollow needle 142 extending from a stall in the ink supply station 128, to be described in greater detail with respect to FIGS. 12B and 12C, is in fluid communication with one of tubes 36. The ink within each of ink supply cartridges 136–139 is at atmospheric pressure, and ink is drawn into each of print cartridges 122–125 by a negative pressure within each print cartridge 122–125 determined by a regulator internal to each print cartridge.

In another embodiment, to be described later, the off-axis ink supply cartridges are pressurized. In both the pressurized and unpressurized ink supply embodiments, the regulator internal to each print cartridge regulates the pressure of ink supplied to the print cartridge.

Figure 11B:
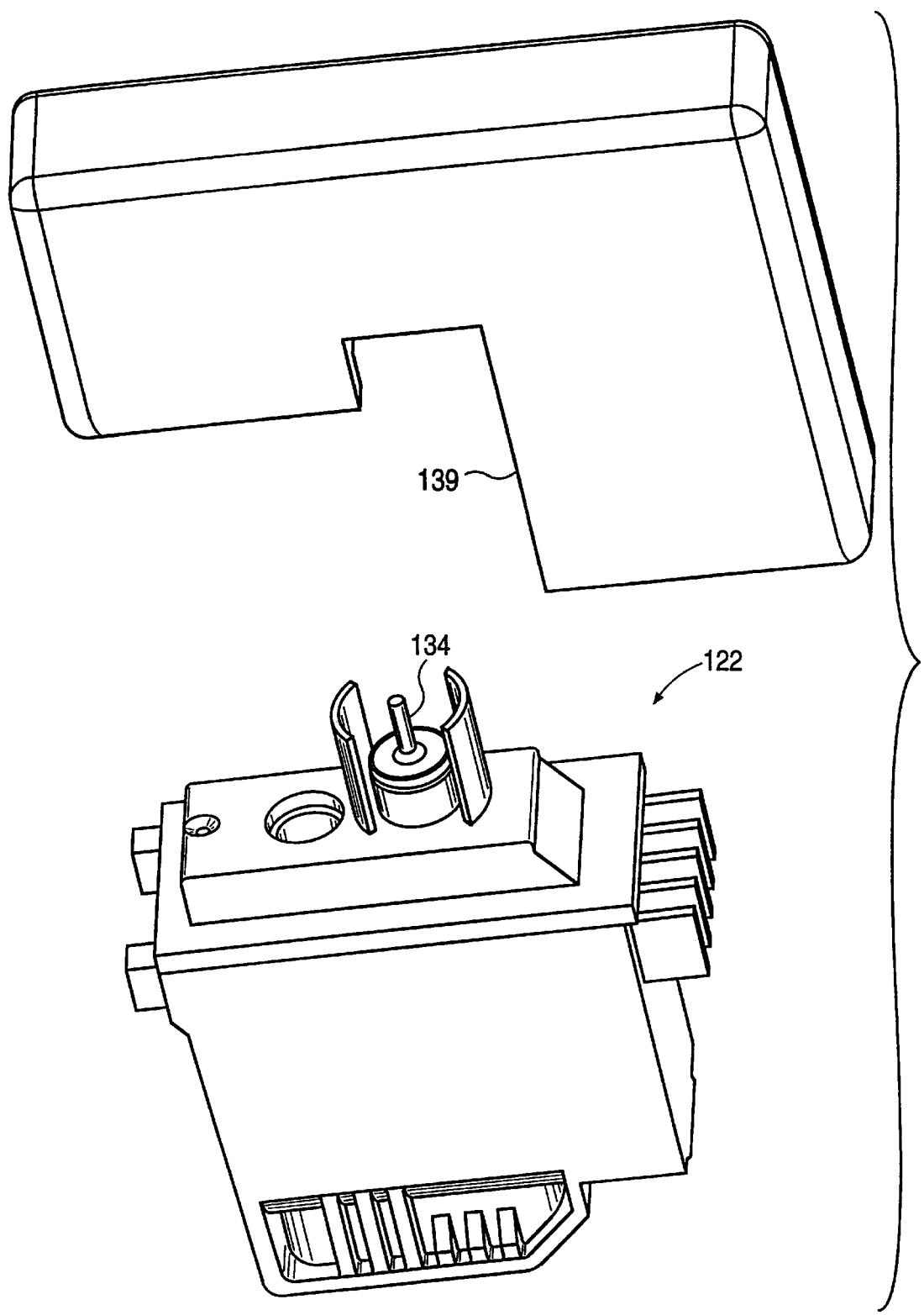
FIG. 11B illustrates a replaceable ink supply cartridge about to engage the ink refill port on the print cartridges of FIGS. 10 and 11A in another embodiment printer.

In another embodiment, shown in FIG. 11B, the print cartridges 122 installed in carriage 120 have ink supply cartridges 139 connected directly to needle 134, so that carriage 120 supports the print cartridges 122 and the ink supply cartridges 139. A septum on the ink supply cartridges 139 connect to needle 134 in a manner similar to that shown in FIG. 11A. The ink supply cartridges 139 are preferably made to have a low profile to achieve a low profile printer.

FIG. 12A is a side view of the carriage 120 and print cartridge assembly of FIG. 9A connected to the off-axis ink supply station 128 via tubes 36.

FIG. 12B is a cross-sectional view of ink supply cartridge 138 in the off-axis ink supply station 128 taken along line 12B—12B in FIG. 9B. As seen, a hollow needle 142 extending in an upward direction from the ink supply support 144 is inserted through a rubber septum 146 on ink supply cartridge 138 to create a fluid communication path between the ink reservoir 148 within ink supply cartridge 138 and one ink conduit within manifold 150. In one embodiment, ink reservoir 148 comprises a collapsible ink bag, to be described later. The ink conduits within manifold 150 are coupled to tubes 36 which connect to the various print cartridges within scanning carriage 120.

FIG. 12C is a detailed view of needle 142 extending from the ink supply station 128. Also shown are a spring-loaded humidor 145, having a rubber portion 145' which covers needle hole 147 when the ink supply cartridge 138 is removed, and a plastic elbow 149 connected to tube 36. Elbows 149 replace manifold 150 (FIG. 12B) in the embodiment of FIG. 12C.

Figure 13:
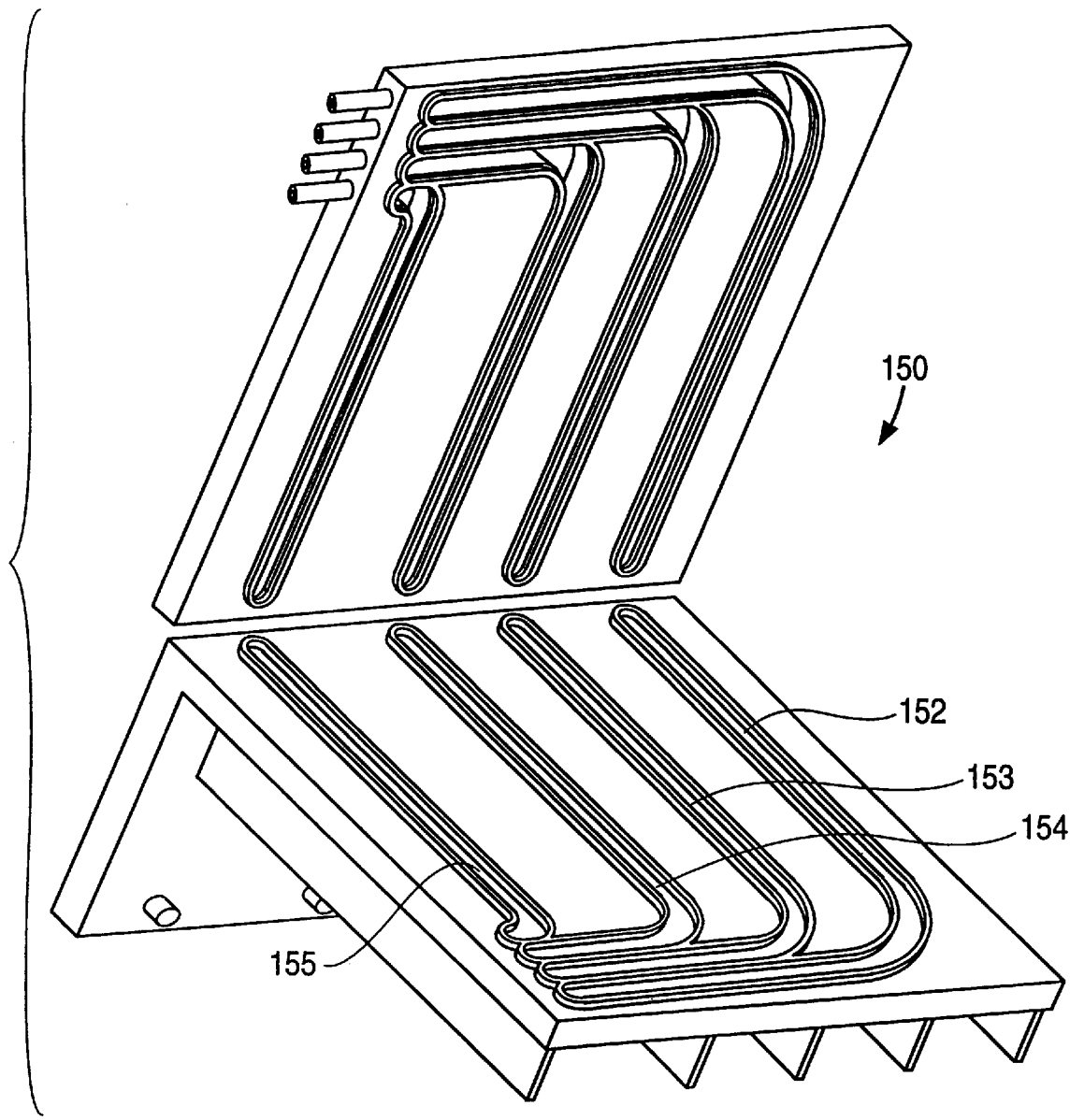
FIG. 13 is a perspective view of the two parts making up the manifold in the ink supply station.

FIG. 13 is a perspective view of manifold 150 in the off-axis ink supply station 128 of FIG. 12B. Manifold 150 is opened to reveal the internal ink conduits 152–155.

Figure 14:
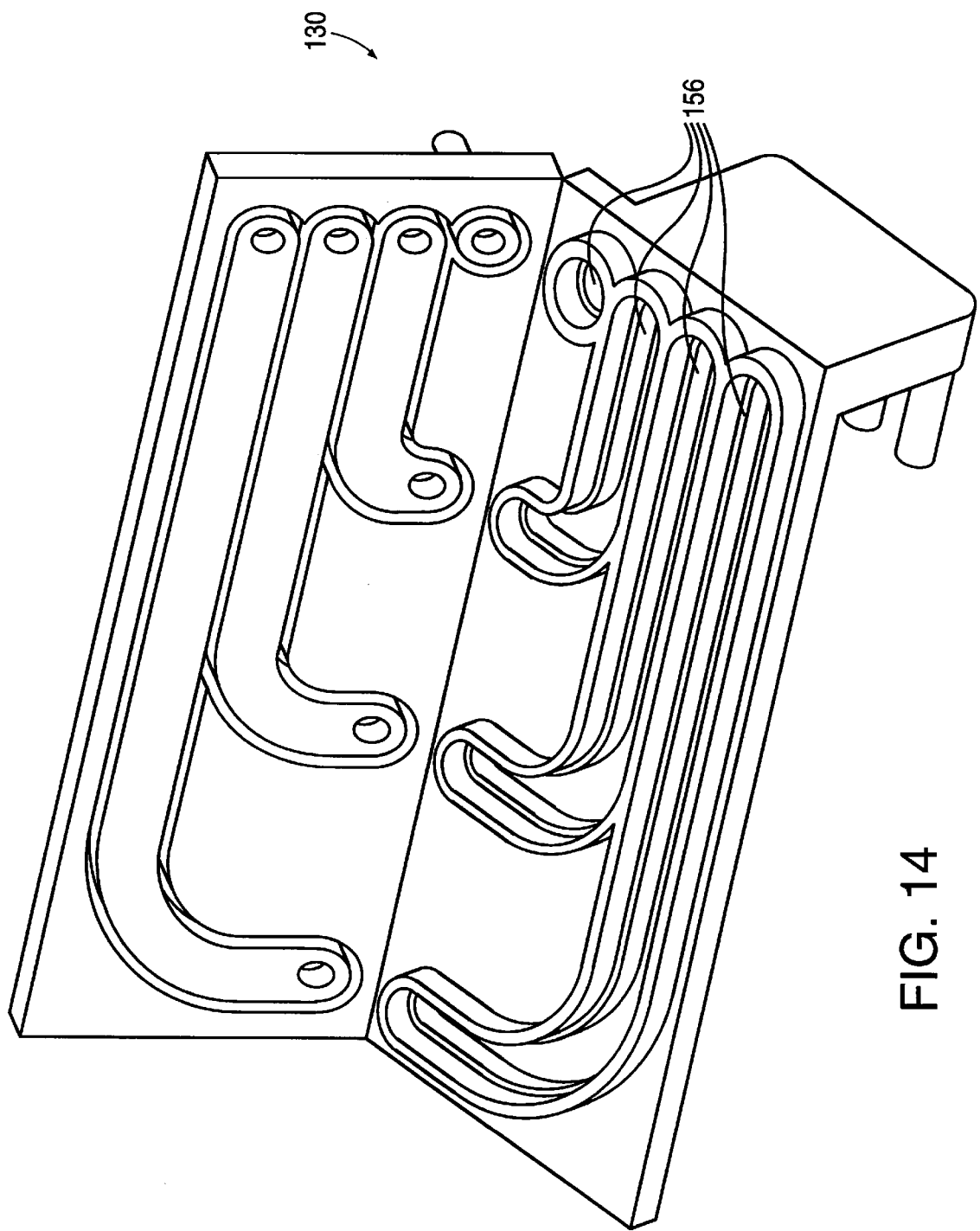
FIG. 14 is a perspective view of the two parts making up the manifold in the scanning carriage.

FIG. 14 is a perspective view of the four ink conduits 156 in manifold 130 on the scanning carriage 120 of FIG. 9A for redirecting the flow of ink from tubes 36 to print cartridges 122–125 in FIG. 9A.

Figure 15:
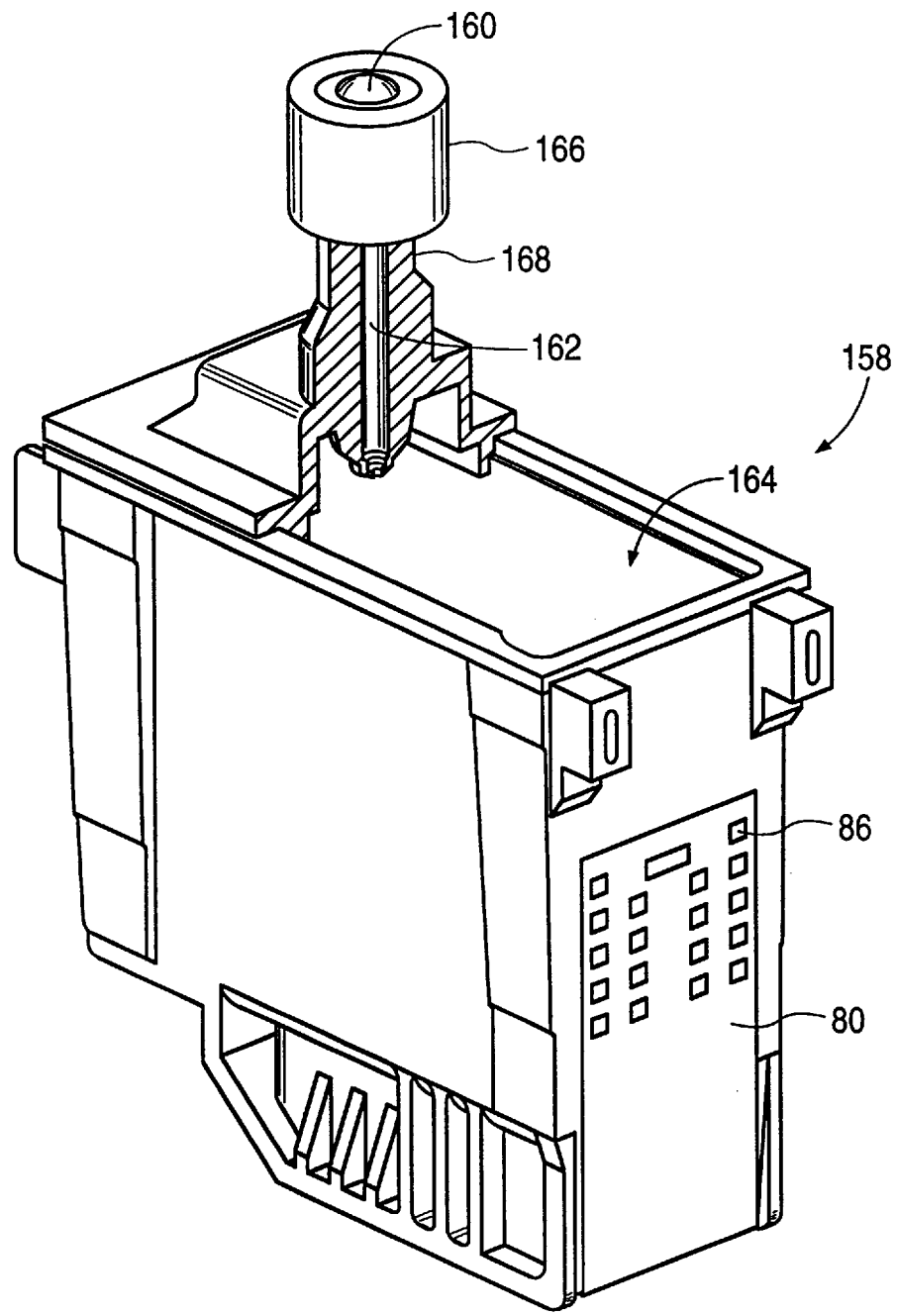
FIG. 15 is a partial cutaway view of a print cartridge in accordance with another embodiment of the invention.

FIG. 15 is perspective view of another embodiment print cartridge 158 in partial cross-section.

Print cartridge 158 of FIG. 15 may be similar to any one of print cartridges 122–125 shown in FIG. 9A except that, instead of having a needle protruding from a top surface of the print cartridge, print cartridge 158 has a rubber septum 160 for receiving a hollow needle. Print cartridge 158 is to be installed in a carriage similar to carriage 120 in FIG. 9A. An axial passage 162 communicates between a central slit formed in septum 160 and an ink chamber 164 within print cartridge 158. A cap 166 is crimped onto neck 168 and onto septum 160 to form a seal between septum 160 and the remainder of the print cartridge 158. The crimping of cap 166 also serves to compress septum 160 so as to ensure the central slit is sealed.

The flexible tape 80 forming a part of the printhead assembly is shown revealed on a side of print cartridge 158. Contact pads 86 for connection to electrodes on a carriage are also shown.

Figure 16:
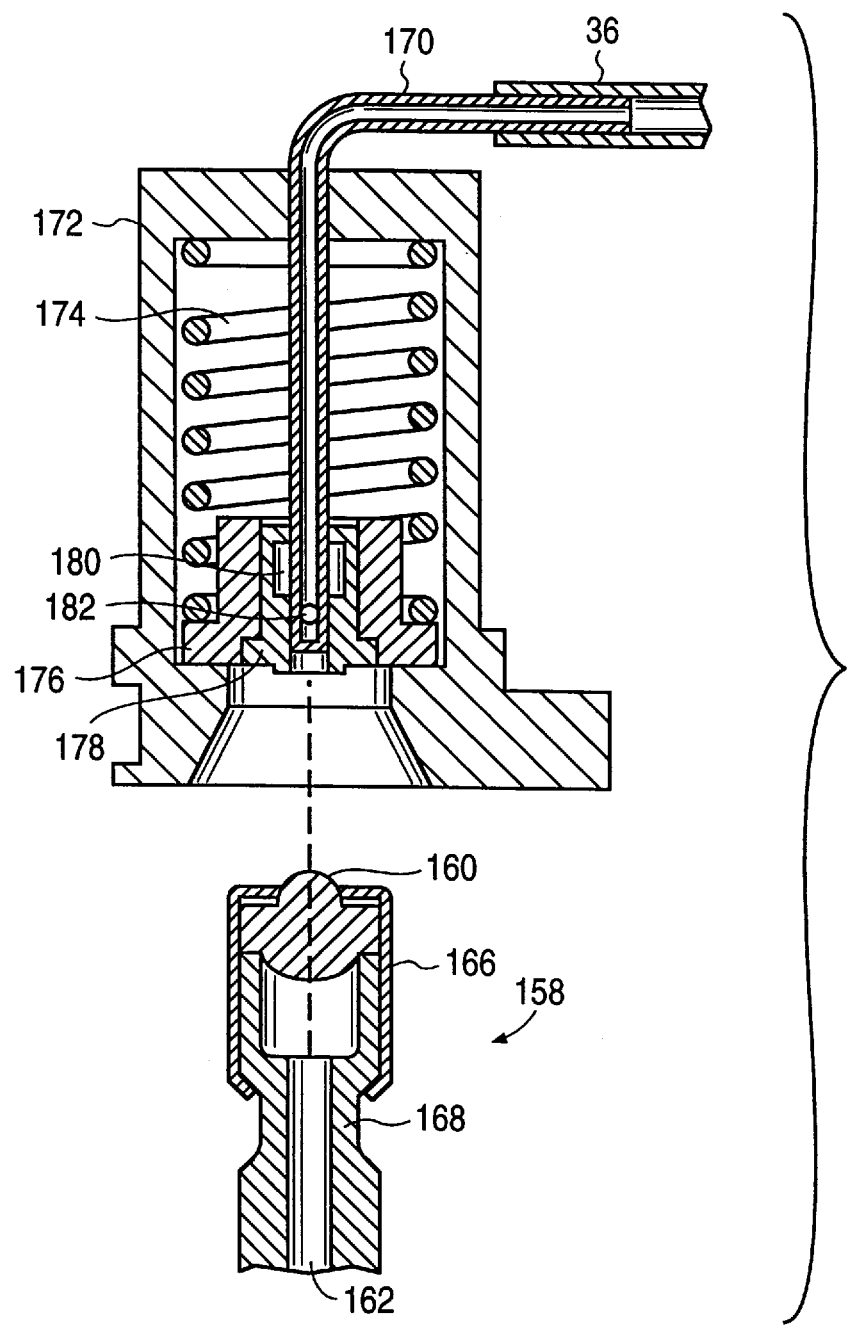
FIGS. 16 and 17 illustrate the interconnection between the fluid interconnect on the print cartridge of FIG. 15 and the fluid interconnect on the scanning carriage.

FIG. 16 illustrates the fluid interconnect between an ink supply tube 36 and septum 160 of print cartridge 158. Tube 36, connected to an off-axis ink supply, is fitted over a hollow needle 170. Needle 170 is preferably 18-gage stainless steel having a diameter of about 1.2 mm. A housing 172 on the scanning carriage houses a spring 174 and a sliding humidor consisting of a rigid plastic collar 176 and a compliant inner portion 178. A pocket 180 in the compliant inner portion 178 reduces the friction between the compliant inner portion 178 and needle 170. In FIG. 16, print cartridge 158 is installed in the carriage prior to the fluid interconnect being made.

Figure 17:
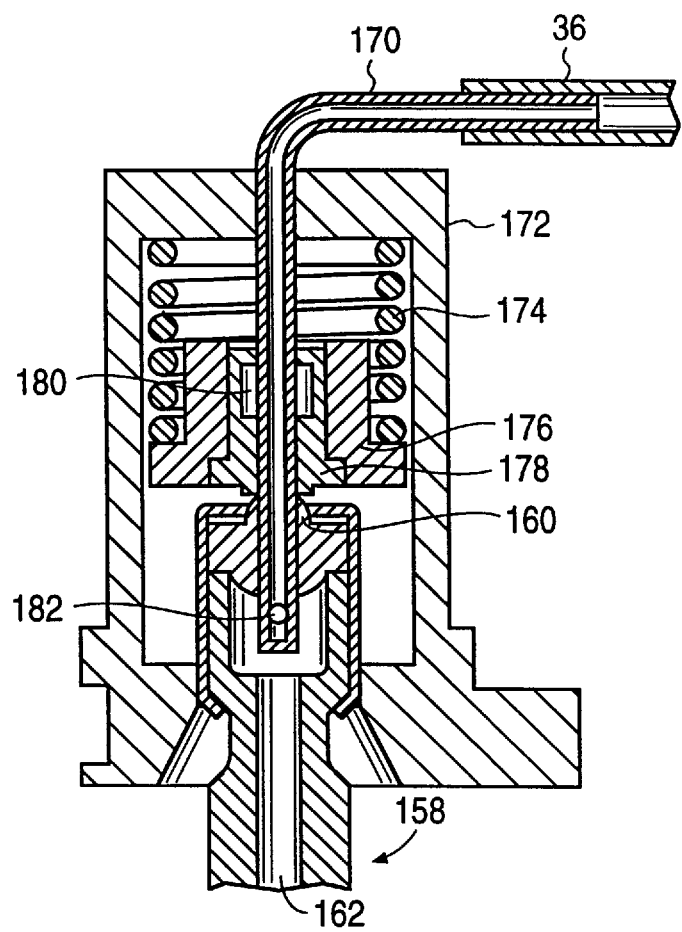

FIG. 17 shows the completed fluid interconnect between the off-axis ink supply and print cartridge 158 after the fluid interconnect system on the carriage has been brought down onto print cartridge 158. The downward force of the fluid interconnect system compresses spring 174 while causing needle 170 to be inserted through a central slit in septum 160. The compliant inner portion 178 and rubber septum 160 are in contact with one another. Ink now flows from the off-axis ink supply station, through tube 36, through hollow needle 170, through hole 182 formed in hollow needle 170, through axial passage 162, and into the print cartridge's ink chamber 164 (FIG. 15).

In another embodiment, needle 170 directly extends from a replaceable ink supply cartridge, such as from ink supply cartridge 139 in FIG. 11B, and the ink supply cartridge and print cartridges 158 are supported by the scanning carriage.

The central slit formed in septum 160 creates an air-tight seal around needle 170. The slit becomes sealed when needle 170 is withdrawn from septum 160.

Print cartridge 158 is thus supplied with ink from the off-axis ink supply station.

Thus, a number of print cartridge embodiments and ink interconnections between an off-axis ink supply and the print cartridge have been shown.

Description of Regulator Internal to Print Cartridges

FIGS. 18–35 describe a pressure regulator which may be used within any of the print cartridge embodiments described herein for regulating the pressure of the ink chamber within the print cartridge. Hence, the pressure in the off-axis ink supply system may be unregulated. The regulator causes the ink chamber within the print cartridge to have a slight, but substantially constant, negative pressure (e.g., −2 to −7 inches of water column) to prevent ink drool from the nozzles of the printhead. If the off-axis ink supply system is at atmospheric pressure, this slight negative pressure in the print cartridge also acts to draw ink from the off-axis ink supply system even if the location of the ink supply system is slightly below the print cartridge. The regulator also enables the use of pressurized off-axis ink supplies while maintaining the desired negative pressure within the ink chamber in the print cartridge. The regulator can be designed to provide a wide range of negative pressures (or back pressures) from 0 to −50 inches of water column, depending on the design of the printhead.

In the embodiments shown in FIGS. 18–35, the regulator is described with reference to the type of print cartridge similar to print cartridge 158 in FIG. 15 having a septum 235 (FIG. 18); however, it is to be understood that a regulator using similar concepts may also be used with any of the other print cartridge embodiments.

Figure 18:
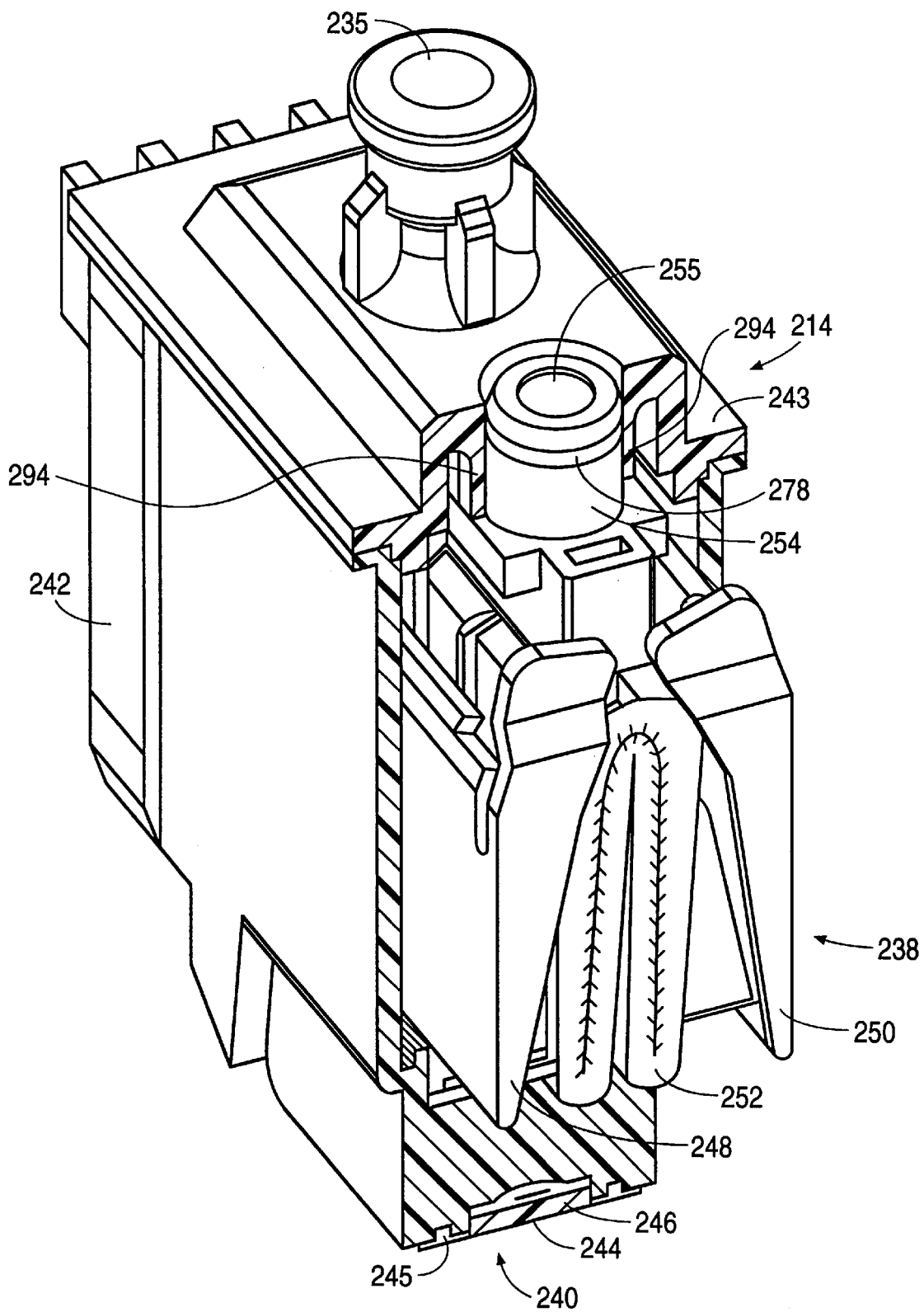
FIG. 18 is a perspective view in partial cross-section of the print cartridge of FIG. 15 illustrating an ink pressure regulator which may be internal to any of the print cartridges described herein.

Referring to FIG. 18, reference numeral 214 generally indicates the print cartridge that includes a pen body 242 that is the housing for the cartridge and a crown 243 that forms a cap to the housing. Located at a remote end of the pen body is the tab head assembly 244 or THA. The THA includes a flex circuit 245 and a silicon die 246 that forms the print head 240. The THA is of conventional construction. Also located within the pen body 242 is a pressure regulator lever 248, an accumulator lever 250, and a flexible bag 252. In FIG. 18, the bag is illustrated fully inflated and for clarity is not shown in FIG. 19. The pressure regulator lever 248 and the accumulator lever 250 are urged together by a spring 253, 253' illustrated in FIG. 19. In opposition to the spring, the bag spreads the two levers apart as it inflates outward. The bag is staked to a fitment 254 that is press-fit into the crown 243. The fitment contains a vent 255 to ambient pressure in the shape of a helical, labyrinth path. The vent connects and is in fluid communication with the inside of the bag so that the bag is maintained at a reference pressure. The helical path limits the diffusion of water out of the bag.

Figure 19:
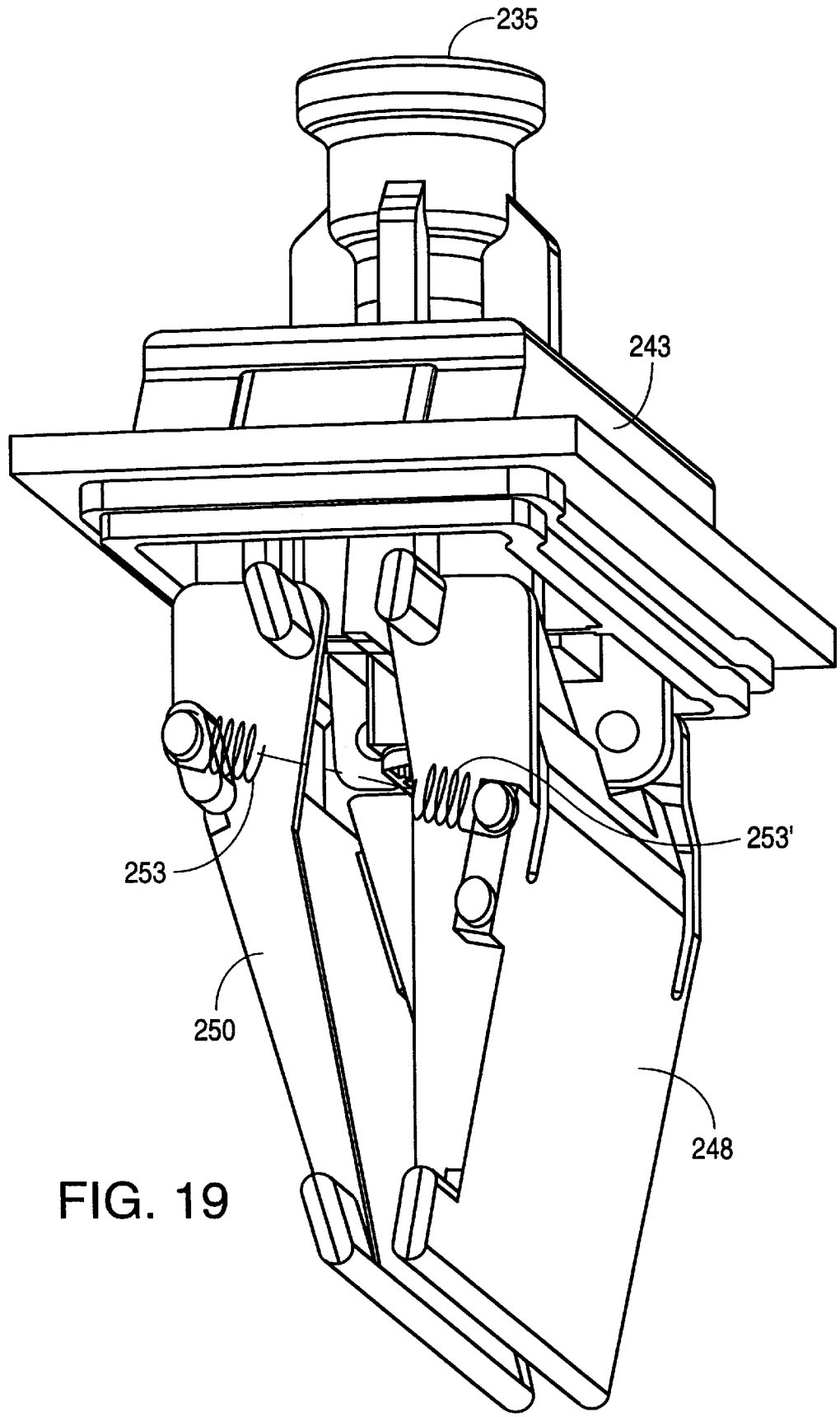
FIG. 19 is a perspective view of the pressure regulator sub-assembly of the print cartridge of FIG. 18 without the flexible air bag.
Figure 20:
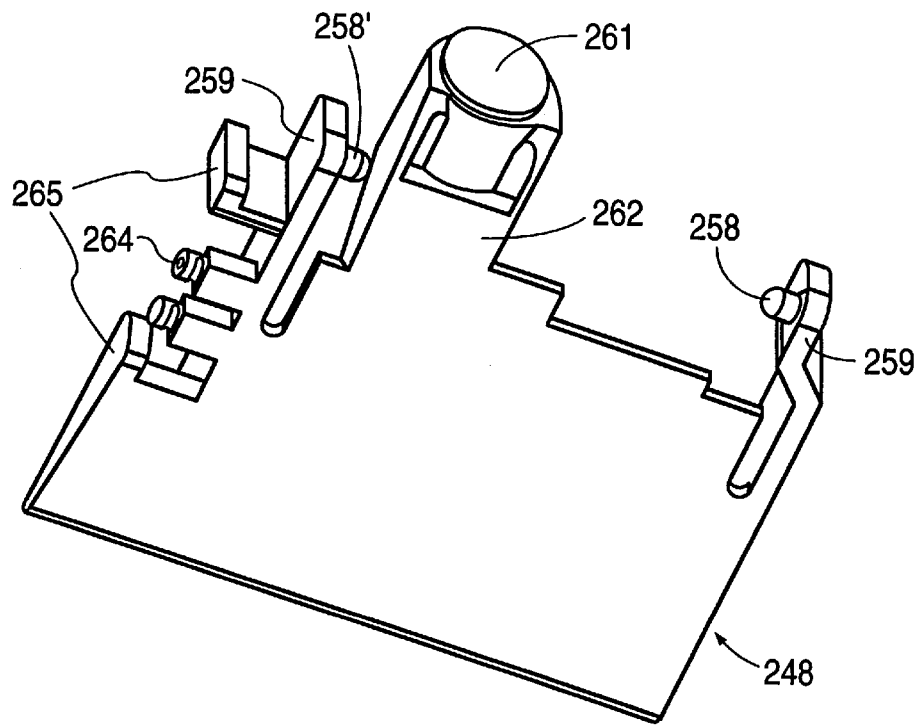
FIG. 20 is a perspective view of a pressure regulator lever in the pressure regulator sub-assembly of FIG. 19.
Figure 21:
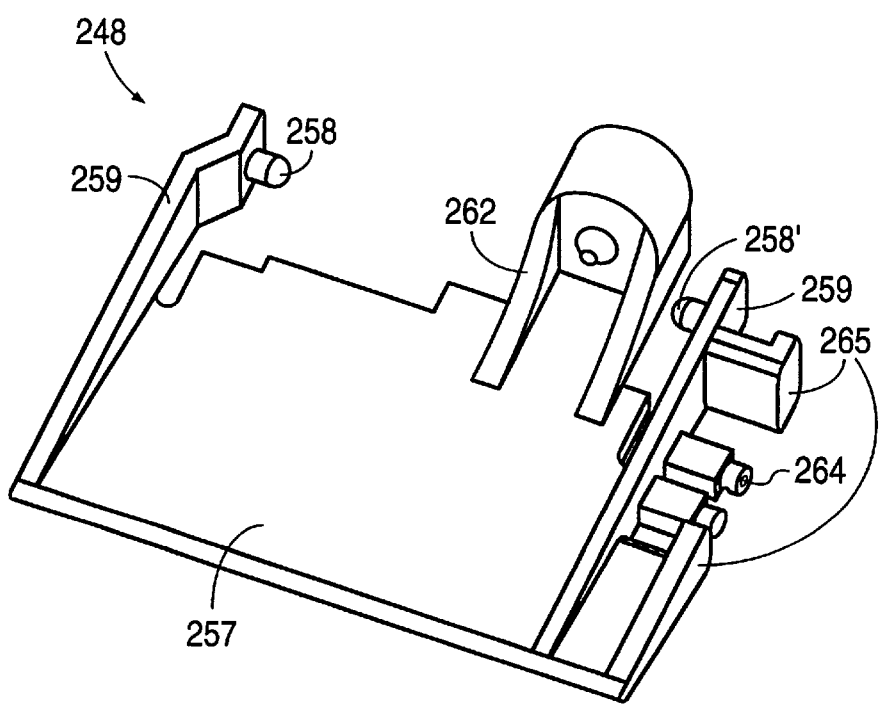
FIG. 21 is a perspective view of the opposite side of the pressure regulator lever of FIG. 20.
Figure 32:
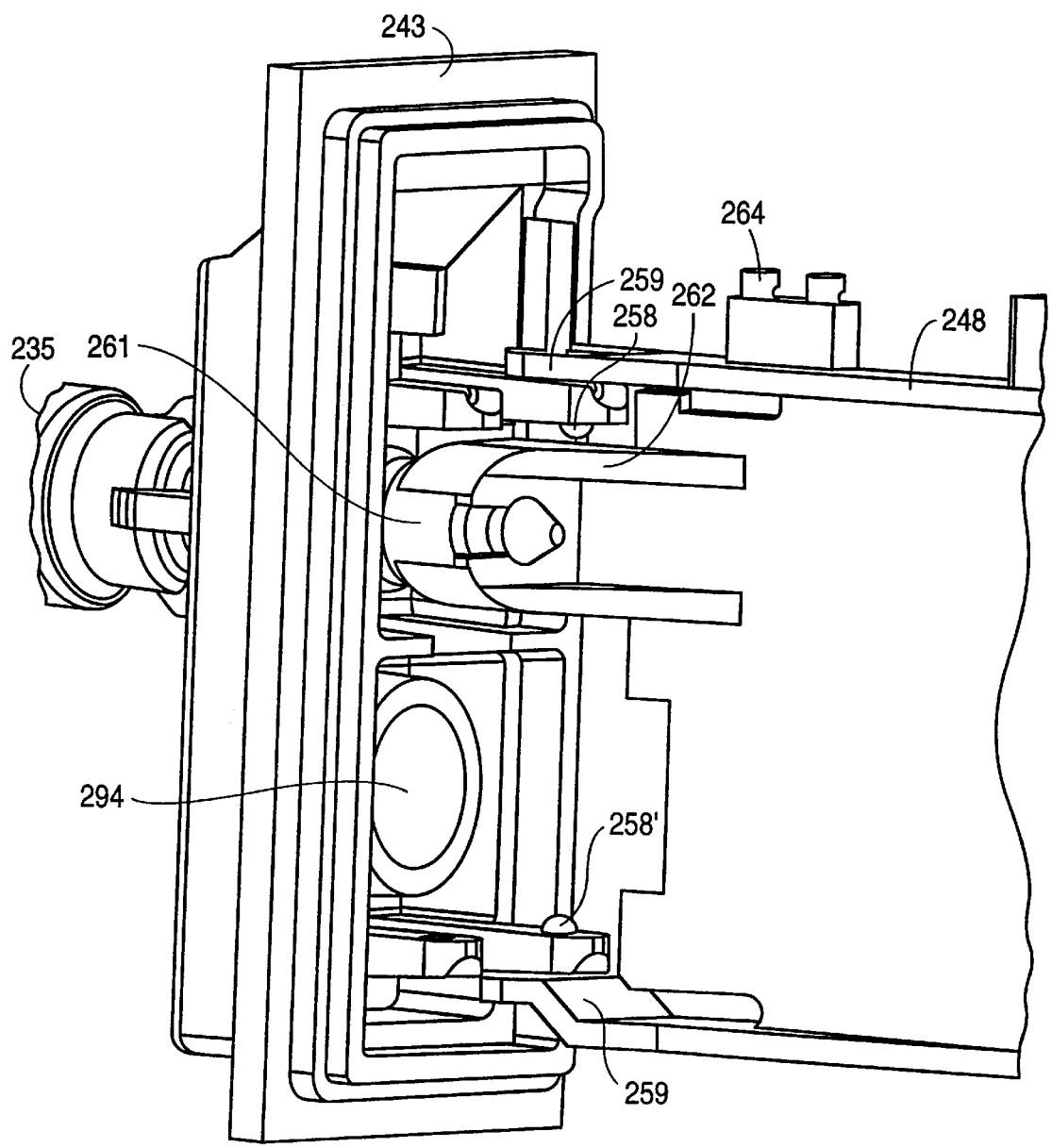
FIG. 32 is a perspective view, partially cut away, of the crown and pressure regulator of FIG. 19 with the accumulator removed.
Figure 34:
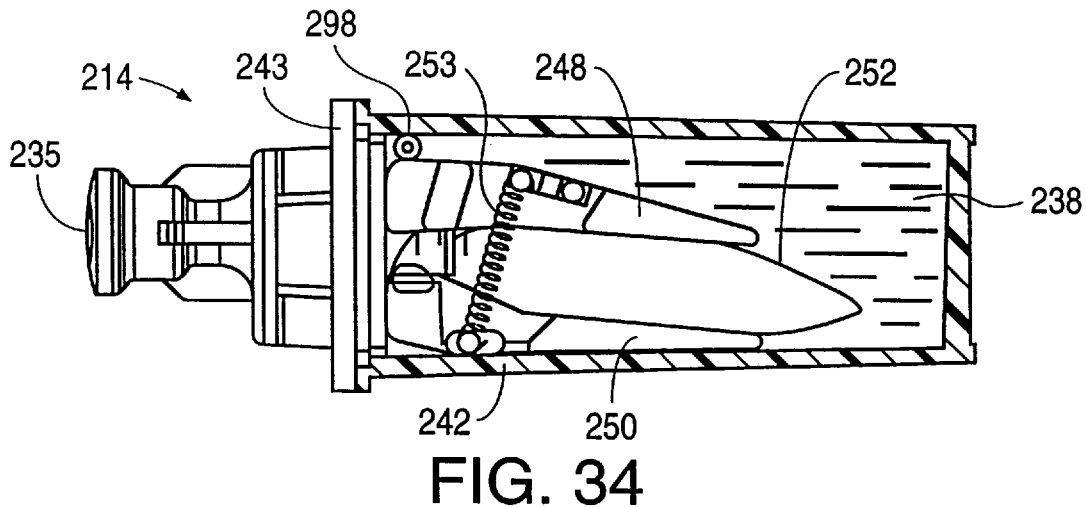
Figure 35:
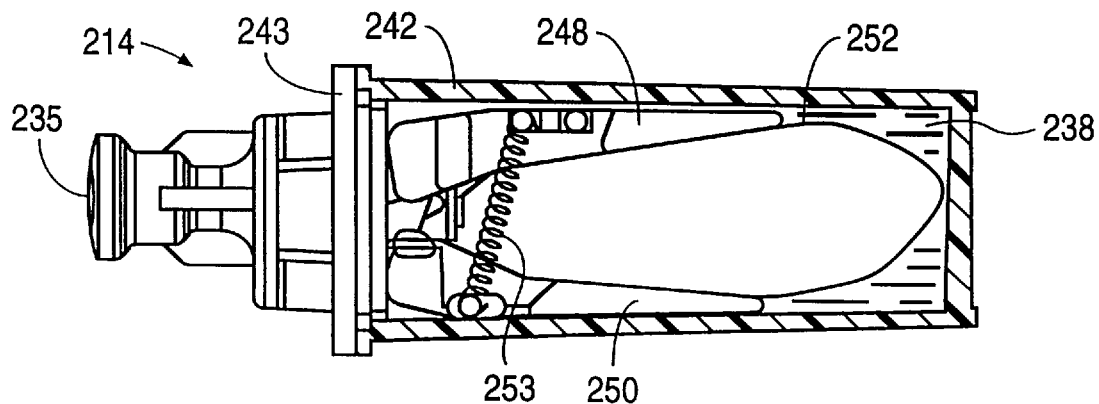

The pressure regulator lever 248 is illustrated in detail in FIGS. 20 and 21. Reference numeral 257 generally indicates the location of the area where the bag 252 directly bears against the lever. The lever 248 rotates about two opposed axles 258 that form the axis of rotation of the lever. The rotation of the lever is stopped when the lever engages the pen body 242 as illustrated in FIG. 35. The axles are located at the ends of cantilevers 259 formed by deep slots so that the cantilevers and the axles can be spread apart during manufacture and snapped onto place on the crown 243 as illustrated in FIG. 32. Perpendicular to the plane of the regulator lever 248 is a valve seat 261 and a valve seat holder 262. The valve seat is pressed into place on the holder and is fabricated from a resilient material. In response to expansion and contraction of the bag 252, the regulator lever 248 rotates about the axles 258, 258' and causes the valve seat to open and shut against a mating surface on the crown 243 as described below. This rotational motion controls the flow of ink into the ink plenum 238, FIG. 34. There is an optimization between maximizing the force on the valve seat and obtaining sufficient motion of the lever. In the embodiment actually constructed, the lever ratio between the distance between the centroid of the lever, generally at point 257, and the axles 258 and the distance between the center of the valve seat and the axles 258 is between two to one and five to one with four to one being preferred. The pressure regulator also includes a spring boss 264 and engages the spring 253, FIG. 19. The spring boss is protected during manufacture by two shoulders 265 which are not illustrated in FIG. 19.

Figure 22:
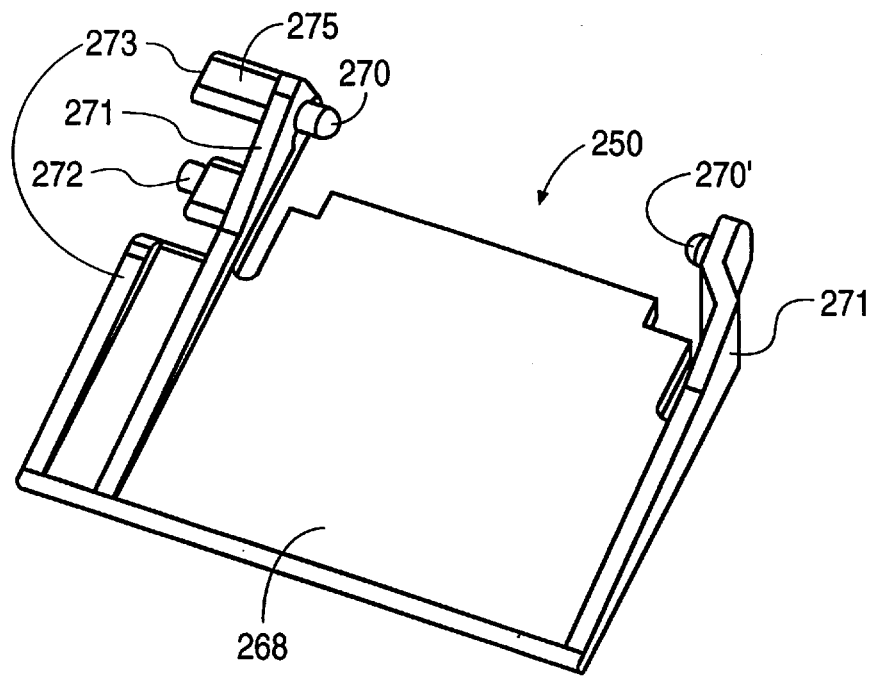
FIG. 22 is a perspective view of an accumulator lever of the pressure regulator sub-assembly of FIG. 19.

The accumulator lever 250 is illustrated in FIG. 22 and includes an actuation area 268 where the bag 252 directly bears against the lever. The lever rotates about two opposed axles 270, 270' that form an axis of rotation of the accumulator lever. The axles are remotely located on cantilevers 271 so that the axles and the cantilevers can be spread apart during manufacture and snapped into place on the crown 243 as described below. The accumulator lever also includes a spring boss 272 that engages the other end of the spring 253, FIG. 19. Like the spring boss 64 on the pressure regulator, the boss 272 on the accumulator is protected during manufacture by the shoulders 273. These shoulders are not illustrated in FIG. 19.

The accumulator lever 250 and the bag 252 operate together to accommodate changes in volume due to any air that may be entrapped in the print cartridge 214, as well as due to any other pressure changes. The accumulator acts to modulate any fluctuations in the back pressure. The accumulator lever squeezes the bag the inside of which is at ambient pressure, forces air out of the bag and allows air trapped in the print cartridge to expand.

Although most of the accumulation is provided by the movement of the accumulator lever 250 and the bag 252, there is additional accumulation provided by the pressure regulator lever 248 in cooperation with the resilient valve seat 261, FIG. 20. The valve seat acts as a spring and allows some movement of the regulator lever 248 while the valve is shut. In other words, as the back pressure in the plenum 238 (FIG. 34) decreases, the bag 252 exerts less force on the levers, and the spring 253 urges the levers together. The motion of the regulator lever compresses the valve seat and the regulator lever shuts a little further. This movement of the regulator lever 248 with the bag 252 results in some additional air accommodation.

It should be appreciated that the boss 272 on the accumulator lever 250 is closer to the axis of rotation of the accumulator lever than the boss 264, FIGS. 20 and 21, on the pressure regulator lever is to its axis of rotation. This difference in distance causes the accumulator lever to actuate before the pressure regulator lever moves.

Figure 31:
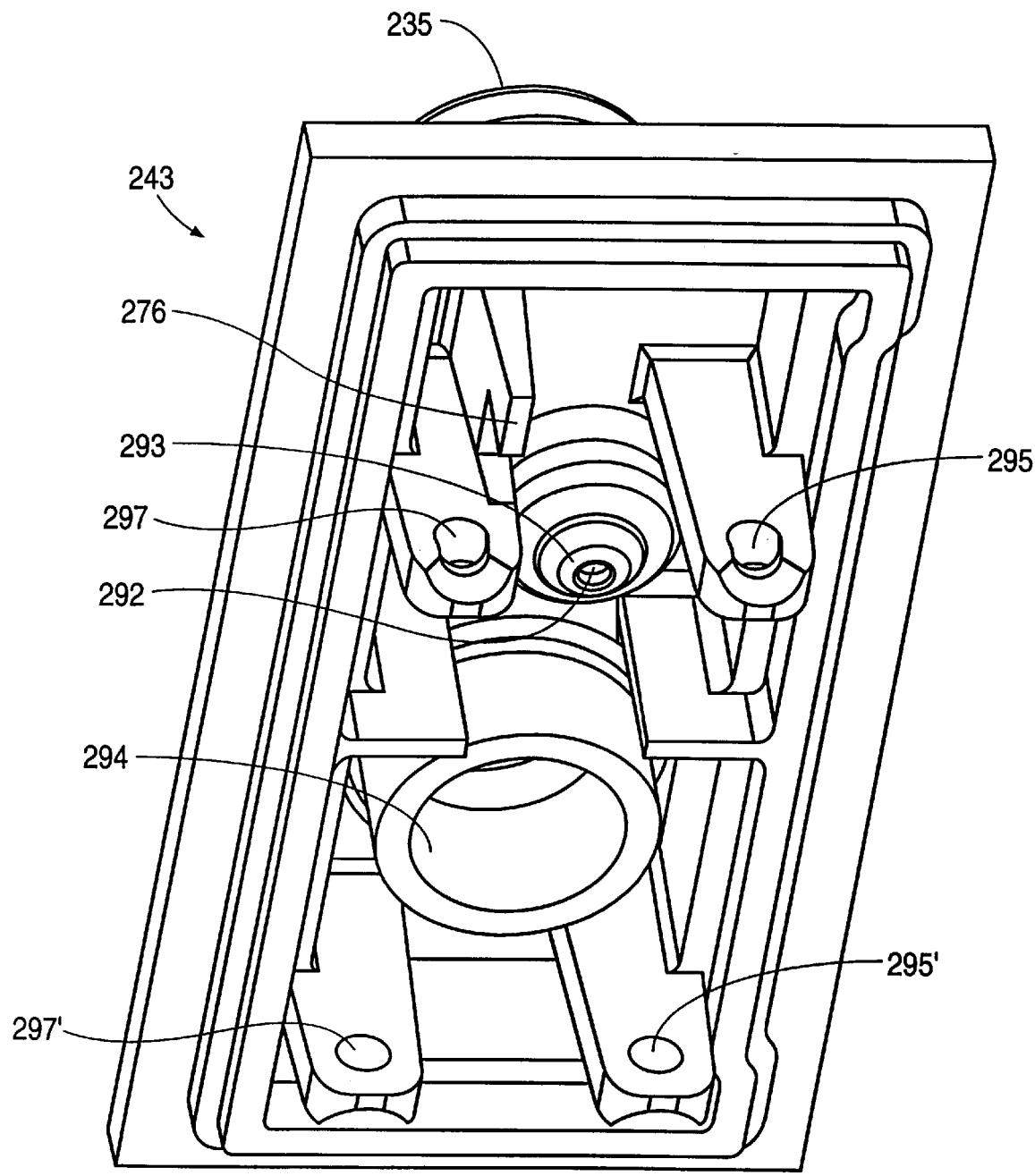
FIG. 31 is a perspective view of the crown for the print cartridge of FIG. 18.

The accumulator lever 250 rotates about the axles 270 until a stop 275 on the lever engages a surface 276 within the crown 243, as illustrated in FIG. 31. The stop prevents the lever from moving too close and interfering with the pressure regulator lever 248 when the back pressure in the ink plenum drops. The accumulator lever rotates in the other direction until coming into contact with the pen body 242 as illustrated in FIGS. 34 and 35.

Referring to FIG. 19, reference numeral 253 generally indicates a helical extension spring that urges the two levers 248, 250 together. The spring is preloaded and engages the bosses 264, 272 with a coil loop at each distal end. Each loop is a parallel, cross-over, fully closed, centered loop. This spring is designed to have the least amount of variation in its force constant over its full range of travel so that the back pressure can be regulated as closely as possible.

Figure 23:
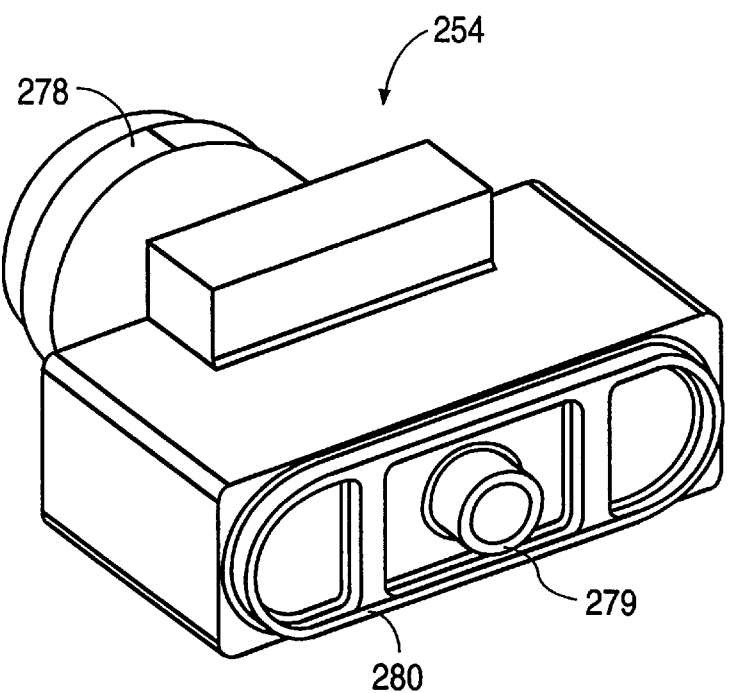
FIG. 23 is a perspective view of a fitment for the print cartridge of FIG. 18.

The fitment 254, illustrated in FIGS. 18 and 23, supports the bag 252 and attaches the bag to the crown 243. The fitment has a lip 278 that engages the crown and forms a hermetic seal with it. Within the fitment is a vent 255 that provides communication between the interior of the bag and ambient pressure. At the distal end of the fitment is a raised, circular boss 279 and a race-track shaped outer boss 280. The bag 252 is staked to both bosses. The circular boss provides the main seal between the bag and the fitment. The race-track shaped boss provides a secondary, redundant sealing surface as well as provides additional support and positioning for the bag.

Figure 24:
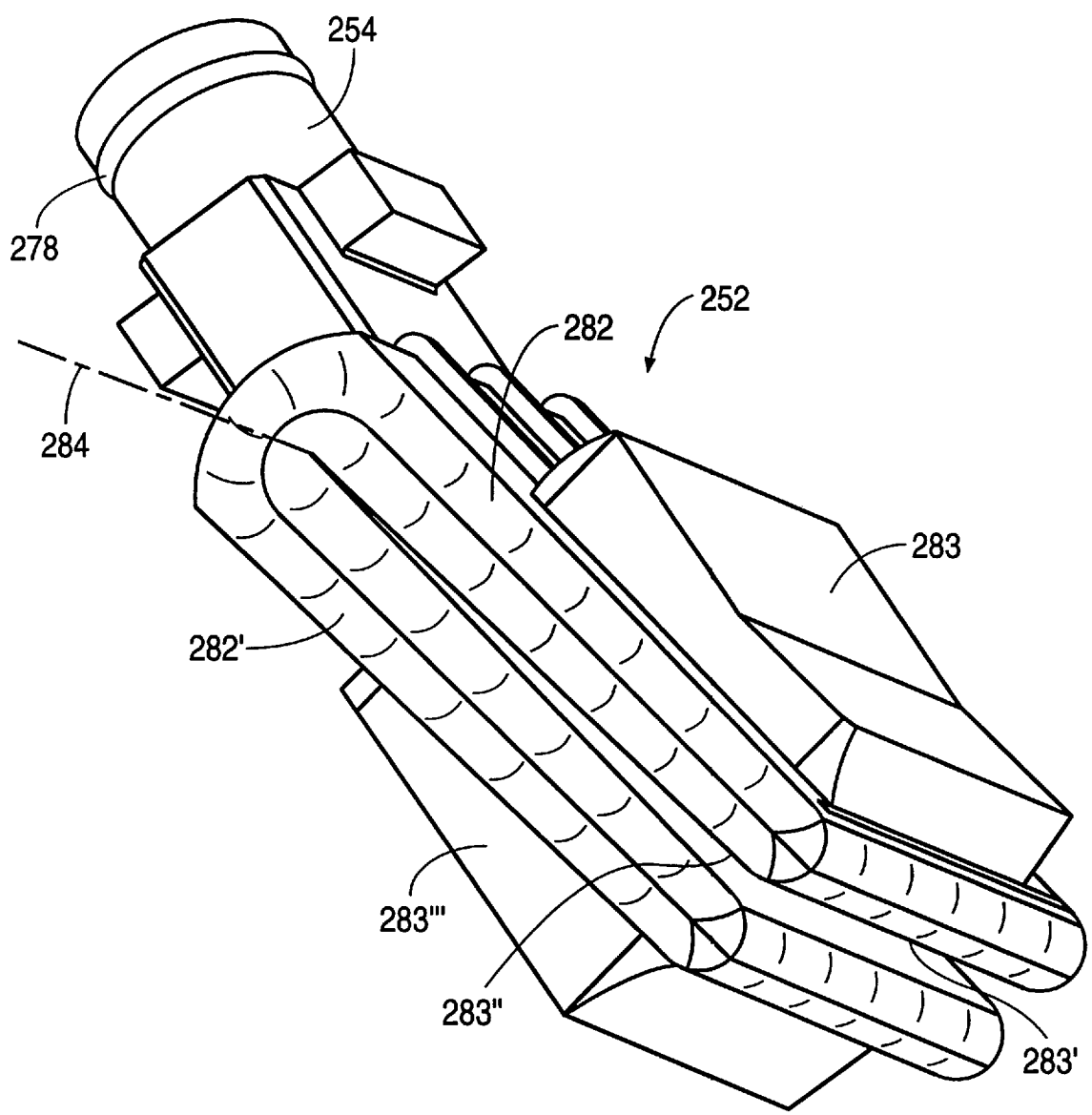
FIG. 24 is a perspective view of the flexible bag and fitment for the print cartridge of FIG. 18.
Figure 25:
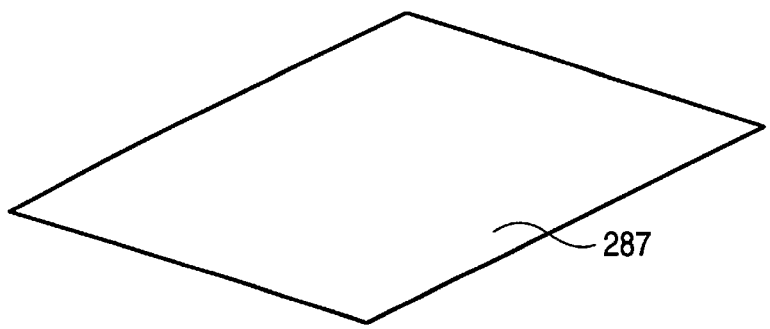
FIGS. 25 through 30 are diagrammatic views of the process for making the flexible bag of FIG. 24.
Figure 26:
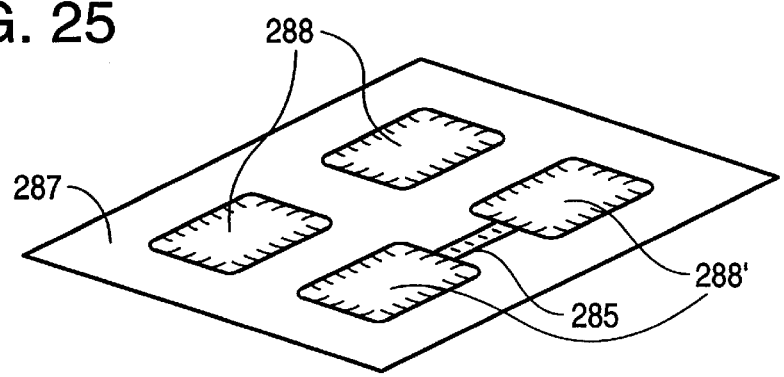

The flexible bag 252, illustrated in FIGS. 18 and 24, expands and contracts as a function of the differential pressure between the back pressure in the ink plenum 238 (FIG. 34) and ambient pressure communicated through the vent 255 in the fitment 254. The bag is shown fully inflated in FIG. 24. The bag is designed to push against the two levers 248, 250 with maximum contact area through the entire range of travel of the levers. The bag is formed from a single sheet of multilayer film and includes two lungs 282 that expand and contract about an axis 284. The lungs communicate with each other and are maintained at the same reference pressure. Each lung has two raised areas 283 on either side so that there are four raised areas in all. The two inner raised areas that bear against each other are not shown in FIG. 24 but are indicated by reference numerals 283' and 283". The side opposite the fitment contains a raised communication channel 285, FIGS. 26, 28, between the raised areas which allows a path for air to flow when the bag is completely deflated. The raised areas are thinner that the rest of the bag and provide greater compliance to the travel of the levers and the motion of the lungs about the axis 284. The raised areas are designed to eliminate relative motion or sliding of the bag with respect to the levers. In systems that actuate on very slight pressures, this undesirable affect is called hysteresis. The combination of the lungs and raised areas provides extra material into which the bag can expand as well as maximizes the change in ink volume displaced by the bag with any change in differential pressure.

Figure 27:
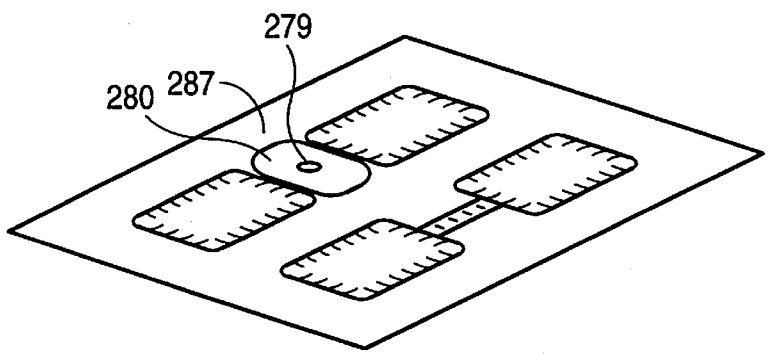
Figure 28:
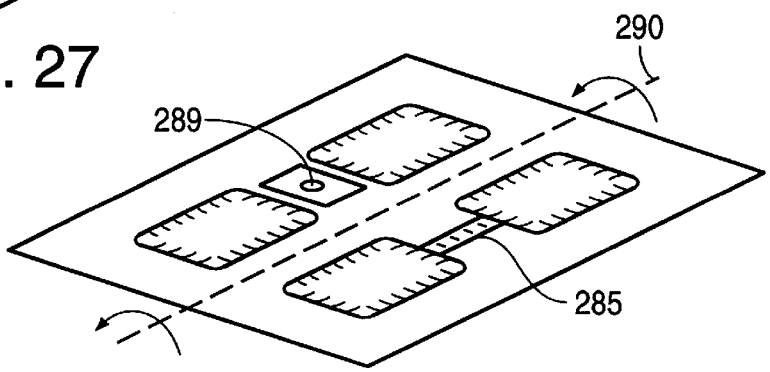
Figure 29:
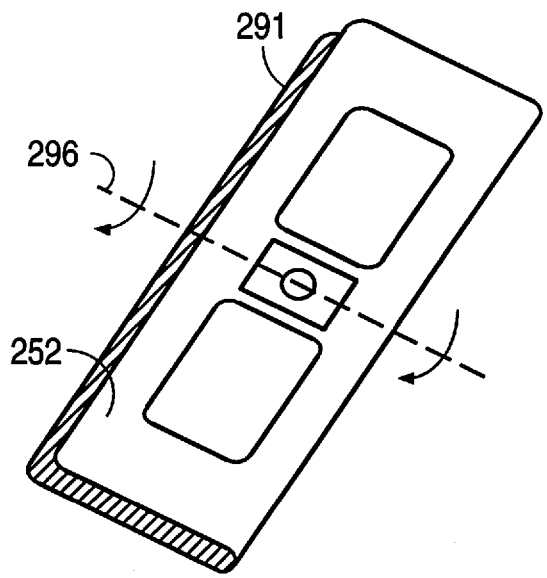
Figure 30:
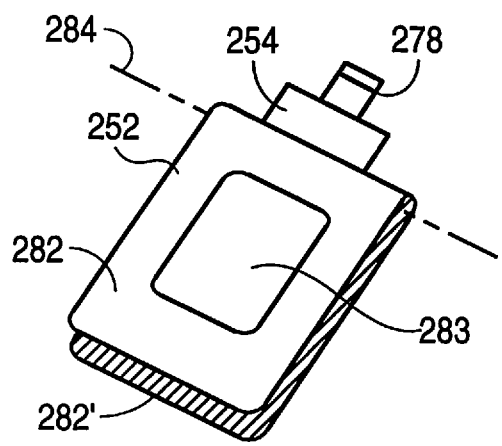

The process for making the bag 252 is illustrated in FIGS. 25–30. First, a sheet 287 of flat film is cut to size, FIG. 25. The film is a multilayer structure between one and three mils (one rail is 25.4 microns) thick, 1.5 mils being the preferred thickness. In the preferred embodiment, three materials show acceptable performance: (1) PE/tie/PVDC/tie/PE, (2) PE/tie/PVDF/tie/PE, and (3) PE/tie/EVOH/tie/PE. PVDC is polyvinylidene chloride; DOW version is known as SARAN. EVOH is ethylene-vinyl alcohol copolymer. PE is polyethylene. Tie is a layer used to bond the dissimilar materials together. PVDF is polyvinylidenefluoride and is sold under the trade name of Kynar™. Next, the sheet is placed over a die plate, and heat and vacuum are applied to form the four raised areas 288, 288', FIG. 26. Note that two of the four raised areas or pockets 288' are in communication. Thereafter, the sheet 287 is heat staked to the two bosses 279, 280 on the fitment 254, FIG. 23, as shown in FIG. 27. Next, a hole 289 is made in the film in the center of the circular boss 279 to establish communication to the vent 255 in the fitment. The sheet is then folded along axis 290 and the perimeter of the bag where the margins came together is staked. This staking occurs along the three open seams and is indicated by reference numeral 291 in FIG. 29. The perimeter of the bag is then trimmed. Thereafter, the bag is folded along the longitudinal axis 296 of the fitment as illustrated in FIG. 29. This forms the two lungs 282, 282' in the bag. Referring to FIGS. 29, 30, and 24, the longitudinal axis 296 of the fitment and the line of folding in FIG. 29 is parallel to the axis 284 of rotation of the two lungs including expansion/contraction of the bag.

FIG. 31 illustrates the bottom-side of the crown 243 which includes a valve face 293 and the tapered nozzle or orifice 292 through which ink enters the plenum 238. The valve face mates with the valve seat 261, FIG. 20, on the pressure regulator lever 248. This mating is also shown in FIG. 32. Ink flows through the fluid interconnect, the septum 235, and the orifice 292. The tapered orifice 292 reduces the area of contact between the valve seat 261 and the valve face 293 to thereby increase the valve sealing pressure.

At orifice 292, the back pressure within the plenum 238 (FIG. 34) is controlled by the lever 248. Next to the valve face 293 on the crown 243 is a circular boss 294 that receives the lip 278 on the fitment 254, FIG. 24. The boss 294 and the lip form a hermetic seal. The axles 258, 258', FIG. 21, on the pressure regulator lever 248 are snapped into the journals 295, 295' as permitted by the cantilevered construction described above. In like manner the axles 270, 270' on the accumulator lever 250 are received in the journals 297, 297', FIG. 31. Also located on the bottom side of the crown is the surface 276 that engages the stop 275, FIG. 22, on the accumulator lever 250. The stop 275 and the surface 276 prevent the accumulator lever from interfering with the pressure regulator lever 248.

Figure 33:
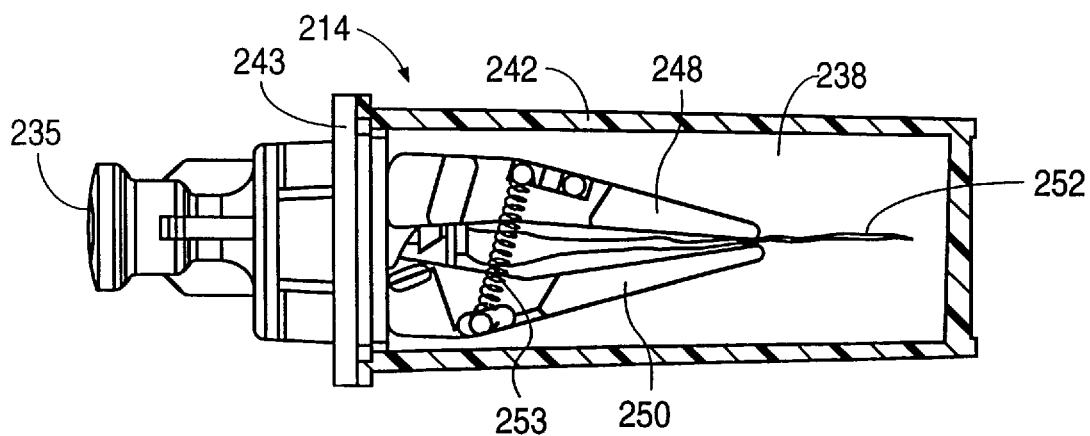
FIGS. 33 through 35 are side elevation views in partial cross-section illustrating the operation of the print cartridge of FIG. 18.

The operation of the print cartridge 214 is illustrated in FIGS. 33, 34, and 35. In the initial condition of the cartridge, there is no ink within the ink plenum 238, and the bag 252 is limp. The back pressure in the plenum equals ambient pressure. The spring 253 urges the two levers 248, 250 fully together.

Next, a hollow needle is inserted into the septum 235 and a vacuum is drawn on the nozzles in the print head 240 (FIG. 18) to draw ink into the print cartridge. In response to this vacuum, the accumulator lever 250 moves first, and the bag begins to expand as shown in FIG. 24. The accumulator lever continues to rotate about its axis of rotation until it engages the side wall of the pen body 242 as shown in FIG. 24. At this point the pressure regulator lever 248 begins to move, and ink begins to enter the plenum 238 through orifice 292, FIG. 31.

The regulator lever 248 can rotate about its axis of rotation until it engages the side wall of the pen body 242 as shown in FIG. 35. This is the full-open position of the valve. The regulator lever moves between the states illustrated in FIGS. 34 and 35 depending on the speed of printing and how fast ink is required by the print head.

Once the plenum 238 is filled with ink or printing has stopped, the pressure regulator lever 248 will slowly rotate and close the orifice at the urging of the spring 253. The levers 248 and 250 return to the state illustrated in FIG. 34 which is the normal or steady state condition of the print cartridge. This state occurs just prior to or subsequent to printing.

Referring to FIG. 34, reference numeral 298 indicates an air bubble that has entered the ink plenum 238. If the print cartridge is subjected to an elevation in temperature or increased altitude, the air bubble will expand in the plenum. The expansion of the air bubble will be compensated for by the contraction of the bag 252 due to a pressure change caused by a volume change of the bubble which in turn causes the accumulator lever to move from the state illustrated in FIG. 34 toward that illustrated in FIG. 33. In addition, there will be some accompanying motion of the regulator lever 248 because of the resilience of the valve seat 261. On the other hand, if the air bubble contracts, the bag will expand in response and the pressure regulator lever 248 will open the orifice and admit ink onto the plenum. In other words, any expansion or contraction of an air bubble will cause the bag to compensate in reverse, that is by contracting to expansion and expanding to contraction. Each of the levers tracks the motion of the bag and the accumulator lever 250 rotates before the regulator lever 248 because of the difference in lever arm distances.

When the off-axis ink supply (e.g., supply 30 in FIG. 1) is depleted of ink, the levers 248, 250 rotate to the full-open position in FIG. 35 and the print head stops ejecting ink.

Description of the Off-Axis Ink Delivery System

Figure 36A:
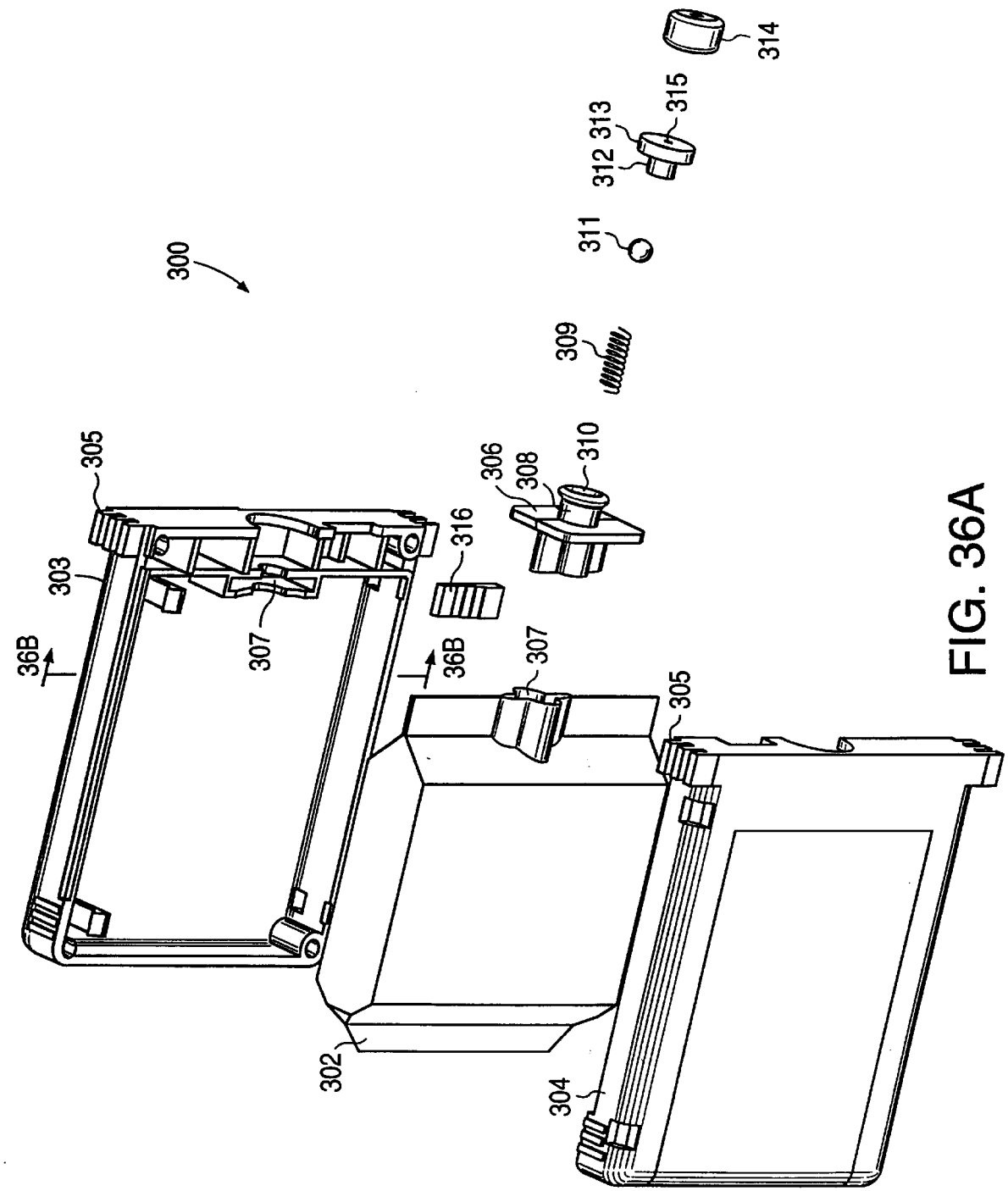
FIG. 36A is an exploded view of a non-pressurized ink supply cartridge.

FIG. 36A is an exploded view of a non-pressurized ink supply cartridge 300 such as shown in FIGS. 2, 9B, and 12B. Such an ink supply cartridge 300 is simply removed from the ink supply support (e.g., support 144 in FIG. 12B) and disposed of once its supply of ink has been depleted. The connection of such an ink supply cartridge 300 to the fluid interconnect has been described with respect to FIG. 12B.

The non-pressurized ink supply cartridge 300 consists of a collapsible ink bag 302 and two rigid plastic housing members 303 and 304. Ink bag 302 may be formed of a flexible film such as Mylar or EVA, or a multi-layer film similar to the plastic sheet 350 described with respect to FIG. 37 or the nine-layer film described in U.S. Pat. No. 5,450,112, assigned to the present assignee and incorporated herein by reference. The ends of inkbag 302 may be heat-staked or ultrasonically welded to housing member 303 or 304 to limit movement of bag 302.

Coded tabs 305 align with slots formed in the ink supply support to ensure the proper color ink supply cartridge is inserted into the correct stall of the ink supply support. In one embodiment, the ink supply support also latches onto tab 305, using a spring-loaded latch, to secure cartridge 300 and to provide tactile feedback to the user that cartridge 300 is properly installed.

A plastic ink bag fitment 306 is partially inserted through an opening 307 in ink bag 302 and sealed with respect to opening 307 by glue or heat fusing. A poppet 308 extends from fitment 306. Bag fitment 306 is held firmly in place by a slot 307 formed in the plastic housing members 303 and 304.

A poppet spring 309 is inserted through a hole 310 in poppet 308 followed by a poppet ball 311. Ball 311 may be stainless steel or plastic.

An end 312 of a rubber septum 313 is then inserted into hole 310 in poppet 308. Septum 313 is then crimped and secured to poppet 308 using a crimped cap 314.

Septum 313 has a slit 315 formed through its center through which a hollow needle 142 (FIG. 12B), in fluid connection with a print cartridge, is inserted as shown in FIG. 12B. Slit 315 in septum 313 is automatically urged closed by the resiliency of septum 313 when the needle is removed.

Poppet spring 309 and poppet ball 311 serve to provide added assurance that no ink will leak through slit 315 in septum 313. When there is no needle inserted through slit 315, poppet spring 309 urges poppet ball 311 against the closed slit 315 so that ball 311 in conjunction with the closing of slit 315 provides a seal against ink leakage. Further description of this type of double-sealing valve is provided with respect to the pressurized ink supply cartridge embodiment shown in FIG. 37.

It is possible to design the fluid interconnect using a septum without the poppet, or a poppet without the septum. A septum without the poppet will reliably seal around a needle with a radial seal. However, when the ink supply with a septum has been installed in the printer for a long time, the septum will tend to take on a compression set. Upon removal, the septum may not completely reseal itself. If the supply is tipped or dropped, ink may leak out. A poppet valve (by itself) has the advantage (relative to a septum) of self-sealing without a compression set issue. However, it is less reliable in that it does not seal around the needle. Thus, to ensure a leak-tight fluid interconnection with the cartridge, some kind of face seal must be established. In addition, poppet valves vary in reliability when the surface they seal against is hard plastic—small imperfections in the sealing surface tend to lead to leaks. The combination of the septum/poppet valve overcomes these limitations by utilizing the advantages of both: the septum's very good sealing around the needle while eliminating the compression set issue. Additionally, the inside surface of the septum provides a compliant sealing surface for the poppet valve that is less sensitive to imperfections.

In the preferred embodiment, an integrated circuit sensor/memory 316 is permanently mounted to ink supply cartridge 300. This circuit provides a number of functions, including verifying insertion of the ink supply, providing indication of remaining ink in the supply, and providing a code to assure compatibility of the ink supply with the rest of the system.

Figure 36C:
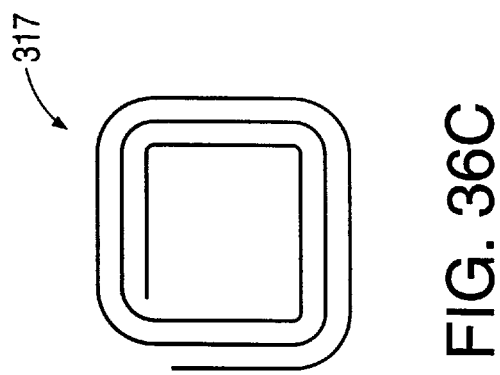
FIG. 36C is one embodiment of a spring used to provide a positive pressure on the ink bag in FIG. 36B.
Figure 36B:
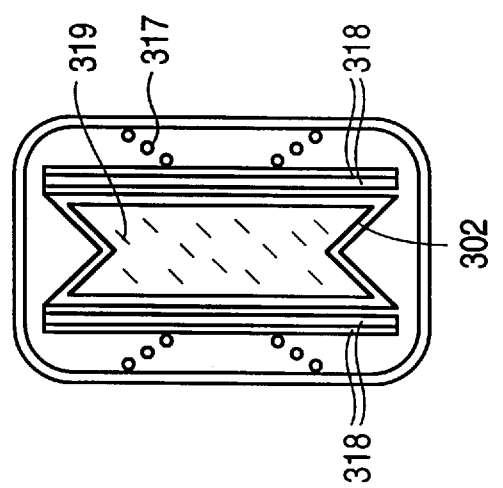
FIG. 36B is a cross-sectional view of a pressurized ink bag which may use the housing shown in FIG. 36A.

In an alternate embodiment, ink bag 302 is provided with a positive pressure. This enables the tubes connecting the ink supply to the print cartridges to be thinner and also allows the ink supply station to be located well below the print cartridges. FIG. 36B is a cross-sectional view of ink supply cartridge 300 along line 36B—36B in FIG. 36A illustrating how a spring 317 urges the sides of ink bag 302 together to create a positive internal pressure. Ink bag 302 is provided with rigid side panels 318 to distribute the spring force. Bow springs, spiral springs, foam, a gas, or other resilient devices may supply the spring force. Ink 319 is shown within ink bag 302. FIG. 36C is a top down view of one embodiment of spring 317 formed as a stainless steel spiral.

In another embodiment, ink bag 302 may be pressurized by an intermittent pressure source, such as a gas.

FIGS. 37–48E illustrate a pressurized off-axis ink supply cartridge and an apparatus for pressurizing the ink supply cartridge.

Figure 37:
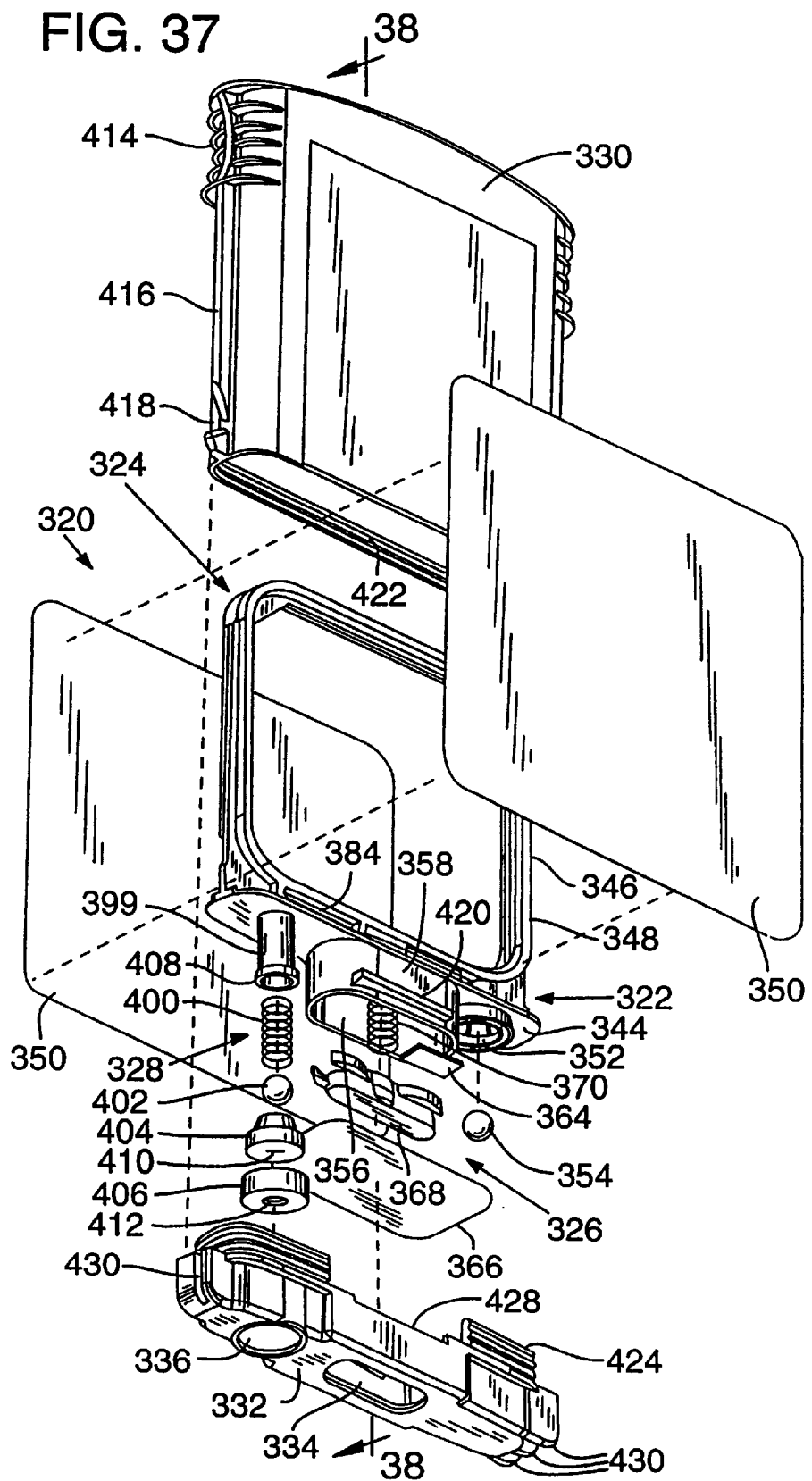
FIG. 37 is an exploded view of an ink supply in accordance with one embodiment of the present invention.

FIG. 37 is an exploded view of ink supply 320.

The ink supply 320 has a chassis 322 which carries an ink reservoir 324 for containing ink, a pump 326, and fluid outlet 328. The chassis 322 is enclosed within a hard protective shell 330 having a cap 332 affixed to its lower end. The cap 332 is provided with an aperture 334 to allow access to the pump 326 and an aperture 336 to allow access to the fluid outlet 328.

To use the ink supply 320, it is inserted into a docking bay 338 of an ink-jet printer, as illustrated in FIGS. 1 and 44–47. Upon insertion of the ink supply 320, an actuator 340 within the docking bay 338 is brought into contact with the pump 326 through aperture 334. In addition, a fluid inlet 342 within the docking bay 338 is coupled to the fluid outlet 328 through aperture 336 to create a fluid path from the ink supply to the printer. Operation of the actuator 340 causes the pump 326 to draw ink from the reservoir 324 and supply the ink through the fluid outlet 328 and the fluid inlet 342 to the printer.

Upon depletion of the ink from the reservoir 324, or for any other reason, the ink supply 320 can be easily removed from the docking bay 338. Upon removal, the fluid outlet 328 and the fluid inlet 342 are closed to help prevent any residual ink from leaking into the printer or onto the user. The ink supply may then be discarded or stored for reinstallation at a later time. In this manner, the present ink supply 320 provides a user of an ink-jet printer a simple, economical way to provide a reliable and easily replaceable supply of ink to an ink-jet printer.

As illustrated in FIGS. 37–40, the chassis 322 has a main body 344. Extending upward from the top of the chassis body 344 is a frame 346 which helps define and support the ink reservoir 324. In the illustrated embodiment, the frame 346 defines a generally square reservoir 324 having a thickness determined by the thickness of the frame 346 and having open sides. Each side of the frame 346 is provided with a face 348 to which a sheet of plastic 350 (FIG. 37) is attached to enclose the sides of the reservoir 324. The illustrated plastic sheet is flexible to allow the volume of the reservoir to vary as ink is depleted from the reservoir. This helps to allow withdrawal and use of all of the ink within the reservoir by reducing the amount of back pressure created as ink is depleted from the reservoir. The illustrated ink supply 320 is intended to contain about 30 cubic centimeters of ink when full. Accordingly, the general dimensions of the ink reservoir defined by the frame are about 57 millimeters high, about 60 millimeters wide, and about 5.25 millimeters thick. These dimensions may vary depending on the desired size of the ink supply and the dimensions of the printer in which the ink supply is to be used.

In the illustrated embodiment, the plastic sheets 350 are heat staked to the faces 348 of the frame in a manner well known to those in the art. The plastic sheets 350 are, in the illustrated embodiment, multi-ply sheets having an outer layer of low density polyethylene, a layer of adhesive, a layer of metallized polyethylene terephthalate, a layer of adhesive, a second layer of metallized polyethylene terephthalate, a layer of adhesive, and an inner layer of low density polyethylene. The layers of low density polyethylene are about 0.0005 inches thick and the metallized polyethylene terephthalate is about 0.00048 inches thick. The low density polyethylene on the inner and outer sides of the plastic sheets can be easily heat staked to the frame while the double layer of metallized polyethylene terephthalate provides a robust barrier against vapor loss and leakage. Of course, in other embodiments, different materials, alternative methods of attaching the plastic sheets to the frame, or other types of reservoirs might be used.

The body 344 of the chassis 322, as seen in FIGS. 37–40, is provided with a fill port 352 to allow ink to be introduced into the reservoir. After filling the reservoir, a plug 354 (FIG. 38) is inserted into the fill port 352 to prevent the escape of ink through the fill port. In the illustrated embodiment, the plug is a polypropylene ball that is press fit into the fill port.

A pump 326 is also carried on the body 344 of the chassis 322. The pump 326 serves to pump ink from the reservoir and supply it to the printer via the fluid outlet 328. In the illustrated embodiment, seen in FIGS. 37 and 38, the pump 326 includes a pump chamber 356 that is integrally formed with the chassis 322. The pump chamber is determined by a skirt-like wall 358 which extends downwardly from the body 344 of the chassis 322.

A pump inlet 360 is formed at the top of the chamber 356 to allow fluid communication between the chamber 356 and the ink reservoir 324. A pump outlet 362 through which ink may be expelled from the chamber 356 is also provided. A valve 364 is positioned within the pump inlet 360. The valve 364 allows the flow of ink from the ink reservoir 324 into the chamber 356 but limits the flow of ink from the chamber 356 back into the ink reservoir 324. In this way, when the chamber is depressurized, ink may be drawn from the ink reservoir, through the pump inlet and into the chamber. When the chamber is pressurized, ink within the chamber may be expelled through the pump outlet.

Figure 38:
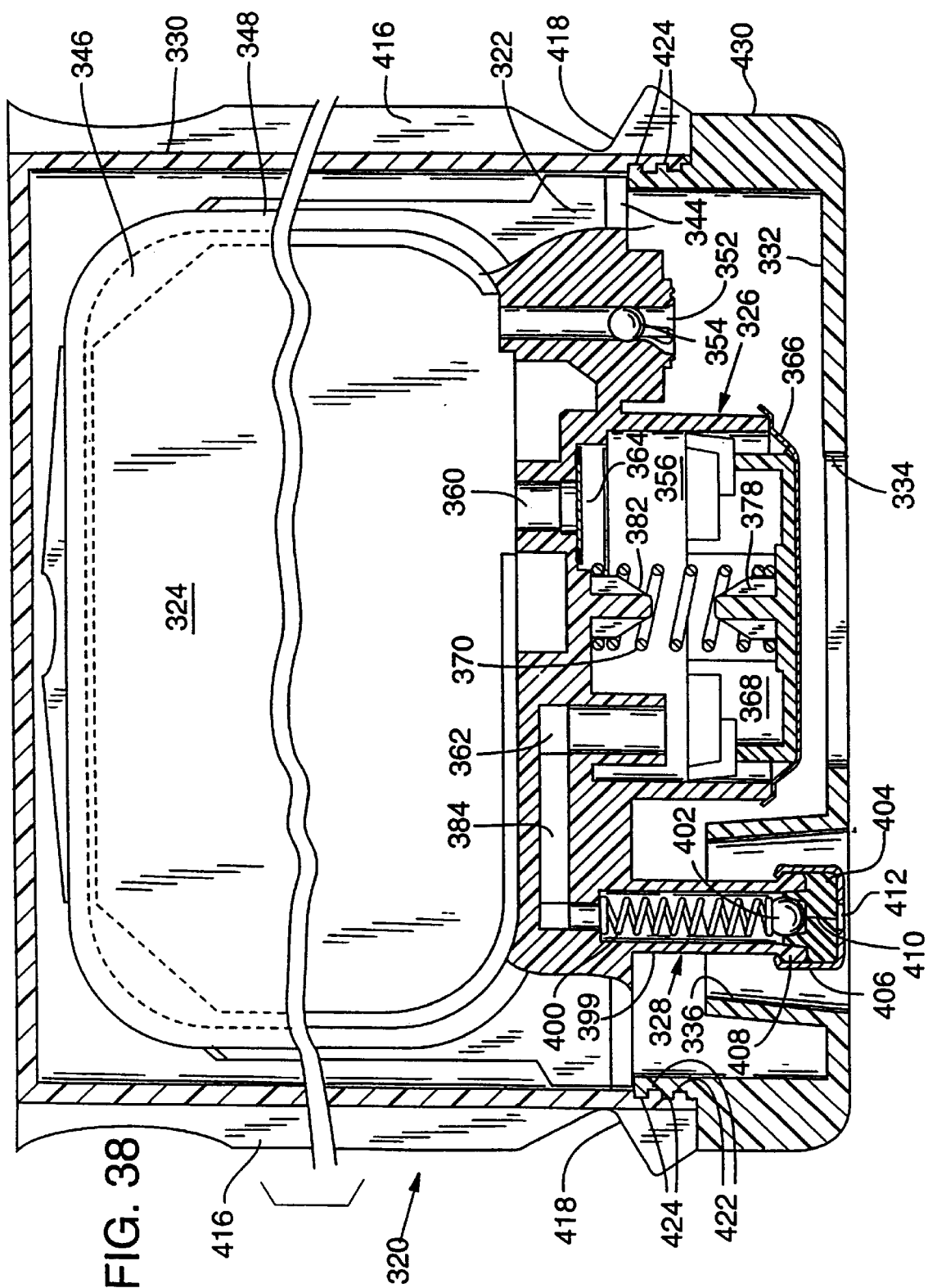
FIG. 38 is a cross-sectional view, taken along line 38—38 of FIG. 37, of a portion of the ink supply of FIG. 37.

In the illustrated embodiment, the valve 364 is a flapper valve positioned at the bottom of the pump inlet. The flapper valve 364 illustrated in FIGS. 37 and 38, is a rectangular piece of flexible material. The valve 364 is positioned over the bottom of the pump inlet 360 and heat staked to the chassis 322 at the midpoints of its short sides (the heat staked areas are darkened in the Figures). When the pressure within the chamber drops sufficiently below that in the reservoir, the unstaked sides of the valve each flex downward to allow the flow of ink around the valve 364, through the pump inlet 360 and into the chamber 356. In alternative embodiments, the flapper valve could be heat staked on only one side so that the entire valve would flex about the staked side, or on three sides so that only one side of the valve would flex. Other types of valves may also be suitable.

In the illustrated embodiment the flapper valve 364 is made of a two ply material. The top ply is a layer of low density polyethylene 0.0015 inches thick. The bottom ply is a layer of polyethylene terephthalate (PET) 0.0005 inches thick. The illustrated flapper valve 364 is approximately 5.5 millimeters wide and 8.7 millimeters long. Of course, in other embodiments, other materials or other types or sizes of valves may be used.

A flexible diaphragm 366 encloses the bottom of the chamber 356. The diaphragm 366 is slightly larger than the opening at the bottom of the chamber 356 and is sealed around the bottom edge of the wall 358. The excess material in the oversized diaphragm allows the diaphragm to flex up and down to vary the volume within the chamber. In the illustrated ink supply, displacement of the diaphragm allows the volume of the chamber 356 to be varied by about 0.7 cubic centimeters. The fully expanded volume of the illustrated chamber 356 is between about 2.2 and 2.5 cubic centimeters.

In the illustrated embodiment, the diaphragm 366 is made of the same multi-ply material as the plastic sheets 350. Of course, other suitable materials may also be used to form the diaphragm. The diaphragm in the illustrated embodiment is heat staked, using conventional methods, to the bottom edge of the skirt-like wall 358. During the heat staking process, the low density polyethylene in the diaphragm seals any folds or wrinkles in the diaphragm to create a leak proof connection.

A pressure plate 368 and a spring 370 are positioned within the chamber 356. The pressure plate 368, illustrated in detail in FIGS. 41 and 42, has a smooth lower face 372 with a wall 374 extending upward about its perimeter. The central region 376 of the pressure plate 368 is shaped to receive the lower end of the spring 370 and is provided with a spring retaining spike 378. Four wings 380 extend laterally from an upper portion of the wall 374. The illustrated pressure plate is molded of high density polyethylene.

The pressure plate 368 is positioned within the chamber 356 with the lower face 372 adjacent the flexible diaphragm 366. The upper end of the spring 370, which is stainless steel in the illustrated embodiment, is retained on a spike 382 formed in the chassis and the lower end of the spring 370 is retained on the spike 378 on the pressure plate 368. In this manner, the spring biases the pressure plate downward against the diaphragm to increase the volume of the chamber. The wall 374 and wings 380 serve to stabilize the orientation of the pressure plate while allowing for its free, piston-like movement within the chamber 356. The structure of the pressure plate, with the wings extending outward from the smaller face, provides clearance for the heat stake joint between the diaphragm and the wall and allows the diaphragm to flex without being pinched as the pressure plate moves up and down. The wings are also spaced to facilitate fluid flow within the pump.

Figure 43:
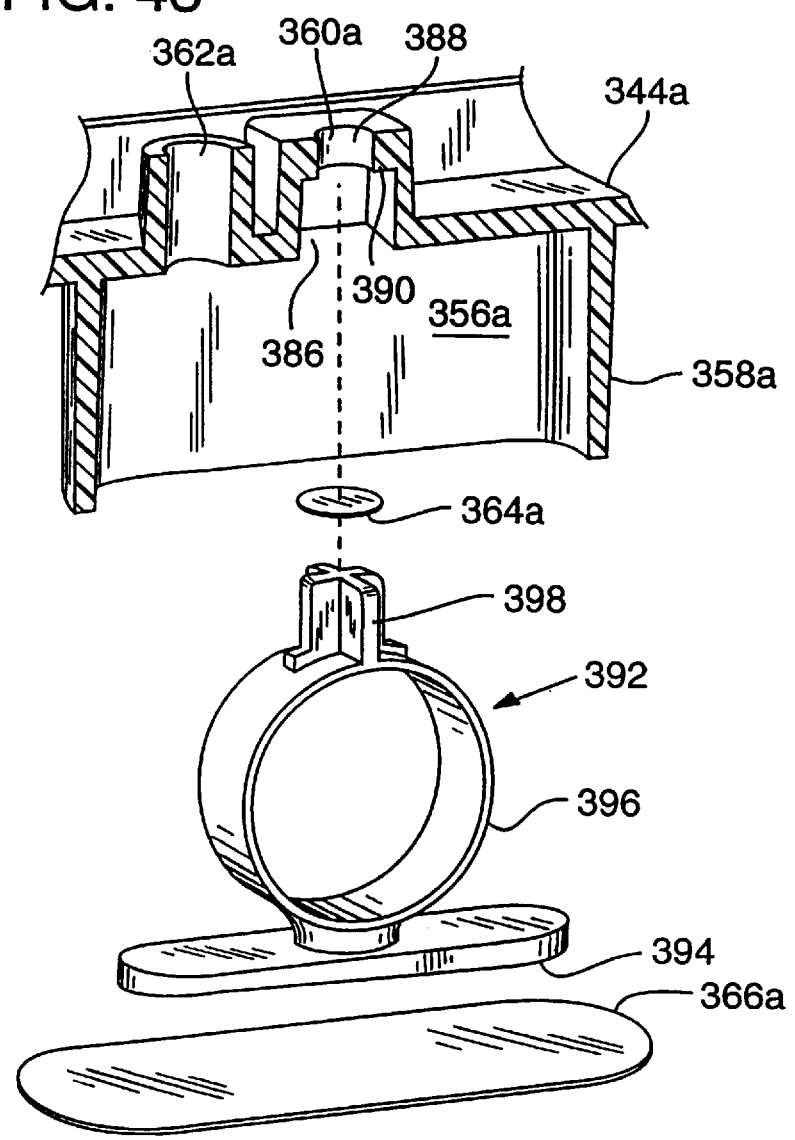
FIG. 43 is an exploded, cross-sectional view of an alternative embodiment of a pump for use in an ink supply in accordance with the present invention.

An alternative embodiment of the pump 326 is illustrated in FIG. 43. In this embodiment, the pump includes a chamber 356a defined by a skirtlike wall 358a depending downwardly from the body 344a of the chassis. A flexible diaphragm 366a is attached to the lower edge of the wall 358a to enclose the lower end of the chamber 356a. A pump inlet 360a at the top of the chamber 356a extends from the chamber 356a into the ink reservoir and a pump outlet 362a allows ink to exit the chamber 356a. The pump inlet 360a has a wide portion 386 opening into the chamber 356a, a narrow portion 388 opening into the ink reservoir, and a shoulder 390 joining the wide portion 386 to the narrow portion 388. A valve 364a is positioned in the pump inlet 360a to allow the flow of ink into the chamber 356a and limit the flow of ink from the chamber 356a back into the ink reservoir. In the illustrated embodiment the valve is circular. However, other shaped valves, such as square or rectangular, could also be used.

In the embodiment of FIG. 43, a unitary spring/pressure plate 392 is positioned within the chamber 356a. The spring/pressure plate 392 includes a flat lower face 394 that is positioned adjacent the diaphragm 366a, a spring portion 396 that biases the lower face downward, and a mounting stem 398 that is friction fit into the wide portion 386 of the pump inlet. In the illustrated embodiment, the spring portion 396 is generally circular in configuration and is pre-stressed into a flexed position by the diaphragm 366a. The natural resiliency of the material used to construct the spring/pressure plate urges the spring to its original configuration, thereby biasing the lower face downward to expand the volume of the chamber 356a. The unitary spring/pressure plate 392 may be formed of various suitable materials such as, for example, HYTREL™.

In this embodiment, the valve 364a is a flapper valve that is held in position on the shoulder 390 of the pump inlet 360a by the top of the mounting stem 398. The mounting stem 398 has a cross shaped cross section which allows the flapper valve 364a to deflect downward into four open quadrants to allow ink to flow from the ink reservoir into the chamber. The shoulder prevents the flapper valve from deflecting in the upward direction to limit the flow of ink from the chamber back into the reservoir. Rather, ink exits the chamber via the pump outlet 362. It should be appreciated that the mounting stem may have a 'V' cross section, an 'I' cross section, or any other cross section which allows the flapper valve to flex sufficiently to permit the needed flow of ink into the chamber.

As illustrated in FIG. 38, a conduit 384 joins the pump outlet 362 to the fluid outlet 328. In the illustrated embodiment, the top wall of the conduit 384 is formed by the lower member of the frame 346, the bottom wall is formed by the body 344 of the chassis, one side is enclosed by a portion of the chassis and the other side is enclosed by a portion of one of the plastic sheets 350. As illustrated in FIGS. 37 and 38, the fluid outlet 328 is house within a hollow cylindrical boss 399 that extends downward from the chassis 322. The top of the boss 399 opens into the conduit 384 to allow ink to flow from the conduit into the fluid outlet. A spring 400 and sealing ball 402 are positioned within the boss 399 and are held in place by a compliant septum 404 and a crimp cover 406. The length of the spring 400 is such that it can be placed into the inverted boss 399 with the ball 402 on top. The septum 404 and can then inserted be into the boss 399 to compress the spring 400 slightly so that the spring biases the sealing ball 402 against the septum 404 to form a seal. The crimp cover 406 fits over the septum 404 and engages an annular projection 408 on the boss 399 to hold the entire assembly in place.

In the illustrated embodiment, both the spring 100 and the ball 402 are stainless steel. The sealing ball 402 is sized such that it can move freely within the boss 399 and allow the flow of ink around the ball when it is not in the sealing position. The septum 404 is formed of polyisoprene rubber and has a concave bottom to receive a portion of the ball 402 to form a secure seal. The septum 404 is provided with a slit 410 so that it may be easily pierced without tearing or coring. However, the slit is normally closed such that the septum itself forms a second seal. The slit may, preferably, be slightly tapered with-its narrower end adjacent the ball 402. The illustrated crimp cover 406 is formed of aluminum and has a thickness of about 0.020 inches. A hole 412 is provided so that the crimp cover 406 does not interfere with the piercing of the septum 404.

With the pump and fluid outlet in place, the ink reservoir 324 can be filled With ink. To fill the ink reservoir 324, ink can be injected through the fill port 352. As ink is being introduced into the reservoir, a needle (not shown) can be inserted through the slit 410 in the septum 404 to depress the sealing ball 402 and allow the escape of any air from within the reservoir. Alternatively, a partial vacuum can be applied through the needle. The partial vacuum at the fluid outlet causes ink from the reservoir 324 to fill the chamber 356, the conduit 384, and the cylindrical boss 399 such that little, if any, air remains in contact with the ink. The partial vacuum applied to the fluid outlet also speeds the filling process. Once the ink supply is filled, the plug 354 is press fit into the fill port to prevent the escape of ink or the entry of air.

Of course, there are a variety of other methods which might also be used to fill the present ink supply. In some instances, it may be desirable to flush the entire ink supply with carbon dioxide prior to filling it with ink. In this way, any gas trapped within the ink supply during the filling process will be carbon dioxide, not air. This may be preferable because carbon dioxide may dissolve in some inks while air may not. In general, it is preferable to remove as much gas from the ink supply as possible so that bubbles and the like do not enter the print head or the trailing tube. To this end, it may also be preferable to use degassed ink to further avoid the reaction or presence of bubbles in the ink supply.

Although the ink reservoir 324 provides an ideal way to contain ink, it may be easily punctured or ruptured and may allow some amount of water loss from the ink. Accordingly, to protect the reservoir 324 and to further limit water loss, the reservoir 324 is enclosed within a protective shell 330. In the illustrated embodiment, the shell 330 is made of clarified polypropylene. A thickness of about one millimeter has been found to provide robust protection and to prevent unacceptable water loss from the ink. However, the material and thickness of the shell may vary in other embodiments.

As illustrated in FIG. 37, the top of the shell 330 has contoured gripping surfaces 414 that are shaped and textured to allow a user to allow a user to easily grip and manipulate the ink supply 320. A vertical rib 416 having a detente 418 formed near its lower end projects laterally from each side of the shell 330. The base of the shell 330 is open to allow insertion of the chassis 322. A stop 420 extends laterally outward from each side of the wall 358 that defines the chamber 356. These stops 420 abut the lower edge of the shell 330 when the chassis 322 is inserted.

A protective cap 332 is fitted to the bottom of the shell 330 to maintain the chassis 322 in position. The cap 332 is provided with recesses 428 which receive the stops 420 on the chassis 322. In this manner, the stops are firmly secured between the cap and the shell to maintain the chassis in position. The cap is also provided with an aperture 334 to allow access to the pump 326 and with an aperture 336 to allow access to the fluid outlet 328. The cap 332 obscures the fill port to help prevent tampering with the ink supply.

The cap is provided with projecting keys 430 which can identify the type of printer for which the ink supply is intended and the type of ink contained within the ink supply. For example, if the ink supply is filled with black ink, a cap having keys that indicate black ink may be used. Similarly, if the ink supply is filled with a particular color of ink, a cap indicative of that color may be used. The color of the cap may also be used to indicate the color of ink contained within the ink supply.

As a result of this structure, the chassis and shell can be manufactured and assembled without regard to the particular type of ink they will contain. Then, after the ink reservoir is filled, a cap indicative of the particular ink used is attached to the shell. This allows for manufacturing economies because a supply of empty chassis and shells can be stored in inventory. Then, when there is a demand for a particular type of ink, that ink can be introduced into the ink supply and an appropriate cap fixed to the ink supply. Thus, this scheme reduces the need to maintain high inventories of ink supplies containing every type of ink.

In the illustrated embodiment, the bottom of the shell 330 is provided with two circumferential grooves 422 which engage two circumferential ribs 424 formed on the cap 332 to secure the cap to the shell. Sonic welding or some other mechanism may also be desirable to more securely fix the cap to the shell. In addition, a label (not shown) can be adhered to both the cap and the shell to more firmly secure them together. In the illustrated embodiment, pressure sensitive adhesive is used to adhere the label in a manner that prevents the label from being peeled off and inhibits tampering with the ink supply.

The attachment between the shell, the chassis and the cap should, preferably, be snug enough to prevent accidental separation of the cap from the shell and to resist the flow of ink from the shell should the ink reservoir develop a leak. However, it is also desirable that the attachment allow the slow ingress of air into the shell as ink is depleted from the reservoir to maintain the pressure inside the shell generally the same as the ambient pressure. Otherwise, a negative pressure may develop inside the shell and inhibit the flow of ink from the reservoir. The ingress of air should be limited, however, in order to maintain a high humidity within the shell and minimize water loss from the ink.

In the illustrated embodiment, the shell 330 and the flexible reservoir 324 which it contains have the capacity to hold approximately thirty cubic centimeters of ink. The shell is approximately 67 millimeters wide, 15 millimeters thick, and 60 millimeters high. Of course, other dimensions and shapes can also be used depending on the particular needs of a given printer.

Figure 44:
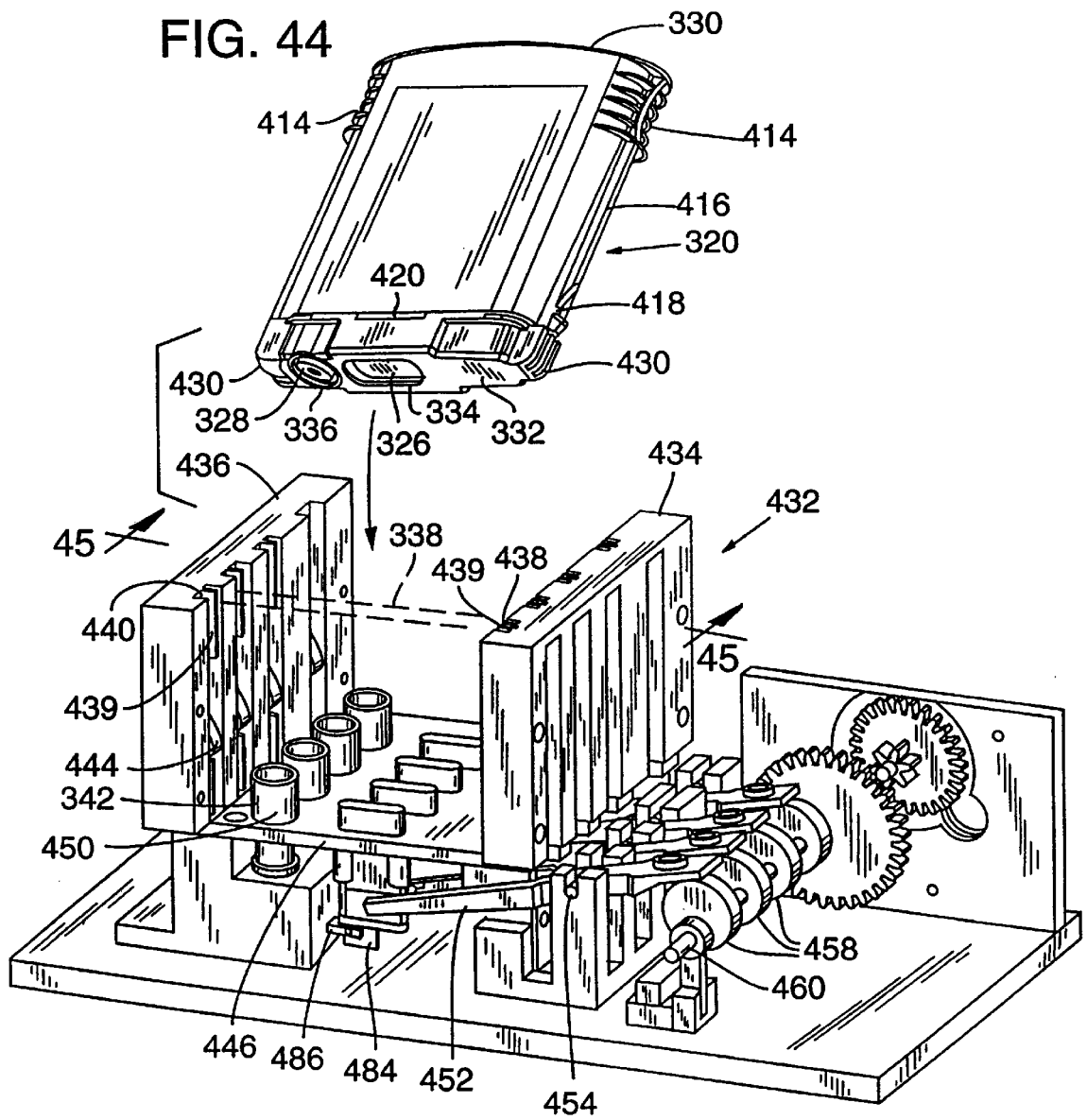
FIG. 44 shows the ink supply of FIG. 37 being inserted into a docking bay of an inkjet printer.

The illustrated ink supply 320 is ideally suited for insertion into a docking station 432 like that illustrated in FIGS. 44–47. The docking station 432 illustrated in FIG. 44, is intended for use with a color printer. Accordingly, it has four side-by-side docking bays 338, each of which can receive one ink supply 320 of a different color. The structure of the illustrated ink supply allows for a relatively narrow width. This allows for four ink supplies to be arranged side-by-side in a compact docking station without unduly increasing the footprint of the printer.

Each docking bay 338 includes opposing walls 434 and 436 which define inwardly facing vertical channels 438 and 440. A leaf spring 442 (FIG. 45) having an engagement prong 444 is positioned within the lower portion of each channel 438 and 440. The engagement prong 444 of each leaf spring 442 extends into the channel toward the docking bay 338 and is biased inward by the leaf spring. The channels 438 and 440 are provided with mating keys 439 formed therein. In the illustrated embodiment, the mating keys in the channels on one wall are the same for each docking bay and identify the type of printer in which the docking station is used. The mating keys in the channels of the other wall are different for each docking bay and identify the color of ink for use in that docking bay. A base plate 446 defines the bottom of each docking bay 338. The base plate 446 includes an aperture 448 which receives the actuator 340 and carries a housing 450 for the fluid inlet 342.

Figure 47:
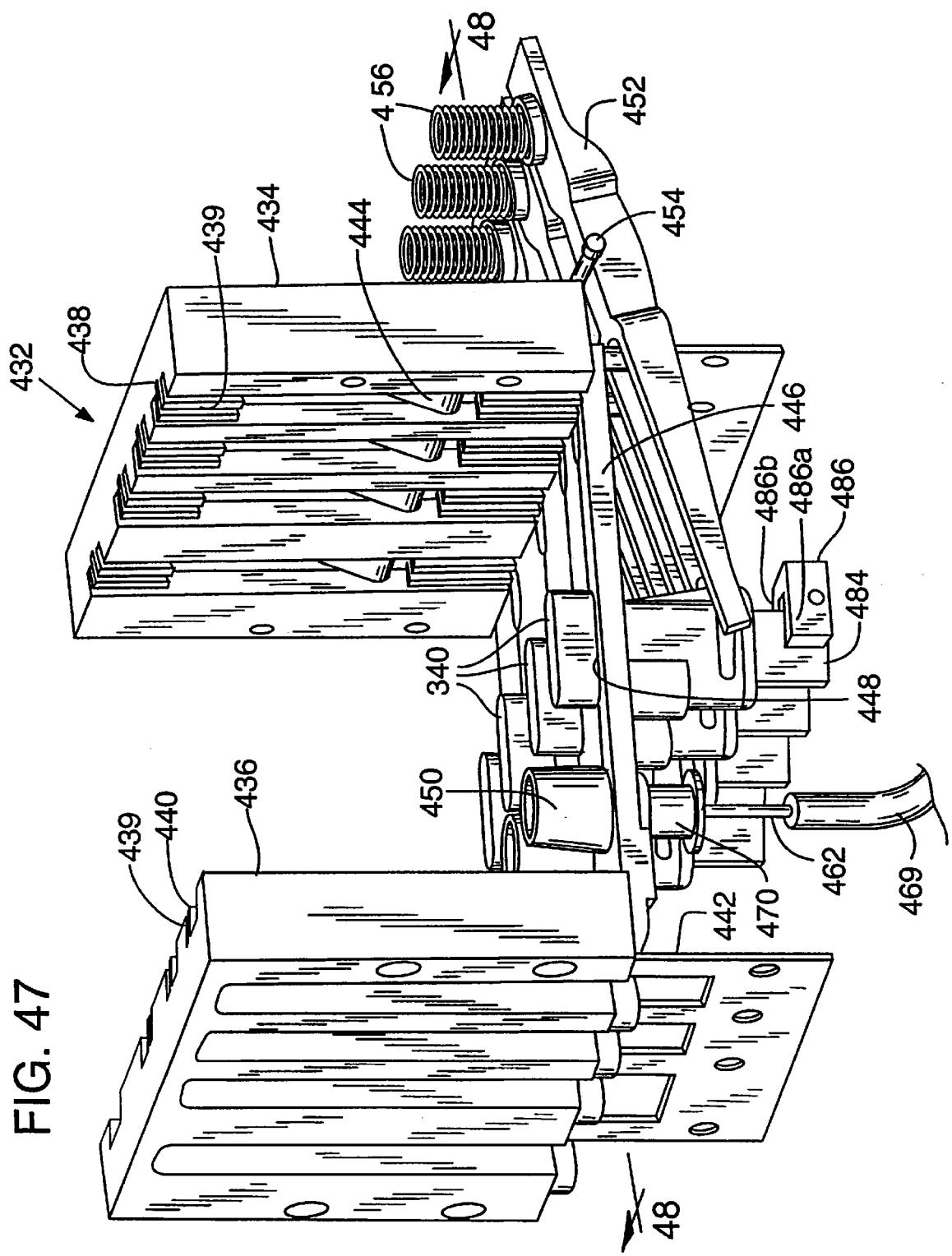
FIG. 47 shows the docking bay of FIG. 44 with a portion of the docking bay cutaway to reveal an out-of-ink detector.

As illustrated in FIG. 44, the upper end of the actuator extends upward through the aperture 448 in the base plate 446 and into the docking bay 338. The lower portion of the actuator 340 is positioned below the base plate and is pivotally coupled to one end of a lever 452 which is supported on pivot point 454. The other end of the lever 454 is biased downward by a compression spring 456 (FIG. 47). In this manner, the force of the compression spring 456 urges the actuator 340 upward. A cam 458 (FIG. 48A) mounted on a rotatable shaft 460 is positioned such that rotation of the shaft to an engaged position causes the cam to overcome the force of the compression spring 456 and move the actuator 340 downward. Movement of the actuator, as explained in more detail below, causes the pump 326 to draw ink from the reservoir 324 and supply it through the fluid outlet 328 and the fluid inlet 342 to the printer.

As illustrated in FIG. 47, a flag 484 extends downward from the bottom of the actuator 340 where it is received within an optical detector 486. The optical detector 486 is of conventional construction and directs a beam of light from one leg 486a toward a sensor (not shown) positioned on the other 486b leg. The optical detector is positioned such that when the actuator 340 is in its uppermost position, corresponding to the top of the pump stroke, the flag 484 raises above the beam of light allowing it to reach the sensor and activate the detector. In any lower position, the flag blocks the beam of light and prevents it from reaching the sensor and the detector is in a deactivated state. In this manner, the sensor can be used, as explained more fully below, to control the operation of the pump and to detect when an ink supply is empty.

Figure 45:
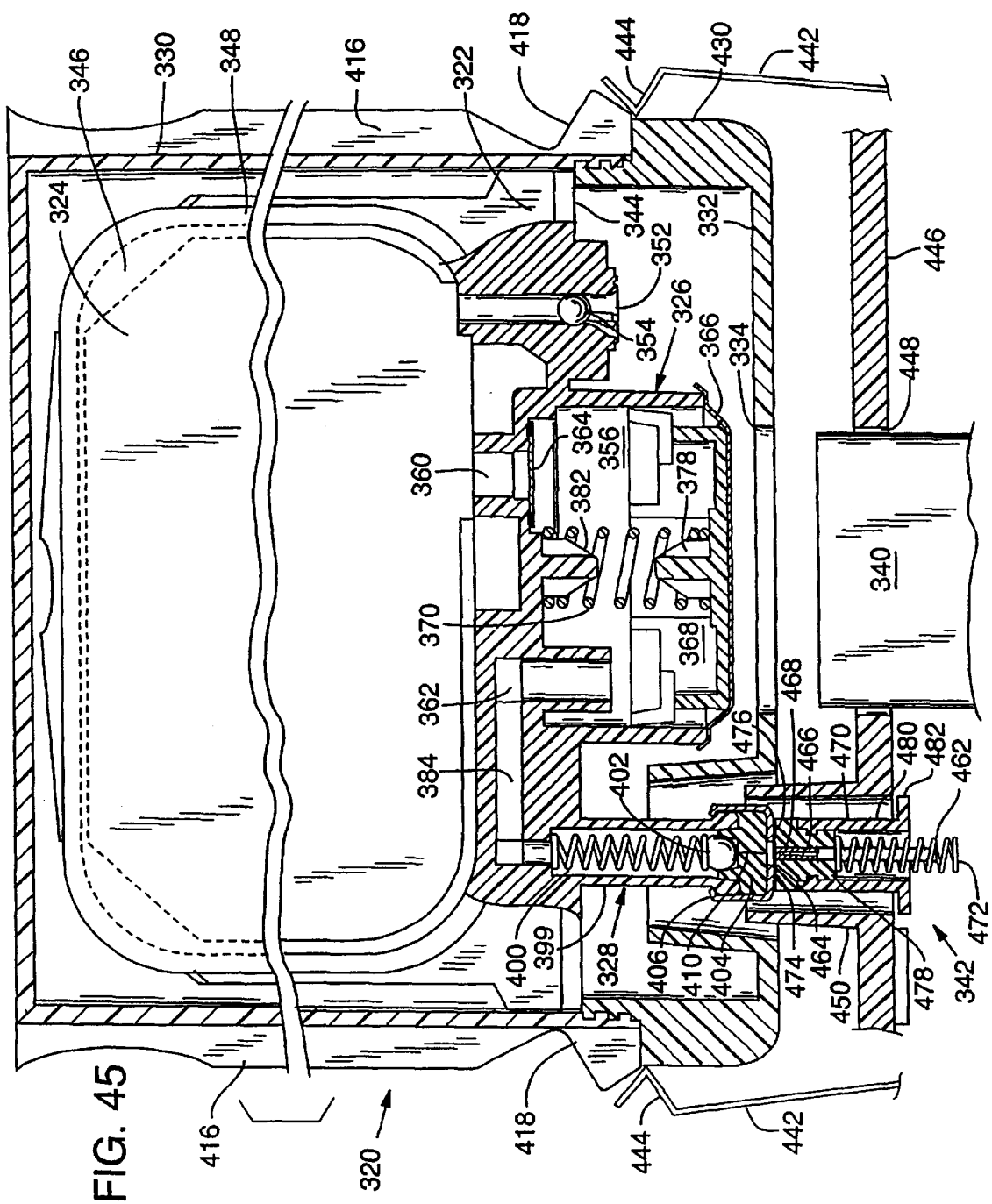
FIG. 45 is a cross-sectional view of a part of the ink supply of FIG. 37 being inserted into the docking bay of an inkjet printer, taken along line 45—45 of FIG. 44.

As seen in FIG. 45, the fluid inlet 342 is positioned within the housing 450 carried on the base plate 446. The illustrated fluid inlet 342 includes an upwardly extending needle 462 having a closed, blunt upper end 464, a blind bore 466 and a lateral hole 468. A trailing tube 469, seen in FIG. 47, is connected to the lower end of the needle 462 in fluid. communication with the blind bore 466. The trailing tube 469 leads to a print head (not shown). In most printers, the print head will usually include a small ink well for maintaining a small quantity of ink and some type of pressure regulator to maintain an appropriate pressure within the ink well. Typically, it is desired that the pressure within the ink well be slightly less than ambient. This back pressure helps to prevent ink from dripping from the print head. The pressure regulator at the print head may commonly include a check valve which prevents the return flow of ink from the print head and into the trailing tube.

A sliding collar 470 surrounds the needle 462 and is biased upwardly by a spring 472. The sliding collar 470 has a compliant sealing portion 474 with an exposed upper surface 476 and an inner surface 478 into direct contact with the needle 462. In addition, the illustrated sliding collar includes a substantially rigid portion 480 extending downwardly to partially house the spring 472. An annular stop 482 extends outward from the lower edge of the substantially rigid portion 480. The annular stop 482 is positioned beneath the base plate 446 such that it abuts the base plate to limit upward travel of the sliding collar 470 and define an upper position of the sliding collar on the needle 462. In the upper position, the lateral hole 468 is surrounded by the sealing portion 474 of the collar to seal the lateral hole and the blunt end 464 of the needle is generally even with the upper surface 476 of the collar.

In the illustrated embodiment, the needle 462 is an eighteen gauge stainless steel needle with an inside diameter of about 1.04 millimeters, an outside diameter of about 1.2 millimeters, and a length of about 30 millimeters. The lateral hole is generally rectangular with dimensions of about 0.55 millimeters by 0.70 millimeters and is located about 1.2 millimeters from the upper end of the needle. The sealing portion 474 of the sliding collar is made of ethylene propylene timer monomer and the generally rigid portion 476 is made of polypropylene or any other suitably rigid material. The sealing portion is molded with an aperture to snugly receive the needle and form a robust seal between the inner surface 478 and the needle 462. In other embodiments, alternative dimensions, materials or configurations might also be used.

To install an ink supply 320 within the docking bay 338, a user can simply place the lower end of the ink supply between the opposing walls 434 and 436 with one edge in one vertical channel 438 and the other edge in the other vertical channel 440, as shown in FIG. 44. The ink supply is then pushed downward into the installed position, shown in FIG. 46, in which the bottom of the cap 332 abuts the base plate 446. As the ink supply is pushed downward, the fluid outlet 328 and fluid inlet 342 automatically engage and open to form a path for fluid flow from the ink supply to the printer, as explained in more detail below. In addition, the actuator enters the aperture 334 in the cap 332 to pressurize the pump, as explained in more detail below.

Once in position, the engagement prongs 444 on each side of the docking station engage the detentes 418 formed in the shell 330 to fully hold flue ink supply in place. The leaf springs 442, which allow the engagement prongs to move outward during insertion of the ink supply, bias the engagement prongs inward to positively hold the ink supply in the installed position. Throughout the installation process and in the installed position, the edges of the ink supply 320 are captured within the vertical channels 438 and 440 which provide lateral support and stability to the ink supply. In some embodiments, it may be desirable to form grooves in one or both of the channels 438 and 440 which receive the vertical rib 416 formed in the shell to provide additional stability to the ink supply.

To remove the ink supply 320, a user simply grasps the ink supplying the contoured gripping surfaces 414, and pulls upward to overcome the force of the leaf springs 442. Upon removal, the fluid outlet 328 and fluid inlet 342 automatically disconnect and reseal leaving little, if any, residual ink, and the pump 326 is depressurized to reduce the possibility of any leakage from the ink supply.

Figure 46:
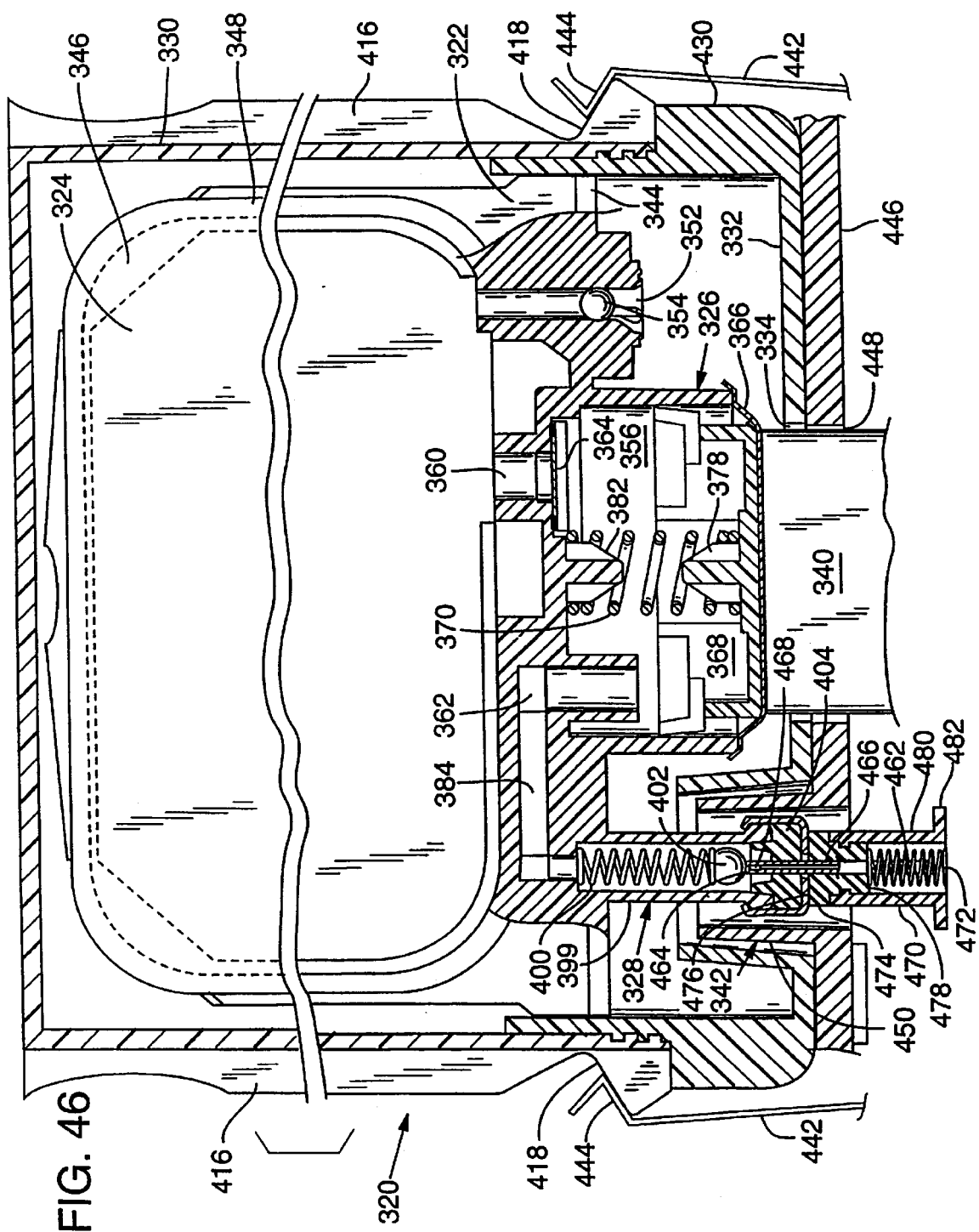
FIG. 46 is a cross-sectional view showing the ink supply of FIG. 45 fully inserted into the docking bay.

Operation of the fluid interconnect, that is the fluid outlet 328 and the fluid inlet 342, during insertion of the ink supply is illustrated in FIGS. 45 and 46. FIG. 45 shows the fluid outlet 328 upon its initial contact with the fluid inlet 342. As illustrated in FIG. 45, the housing 450 has partially entered the cap 332 through aperture 336, and the lower end of the fluid outlet 328 has entered into the top of the housing 450. At this point, the crimp cover 406 contacts the sealing collar 470 to form a seal between the fluid outlet 328 and the fluid inlet 342 while both are still in their sealed positions. This seal acts as a safety barrier in the event that any ink should leak through the septum 404 or from the needle 462 during the coupling and are coupling process.

In the illustrated configuration, the bottom of the fluid inlet and the top of the fluid outlet are similar in shape. Thus, very little air is trapped within the seal between the fluid outlet of the ink supply and the fluid inlet of the printer. This facilitates proper operation of the printer by reducing the possibility that air will enter the fluid outlet 328 or the fluid inlet 342 and reach the ink jets in the print head.

As the ink supply 320 is inserted further into the docking bay 338, the bottom of the fluid outlet 328 pushes the sliding collar 470 downward, as illustrated in FIG. 46. Simultaneously, the needle 462 enters the slit 410 and passes through the septum 404 to depress the sealing ball 402. Thus, in the fully inserted position, ink can flow from the boss 399, around the sealing ball 402, into the lateral hole 468, down the bore 466, through the trailing tube 469 to the print head.

Upon removal of the ink supply 320, the needle 462 is withdrawn and the spring 400 presses the sealing ball 402 firmly against the septum to establish a robust seal. In addition, the slit 410 closes to establish a second seal, both of which serve to prevent ink from leaking through the fluid outlet 328. At the same time, the spring 472 pushes the sliding collar 470 back to its upper position in which the lateral hole 468 is encased within the sealing portion of the collar 474 to prevent the escape of ink from the fluid inlet 342. Finally, the seal between the crimp cover 406 and the upper surface 476 of the sliding collar is broken. With this fluid interconnect, little, if any, ink is exposed when the fluid outlet 328 is separated from the fluid inlet 342. This helps to keep both the user and the printer clean.

Although the illustrated fluid outlet 328 and fluid inlet 342 provide a secure seal with little entrapped air upon sealing and little excess ink upon unsealing, other fluid interconnections might also be used to connect the ink supply to the printer. For example, the illustrated fluid inlet could be located on the ink supply and the illustrated fluid outlet could be located in the docking bay.

Figure 48A:
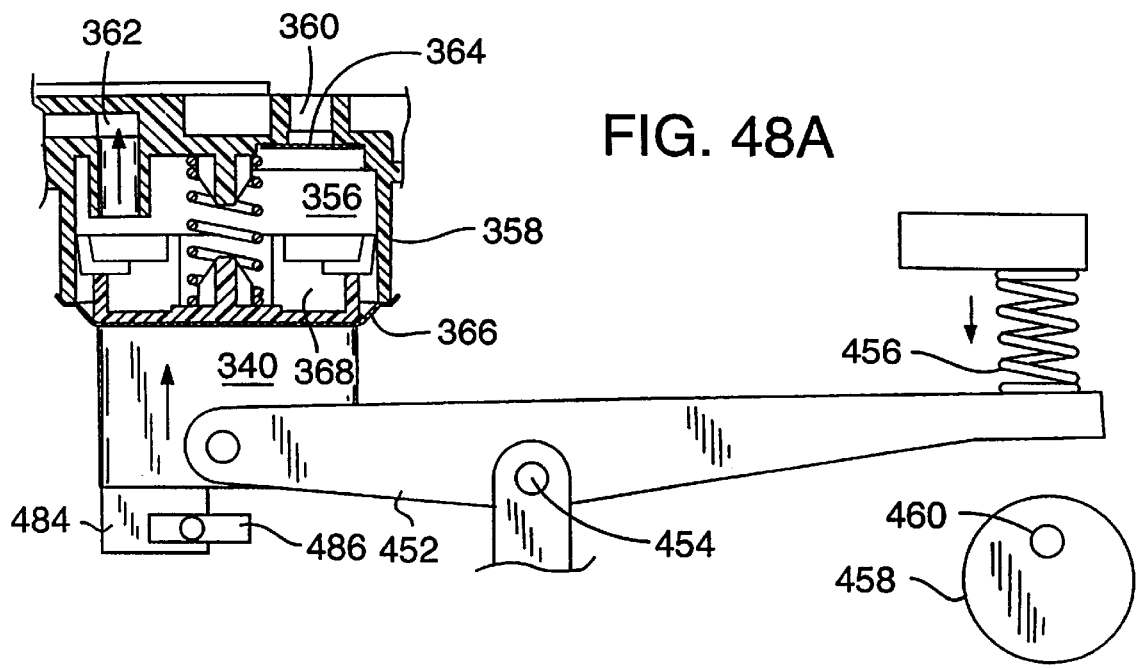
FIGS. 48A through 48E are cross-sectional views of a portion of the ink supply and docking bay showing the pump, actuator, and out-of-ink detector in various stages of operation, taken along line 48—48 of FIG. 47.

As illustrated in FIG. 46, when the ink supply 320 is inserted into the docking bay 338, the actuator 340 enters through the aperture 334 in the cap 332 and into position to operate the pump 326. FIGS. 48A–E illustrate various stages of the pump's operation. FIG. 48A illustrates the fully charged position of the pump 326. The flexible diaphragm 366 is in its lowermost position, the volume of the chamber 356 is at its maximum, and the flag 484 is blocking the light beam from the sensor. The actuator 340 is pressed against the diaphragm 366 by the compression spring 456 to urge the chamber to a reduced volume and create pressure within the pump chamber 356. As the valve 364 limits the flow of ink from the chamber back into the reservoir, the ink passes from the chamber through the pump outlet 362 and the conduit 384 to the fluid outlet 328. In the illustrated embodiment, the compression spring is chosen so as to create a pressure of about 1.5 pounds per square inch within the chamber. Of course, the desired pressure may vary depending on the requirements of a particular printer and may vary throughout the pump stroke. For example, in the illustrated embodiment, the pressure within the chamber will vary from about 90–45 inches of water column during the pump stroke.

Figure 48B:
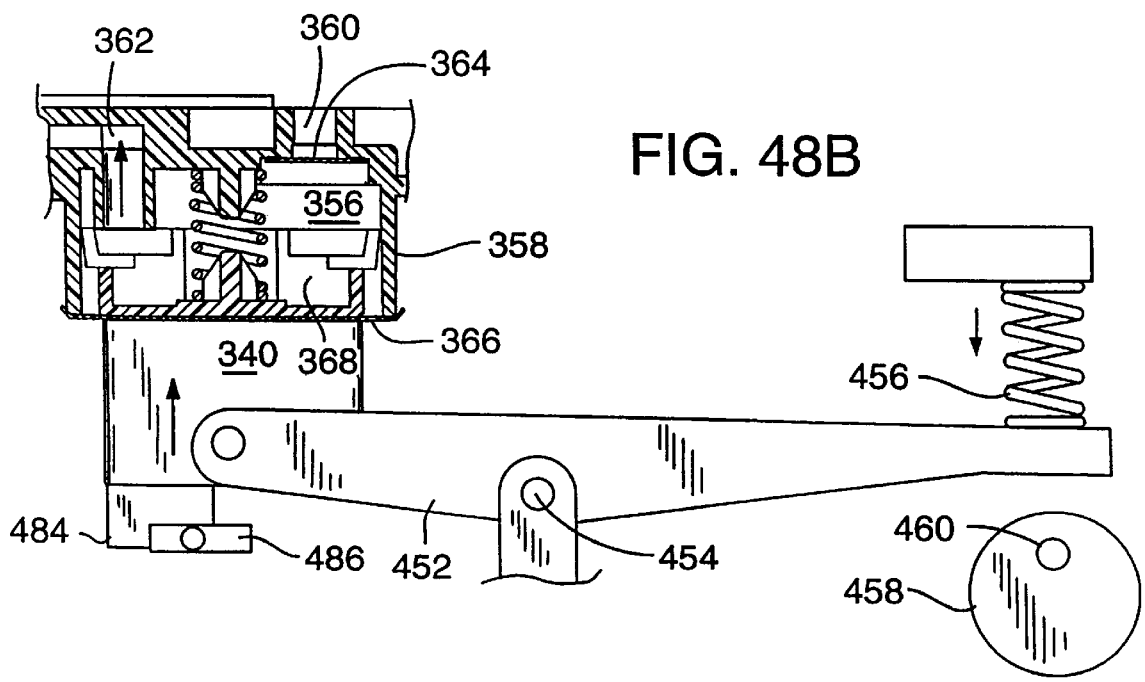

As ink is depleted from the pump chamber 356, the compression spring 456 continues to press the actuator 340 upward against the diaphragm 366 to maintain a pressure within the pump chamber 356. This causes the diaphragm to move upward to an intermediate position decreasing the volume of the chamber, as illustrated in FIG. 48B. In the intermediate position, the flag 484 continues to block the beam of light from reaching the sensor in the optical detector 486.

Figure 48C:
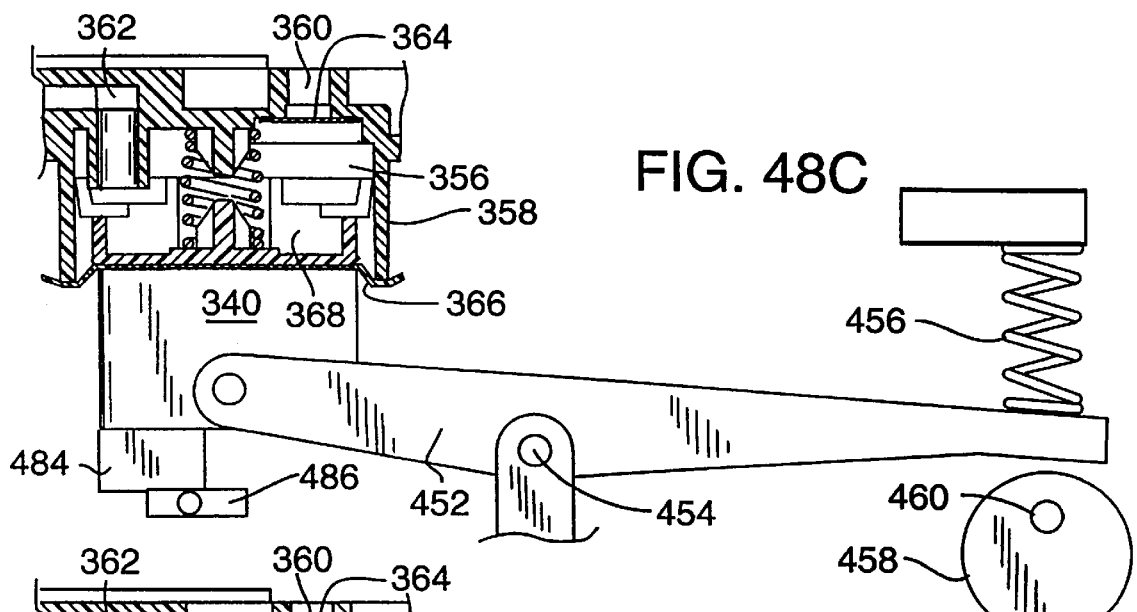

As still more ink is depleted from the pump chamber 356, the diaphragm 340 is pressed to its uppermost position, illustrated in FIG. 48C. In the uppermost position, the volume of the chamber 356 is at its minimum operational volume and the flag 484 rises high enough to allow the light beam to reach the sensor and activate the optical detector 486.

Figure 48D:
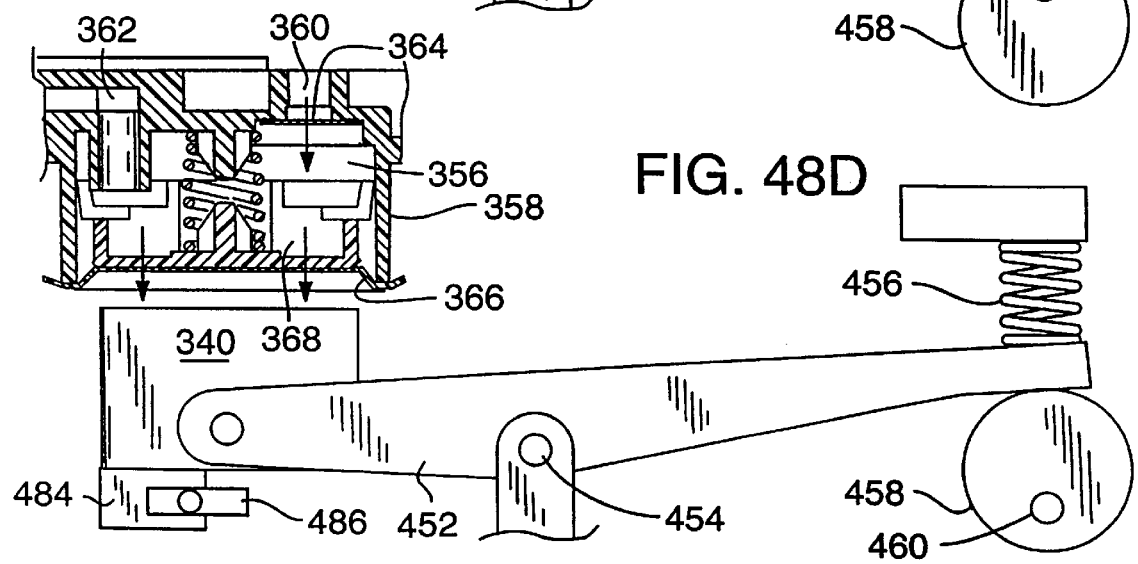

The printer control system (not shown) detects activation of the optical detector 486 and begins a refresh cycle. As illustrated in FIG. 48D, during the refresh cycle the cam 458 is rotated into engagement with the lever 452 to compress the compression spring 456 and move the actuator 340 to its lowermost position. In this position, the actuator 340 does not contact the diaphragm 366.

With the actuator 340 no longer pressing against the diaphragm 366, the pump spring 370 biases the pressure plate 368 and diaphragm 366 outward, expanding the volume and decreasing the pressure within the chamber 356. The decreased pressure within the chamber 356 allows the valve 364 to open and draws ink from the reservoir 324 into the chamber 356 to refresh the pump 326, as illustrated in FIG. 48D. The check valve at the print head, the flow resistance within the trailing tube, or both will limit ink from returning to the chamber 356 through the conduit 384. Alternatively, a check valve may be provided at the outlet port, or at some other location, to prevent the return of ink through the outlet port and into the chamber.

After a predetermined amount of time has elapsed, the refresh cycle is concluded by rotating the cam 458 back into its disengaged position and the ink supply typically returns to the configuration illustrated in FIG. 48A.

Figure 48E:
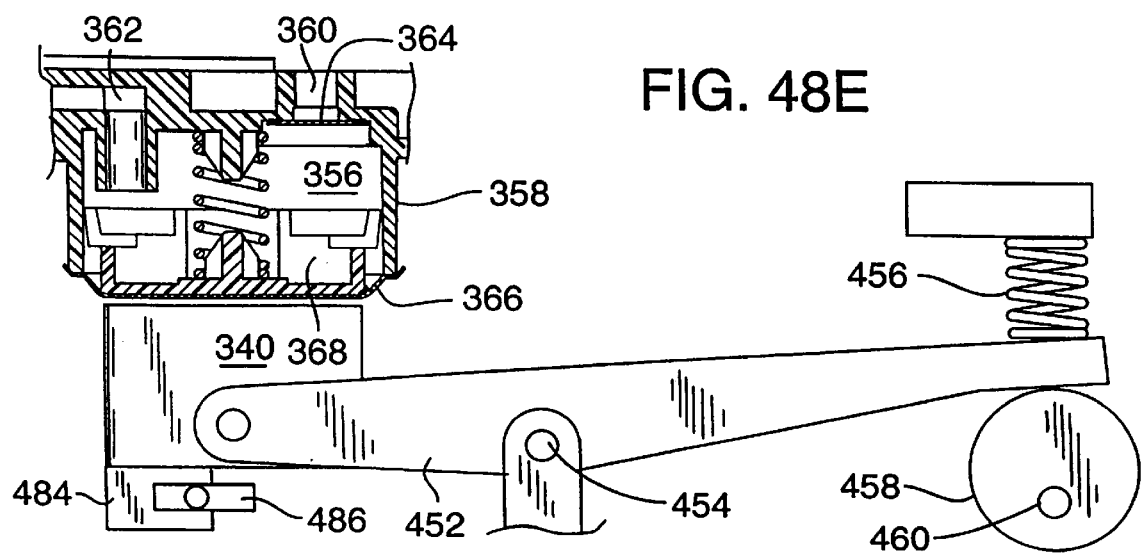

However, if the ink supply is out of ink, no ink can enter into the pump chamber 356 during a refresh cycle. In this case, the back pressure within the ink reservoir 324 will prevent the chamber 356 from expanding. As a result, when the cam 458 is rotated back into its disengaged position, the actuator 340 returns to its uppermost position, as illustrated in FIG. 48E, and the optical detector 486 is again activated. Activation of the optical detector immediately after a refresh cycle, informs the control system that the ink supply is out of ink (or possibly that some other malfunction is preventing the proper operation of the ink supply). In response, the control system can generate a signal informing the user that the ink supply requires replacement. This can greatly extend the life of the print head by preventing dry firing of the ink jets.

In some embodiments in may be desirable to rotate the cam 458 to the disengaged position and remove pressure from the chamber 356 whenever the printer is not printing. It should be appreciated that a mechanical switch, an electrical switch or some other switch capable of detecting the position of the actuator could be used in place of the optical detector.

The configuration of the present ink supply is particularly advantageous because only the relatively small amount of ink within the chamber is pressurized. The large majority of the ink is maintained within the reservoir at approximately ambient pressure. Thus, it is less likely to leak and, in the event of a leak, can be more easily contained.

The illustrated diaphragm pump has proven to be very reliable and well suited for use in the ink supply. However, other types of pumps may also be used. For example, a piston pump, a bellows pump, or other types of pumps might be adapted for use.

As discussed above, the illustrated docking station 432 (FIG. 44) includes four side-by-side docking bays 338. This configuration allows the wall 434, the wall 436 and the base plate 446 for the four docking bays to be unitary. In the illustrated embodiment, the leaf springs for each side of the four docking bays can be formed as a single piece connected at the bottom. In addition, the cams 458 for each docking station are attached to a single shaft 460. Using a single shaft results in each of the four ink supplies being refreshed when the pump of any one of the four reaches its minimum operational volume. Alternatively, it may be desirable to configure the cams and shaft to provide a third position in which only the black ink supply is pressurized. This allows the colored ink supplies to remain at ambient pressure during a print job that requires only black ink.

The arrangement of four side-by-side docking bays is intended for use in a color printer. One of the docking bays is intended to receive an ink supply containing black ink, one an ink supply containing yellow ink, one an ink supply containing cyan ink, and one an ink supply containing magenta ink. The mating keys 439 for each of the four docking bays are different and correspond to the color of ink for that docking bay. The mating keys 439 are shaped to receive the corresponding keys 430 formed on a cap of an ink supply having the appropriate color. That is, the keys 430 and the mating keys 439 are shaped such that only an ink supply having the correct color of ink, as indicated by the keys on the cap, can be inserted into any particular locating bay. The mating keys 439 can also identify the type of ink supply hat is to be installed in the docking bay. This system helps to prevent a user from inadvertently inserting an ink supply of one color into a docking bay for another color or from inserting an ink supply intended for one type of printer into the wrong type of printer.

Constant pressurization of the various ink supply cartridges described has the following advantages over intermittent pressurization:

(1) Lower product cost/minimum product complexity by eliminating any pump station;
(2) Pressurizing the tubes reduces or eliminates air diffusion into tubes (depending on pressure level).

Intermittent pressurization has the following advantages over constant pressurization:

(1) Fluid seals and valves do not have to withstand constant pressure, resulting in improved reliability;
(2) Ink supplies are less expensive, since the plastic shell does not need to be as strong.

Conclusion

The various print cartridges (for example down connect needle, up connect needle, and septum tower), carriages, and off-axis ink delivery systems described herein may be used in various combinations to provide ink to the nozzles of the printheads in the print cartridges. As one example, any of the print cartridges described may be used with either the pressurized or unpressurized ink supply cartridges. The ink supply cartridges may be arranged in a printer for convenient access, ease of use, maximum utilization of space, and allowing for the required delivered ink volume. The pressure regulator, being integral with the print cartridge in the preferred embodiment, allows printhead performance to be independent of the relative heights of the ink supply and printhead.

The lowest cost system will typically be one with unpressurized supplies. However, pressurization may be required for some situations. This is best understood by considering causes of dynamic and static pressure changes. The static pressure in the printhead is defined as that which exists when the printhead is parked and not operating and is typically optimally set to −2 to −6 inches of water column by the spring in the regulator. However, if the ink supplies are located more than 6 inches below the printhead, then the regulator will always be open (assuming the above setpoint range), and the static pressure will always be the difference in height. To make matters worse, the pressure of concern is dynamic, defined as the pressure experienced in the printhead during operation. Thus, the actual dynamic pressure will be an even larger negative number and will be outside the regulator range.

Pressurizing the ink supply will solve this problem. This can be done by the aforementioned method or by using springs to provide constant ink supply pressure. This can be done to counteract the relative heights, and other factors that affect the dynamic pressure drop. Factors that increase the dynamic pressure drop include rate of ink usage by the printhead, decreasing tubing diameter, increasing tubing length, and increasing ink viscosity. The pressurization must be increased until the pressure is entirely controlled by the regulator to within the print quality driven pressure specification.

Figure 49:
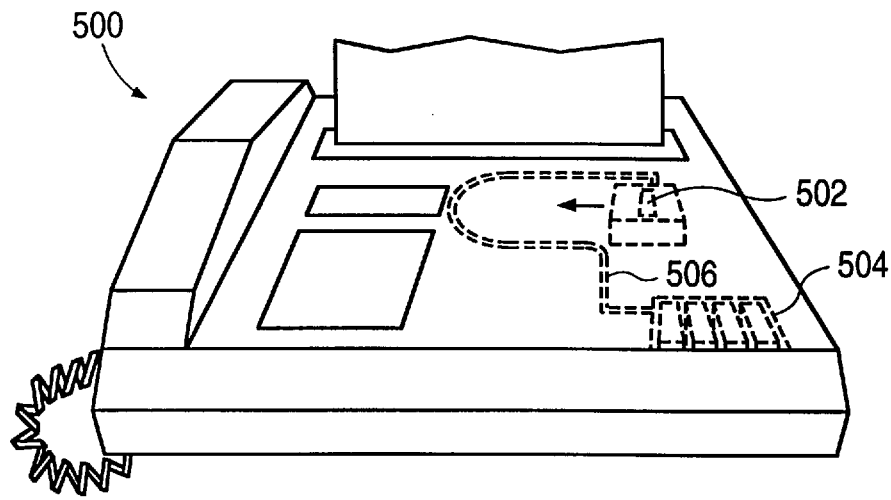
FIG. 49 is a perspective view of a facsimile machine showing one embodiment of the ink delivery system in phantom outline.

As a result of these design options, the integral pressure regulator offers a wide range of product implementations other than those illustrated in FIGS. 1A and 1B. For example, such ink delivery systems may be incorporated into an inkjet printer used in a facsimile machine 500 as shown in FIG. 49, where a scanning cartridge 502 and an off-axis ink delivery system 504, connected via tube 506, are shown in phantom outline.

Figure 50:
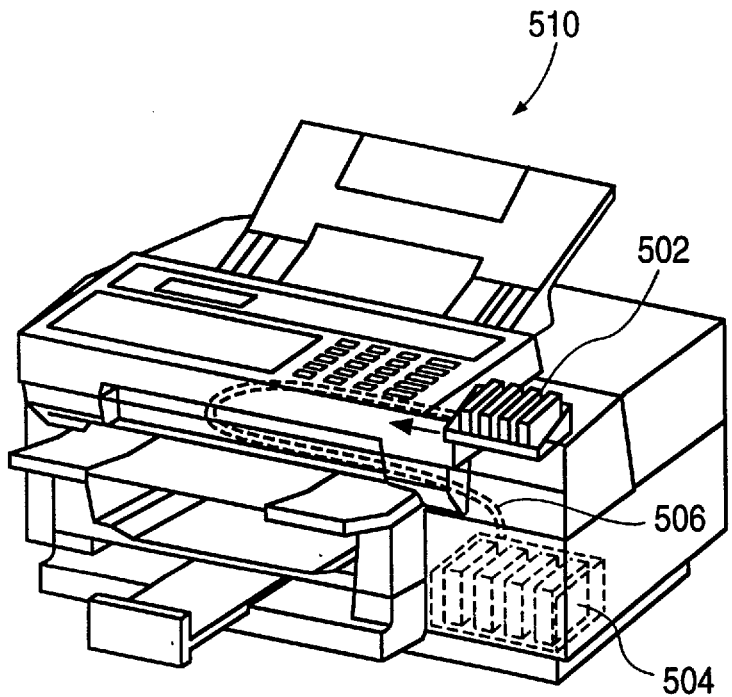
FIG. 50 is a perspective view of a copier, which may be a combined facsimile machine and printer, illustrating one embodiment of the ink delivery system in phantom outline.

FIG. 50 illustrates a copying machine 510, which may also be a combined facsimile/copying machine, incorporating an ink delivery system described herein. Scanning print cartridges 502 and an off-axis ink supply 504, connected via tube 506, are shown in phantom outline.

Figure 51:
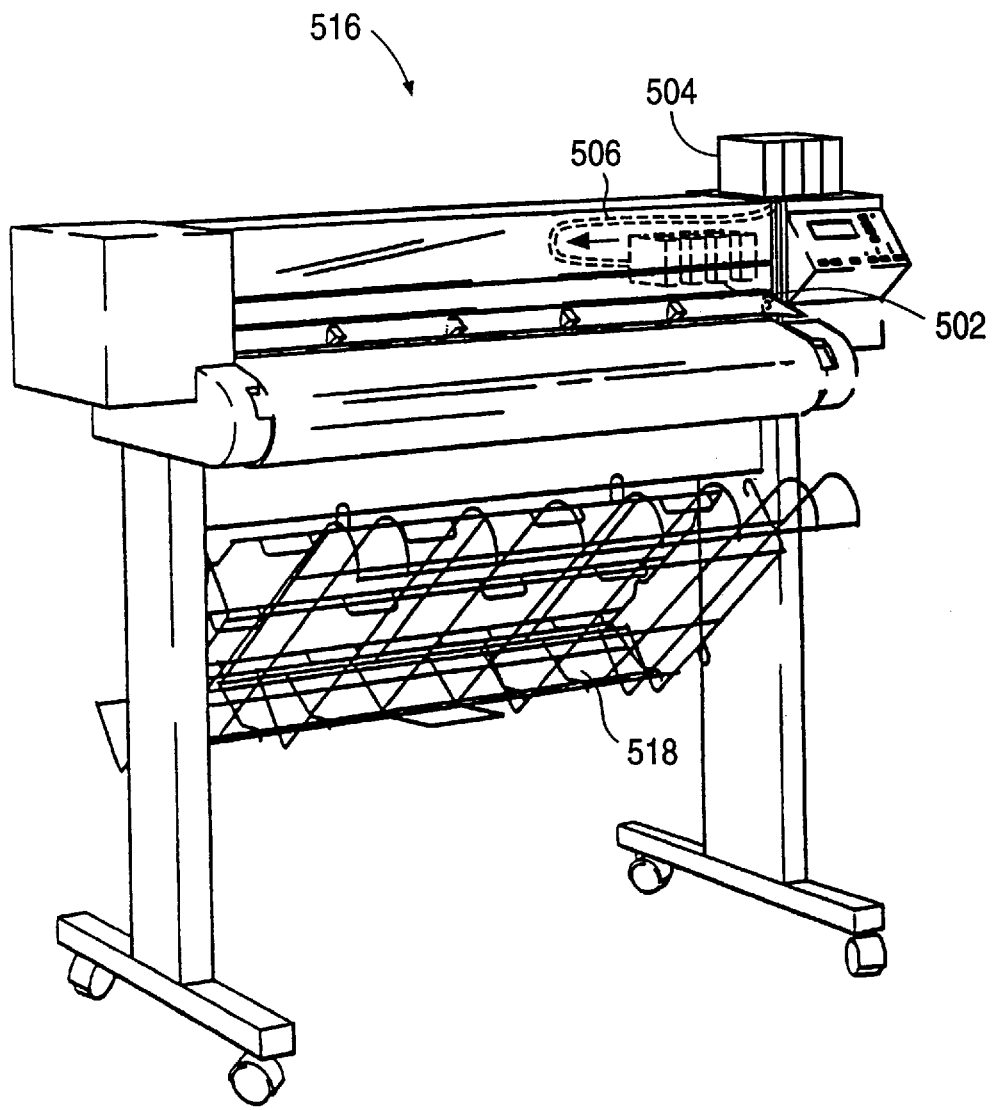
FIG. 51 is a perspective view of a large-format inkjet printer illustrating one embodiment of the ink delivery system.

FIG. 51 illustrates a large-format printer 516 which prints on a wide, continuous paper roll supported by tray 518. Scanning print cartridges 502 are shown connected to the off-axis ink supply 504 via tube 506.

Facsimile machines, copy machines, and large format machines tend to be shared with heavy use. They are often used unattended and for large numbers of copies. Thus, large capacity (50–500 cc) ink supplies will tend to be preferred for these machines. In contrast, a home printer or portable printer would be best with low capacity supplies in order to minimize product size and cost. Thus, the product layouts shown in FIGS. 1A and 1B are most appropriate for such smaller form factor or lower cost applications.

While particular embodiments of the present invention have been shown and described, it will be obvious to those skilled in the art that changes and modifications may be made within departing from this invention in its broader aspects and, therefore, the appended claims are to encompass within their scope all such changes and modifications as fall within the true spirit and scope of this invention.

What is claimed is:

1. A printing system comprising:
   a first ink reservoir;
   a scanning carriage;
   a print cartridge for installation in said carriage, said print cartridge having a second ink reservoir internal to said print cartridge, said print cartridge containing a pressure regulator comprising:
      a valve for controlling an opening in an ink path between said first ink reservoir and said second ink reservoir;

a flexible member within said print cartridge maintained at an internal reference pressure, said flexible member expanding or contracting dependent upon the relative pressures internal and external to said flexible member; and an actuator in contact with said flexible member for actuating said valve based on the expansion and contraction of said flexible member, said valve controlling a flow of ink into said second ink reservoir such that ink is supplied to a printhead within said print cartridge at a substantially constant pressure.

2. The system of claim 1 wherein said flexible member comprises two flexible bags maintained at said internal reference pressure and having a common direction of expansion and contraction, and wherein said actuator comprises a regulator lever which directly bears against at least one of said bags and thereby actuates said valve, said regulator lever having an axis of rotation perpendicular with said direction of expansion and contraction of said bags so that said lever tracks any expansion and contraction of said bags.

3. The system of claim 2 further comprising an accumulator lever that applies a substantially constant force against said reference pressure in said bags, said accumulator lever having an axis of rotation approximately perpendicular to said direction of expansion and contraction of said bags so that said accumulator lever tracks any expansion and contraction of said bags.

4. The system of claim 3 wherein one of said bags has a region of enhanced sensitivity to differential pressure across said region, and said region bears against said regulator lever.

5. The system of claim 4 wherein the other of said bags has a region of enhanced sensitivity to differential pressure across said region, and said region bears against said accumulator lever.

6. The system of claim 2 wherein each of said bags has a region of enhanced sensitivity to differential pressure across said region, and each of said region bears against the other.

7. The system of claim 2 wherein said valve has a resiliently deformable valve seat such that said actuator, valve, and valve seat compensate for air expansion within said print cartridge.

8. The system of claim 1 further comprising a conduit having a flexible portion, said conduit fluidically coupling said first ink reservoir to said valve.

9. The system of claim 8 further comprising an engageable fluid connection between said print cartridge and said conduit, said fluid connection scanning with said carriage.

10. The system of claim 8 further comprising an engageable fluid connection between said print cartridge and said conduit, said fluid connection not scanning with said carriage.

11. The system of claim 9 wherein said fluid connection comprises a first interconnect member being a resilient septum, and a second interconnect member being a hollow needle.

12. A system of claim 1 wherein said ink reservoir within said print cartridge has a negative internal pressure relative to ambient pressure.

13. An ink delivery system supported on a rigid frame, in which a printhead mounted on a carriage moves relative to the frame across a print zone to deposit ink on media, with the printhead incorporated into a cartridge which has an internal pressure regulator that supplies ink to the printhead, said system comprising:

an off-carriage ink supply within a housing that is adapted to be removably mounted to a supply station;

an ink reservoir in said ink supply that is in fluid communication with a discharge port; and ink contained in the ink reservoir which passes out of the discharge port, through a conduit, and then to the regulator, the regulator having a valve that opens and closes in response to an ink pressure in the cartridge, the ink reservoir and the valve operatively coupled to maintain the cartridge pressure at a chosen setpoint between zero and −25 inches of water when the ink supply is removably mounted to the supply station.

14. The system of claim 13 wherein the discharge port comprises a septum.

15. The system of claim 14 wherein the discharge port further comprises a spring-loaded sealing member.

16. The system of claim 13 wherein the discharge port comprises a spring-loaded sealing member.

17. The system of claim 13 wherein the regulator comprises:

a flexible member with a reference surface and a reservoir surface, the reference surface in fluid communication with an outside atmosphere and the reservoir surface in fluid communication with an ink chamber within said cartridge; and an actuator adjacent to the flexible member for actuating the valve based upon a differential pressure between the outside atmosphere and the ink chamber.

18. The system of claim 17 wherein the valve comprises a nozzle and a valve seat, the nozzle having a tapered geometry for reducing the area of contact between the nozzle and the valve seat when the valve is closed.

19. The system of claim 17 wherein the actuator includes a lever pivotally mounted for rotation about an axis, wherein the valve includes a valve seat and a nozzle, and wherein the valve seat is mounted on the lever.

* * * * *